United States Patent [19]
Eastmond et al.

[11] Patent Number: 6,088,337
[45] Date of Patent: Jul. 11, 2000

[54] METHOD ACCESS POINT DEVICE AND PERIPHERAL FOR PROVIDING SPACE DIVERSITY IN A TIME DIVISION DUPLEX WIRELESS SYSTEM

[75] Inventors: Bruce Charles Eastmond, Downers Grove; Mark Conrad Cudak, McHenry; James Frank Kepler, Buffalo Grove, all of Ill.

[73] Assignee: Motorola, Inc., Schuamburg, Ill.

[21] Appl. No.: 08/954,770

[22] Filed: Oct. 20, 1997

[51] Int. Cl.$^7$ .............................. H04J 3/00; H03M 13/00
[52] U.S. Cl. ............................................. 370/280; 714/758
[58] Field of Search ................................... 370/252, 280, 370/294; 714/758

[56] References Cited

U.S. PATENT DOCUMENTS

| | | | |
|---|---|---|---|
| 4,977,616 | 12/1990 | Linder et al. | |
| 5,109,536 | 4/1992 | Kommrusch | |
| 5,241,693 | 8/1993 | Kim et al. | |
| 5,400,320 | 3/1995 | Tanaka et al. | 371/37.7 |
| 5,684,791 | 11/1997 | Raychaudhuri et al. | 370/280 |
| 5,715,257 | 2/1998 | Matsuki et al. | 371/32 |
| 5,724,368 | 3/1998 | Zook | 371/37.7 |
| 5,799,042 | 8/1998 | Xiao | 375/285 |
| 5,862,452 | 1/1999 | Cudak et al. | 455/6.3 |

OTHER PUBLICATIONS

Presentation "W–CDMA/TDD System" Special Group for Radio Transmission Technology Ad–hoc 2; CDMA, TDD Group.

James P. Phillips and Henry L. Kazecki, Reflector Diversity Antenna, Motorola Technical Developments, vol. 3, Mar. 1983.

William E. Shortall, A Switched Diversity Receiving System for Mobile Radio, IEEE Transactions on Communications, vol. COM–21, No. 11, Nov. 1973.

G.H. Brown, Directional Antennas, Proceedings of the Institute of Radio Engineers, vol. 25, No. 1, Part 1, Jan. 1937.

R.J. McEliece, Finite Fields for Computer Scientists and Engineers. Boston, MA: Kluwer, 1989.

A. E. Brouwer and T. Verhoeff, An Updated Table of Minimum–Distance Bounds for Binary Linear Codes, IEEE Transactions on Information Theory, vol. IT–39, pp. 662–677, Mar. 1993.

G. Castagnoli, S. Brauer, and M. Hermann, Optimization of Cyclic Redundancy–Check Codes with 24 and 32 Parity Bits, IEEE Transactions on Communications, vol. COM–41, pp. 883–892, Jun. 1993.

Edward L. Titlebaum, Time–Frequency Hop Signals Part I: Coding Based Upon the Theory of Linear Congruences, IEEE Transactions on Aerospace and Electronic Systems, vol. AES–17, No. 4, Jul. 1981, pp. 490–493.

S. Lin and D. J. Costello, Jr., Error Control Coding: Fundamentals and Applications. New Jersey: Prentice Hall, 1983.

*Primary Examiner*—Huy D. Vu
*Assistant Examiner*—Jasper Kwoh
*Attorney, Agent, or Firm*—Darleen J. Stockley

[57] ABSTRACT

A method, access point device and a plurality of peripheral devices provide for controlling a space diversity switch in a time division duplex system. The method includes: inputting data to a peripheral; generating a $CRC_1$ in a peripheral; transmitting the data and the $CRC_1$; receiving, by an access point device, the data with the $CRC_1$; extracting $CRC_1$ and generating $CRC_2$ from received data; determining whether $CRC_1$ and $CRC_2$ are equal and where $CRC_1$ and $CRC_2$ are equal, failing to generate a repeat request; where $CRC_1$ and $CRC_2$ are unequal, generating a repeat request; determining whether a number of requests=N; where the number of requests≠N, incrementing a counter and returning to receiving the data with the $CRC_1$; and where the number of requests=N, resetting the counter, changing an antenna state and returning to receiving, by an access point device, the data with the $CRC_1$.

9 Claims, 24 Drawing Sheets

500

700

800

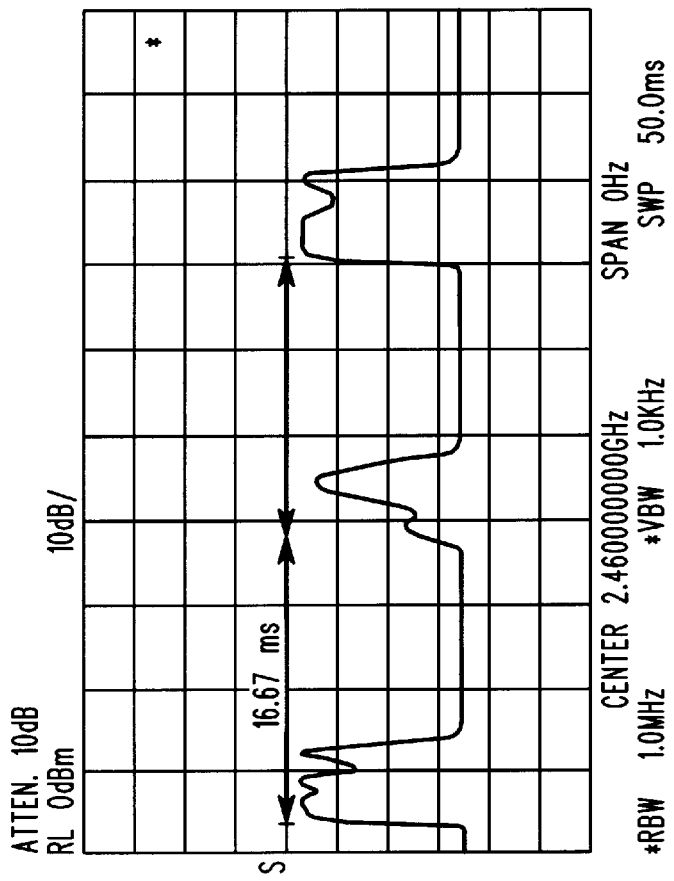
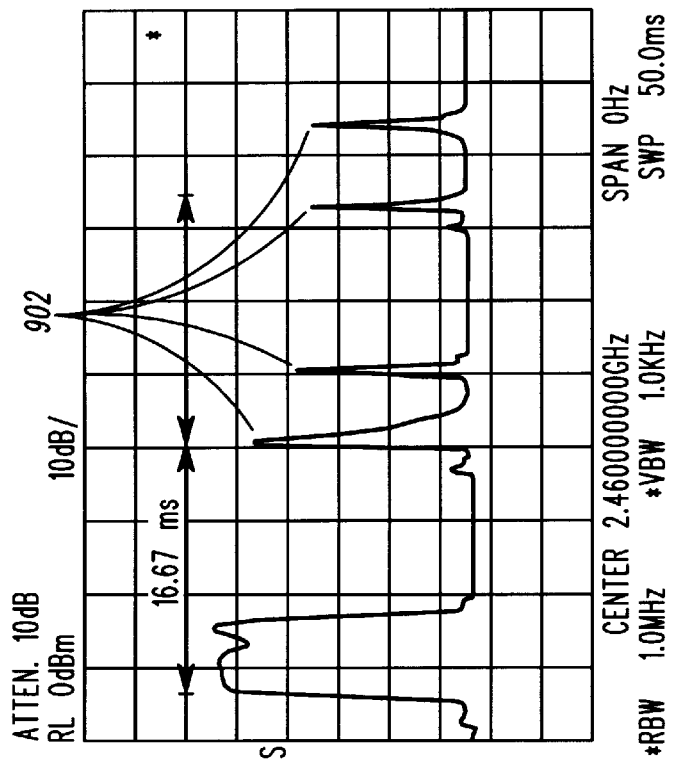
FIG. 9

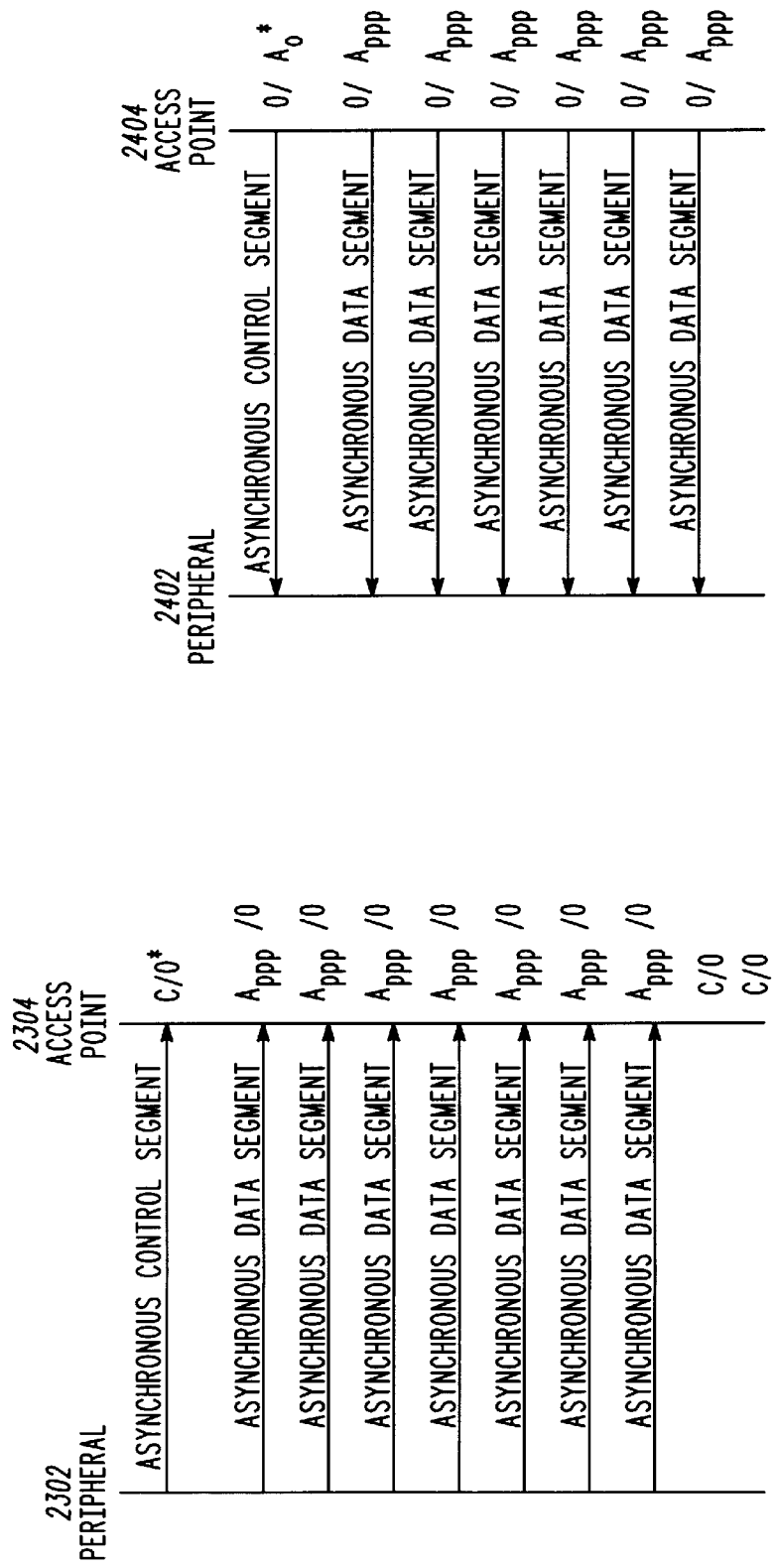

* DENOTES THE BLOCKS SOURCE/DESTINATION ADDRESS. "0" SIGNIFIES THE NULL ADDRESS
** A SPECIAL SUB-ADDRESS IS ASSIGNED TO EACH ISCHRONOUS CONNECTION

* DENOTES THE BLOCKS SOURCE/DESTINATION ADDRESS. "0" SIGNIFIES THE NULL ADDRESS

METHOD ACCESS POINT DEVICE AND PERIPHERAL FOR PROVIDING SPACE DIVERSITY IN A TIME DIVISION DUPLEX WIRELESS SYSTEM

RELATED APPLICATIONS

The present application is related to the following applications which are incorporated herein by reference: U.S. patent application Ser. No. 08/953,948, NETWORK PROTOCOL METHOD, ACCESS POINT DEVICE AND PERIPHERAL DEVICES FOR PROVIDING FOR AN EFFICIENT CENTRALLY COORDINATED PEER-TO-PEER WIRELESS COMMUNICATIONS NETWORK, by Mark Cudak, Bruce Mueller, James Kelton, and Brian Keith Classon, which is being filed concurrently on Oct. 20, 1997, and which is assigned to Motorola, Inc. and U.S. patent application Ser. No. 08/954,455, METHOD, ACCESS POINT DEVICE AND PERIPHERAL DEVICES FOR LOW COMPLEXITY DYNAMIC PERSISTENCE MODE FOR RANDOM ACCESS IN A WIRELESS COMMUNICATION SYSTEM, by Mark Cudak and Michael David Pearce, which is being filed concurrently on Oct. 20, 1997, and which is assigned to Motorola, Inc.

FIELD OF THE INVENTION

The present invention relates to time division duplex wireless communication systems, and in particular, to space diversity in a time diversity duplex system.

BACKGROUND OF THE INVENTION

In time-division duplex (TDD) wireless communication systems, a bi-directional communication path is established between two sites, each of which has a transmitter and receiver, and wherein the two transmitters are synchronized so that only one is transmitting an information signal at any time. A TDD system may includes a central access point device, typically with a transmitter and a receiver. The access point establishes a communication link with one or more peripheral devices located within the range of the central site. The peripheral devices typically are transceivers (single unit transmitter/receivers), each of which has a single transmit/receive antenna, although some radios may have separate antennas for transmission and reception.

TDD systems may operate in an environment which is characterized by the existence of multiple signal paths between the transmitter and receiver due to reflections from objects. This multipath propagation introduces fluctuations in the carrier signal amplitude and phase which can distort information contained in the carrier signal modulation. The distortion may result from the thermal noise susceptibility or phase transitions which are associated with amplitude minima, or from signal spectrum nulls separated from the carrier frequency. The separation is inversely related to the differences in arrival time among the multiple signal paths. When the TDD system operates in a localized area, e.g., within a building or home, the nulls occur at frequencies which are more widely separated from the carrier. However, even the most widely-separated nulls may be significant when the modulation spectrum is determined by a high data rate source of multimedia information.

The use of space diversity enables more robust operation in an environment characterized by multipath propagation. Thus there is a need for a method, access point device (e.g., central site) and peripheral device (e.g., a transportable selective radio device) for providing space diversity in a time division duplex system.

BRIEF DESCRIPTION OF THE DRAWINGS

FIGS. 9–29 provide illustrations in accordance with a preferred embodiment of the present invention.

DETAILED DESCRIPTION OF A PREFERRED EMBODIMENT

The present invention combines a fast automatic repeat request (ARQ) protocol with transmit diversity to provide robust operation in an environment characterized by multipath propagation. The ARQ protocol is a transmit and wait (for the acknowledgement) scheme. If a data block, sometimes referred to as a packet, is received in error, or a transmitted data block is not acknowledged, then the transmitter is switched to the other antenna. If no error occurs, then the current antenna is retained. Since the system is has a TDD radio frequency (RF) link, the space diversity antenna configuration only needs to be implemented at one end (typically the controller or fixed location end which is designated herein as the "access point device") because transmission and reception occurs on the same frequency and transmitting and receiving antenna patterns are equivalent. Using this scheme, it is not necessary to know whether the error was caused by microwave interference or multipath propagation. If the error was caused by microwave interference, changing to another transmit antenna will not help, but more importantly, it will not hinder the ARQ protocol in its efforts to avoid this interference. If the error was caused by multipath propagation, then it is likely that changing the antenna location or pattern will improve the signal quality, thereby increasing the opportunity for the data block to get to its destination. The fact that the source of the error does not need to be identified means that the present invention's scheme is readily implementable in hardware, thus providing a low cost solution. Additionally, when significant scattering occurs in the vicinity of the antenna, phased array diversity is an effective and inexpensive means for implementing space diversity. With phased array diversity, the second antenna is never connected to the transceiver, but rather is grounded or unconnected. When the second antenna is grounded, the combined antenna array pattern is modified due to the effect of mutual coupling on the antenna currents and the relative amplitude of the multipath propagation components is altered so that the likelihood of an improved signal quality is increased. Hence, the present invention provides a lowest cost diversity solution that is ideal for the price-sensitive consumer market.

Figure 1:
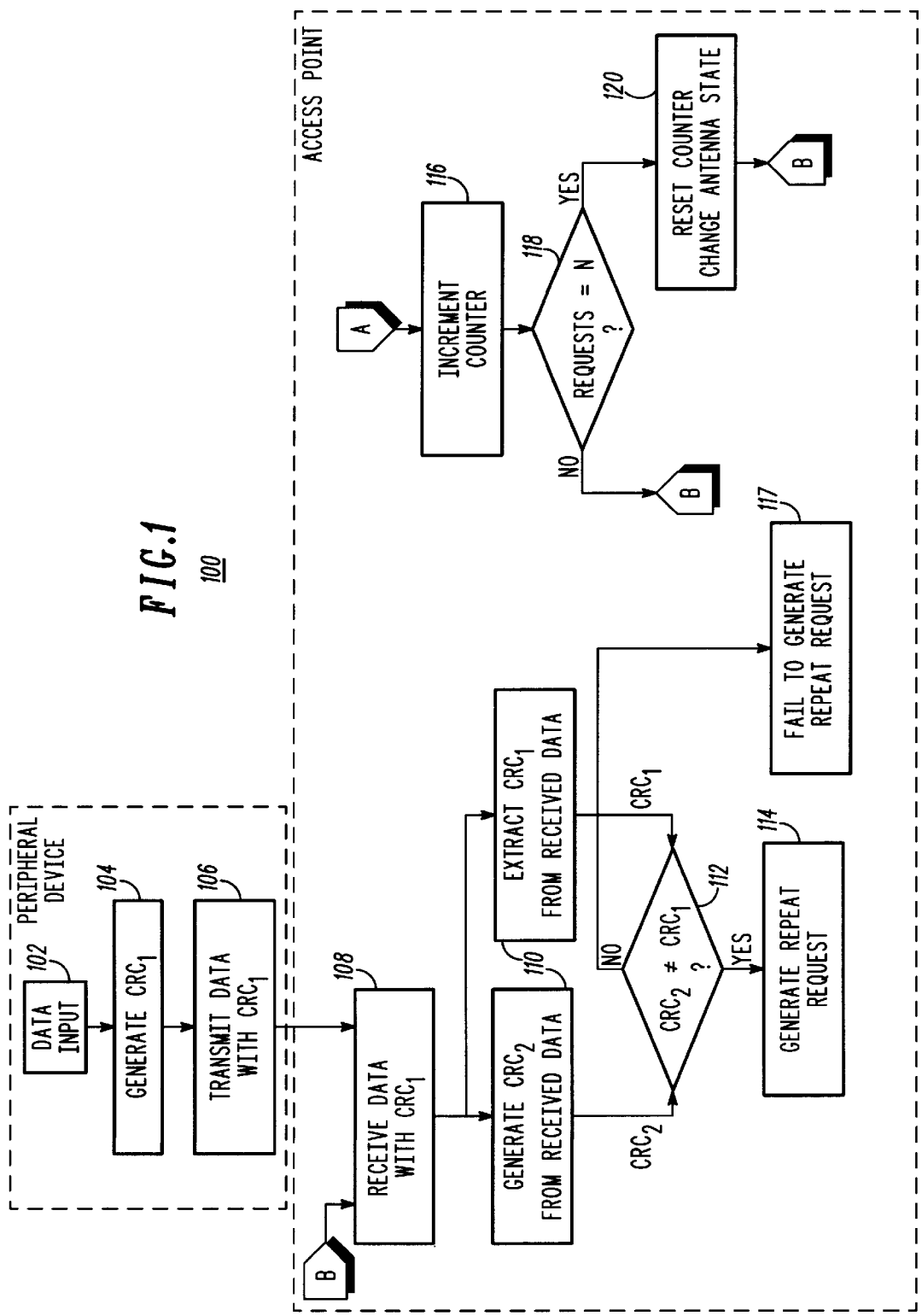
FIG. 1 is a flow chart showing one embodiment of steps of a method in accordance with the present invention.

FIG. 1, numeral 100, is a flow chart showing one embodiment of steps of a method in accordance with the present invention. The method is utilized for controlling a space diversity switch in a time division duplex system. The method includes the steps of: A) inputting data to a peripheral (102); B) generating a first redundancy check $CRC_1$ in a peripheral (104); C) transmitting the data and the $CRC_1$ by the peripheral (106); D) receiving, by an access point device, the data with the $CRC_1$ (108); E) extracting $CRC_1$ from received data and generating a second cyclic redundancy check $CRC_2$ from received data (110); F) determining whether $CRC_1$ and $CRC_2$ are equal (112), and where $CRC_1$ and $CRC_2$ are equal, failing to generate a repeat request (117); G) where $CRC_1$ and $CRC_2$ are unequal, generating a repeat request (114); H) incrementing a counter (116); I) determining whether a number of requests=N, N a predetermined integer and where the number of requests≠N, returning to step D (118); and J) where the number of requests=N, resetting the counter, changing an antenna state and returning to step D (120).

Figure 2:
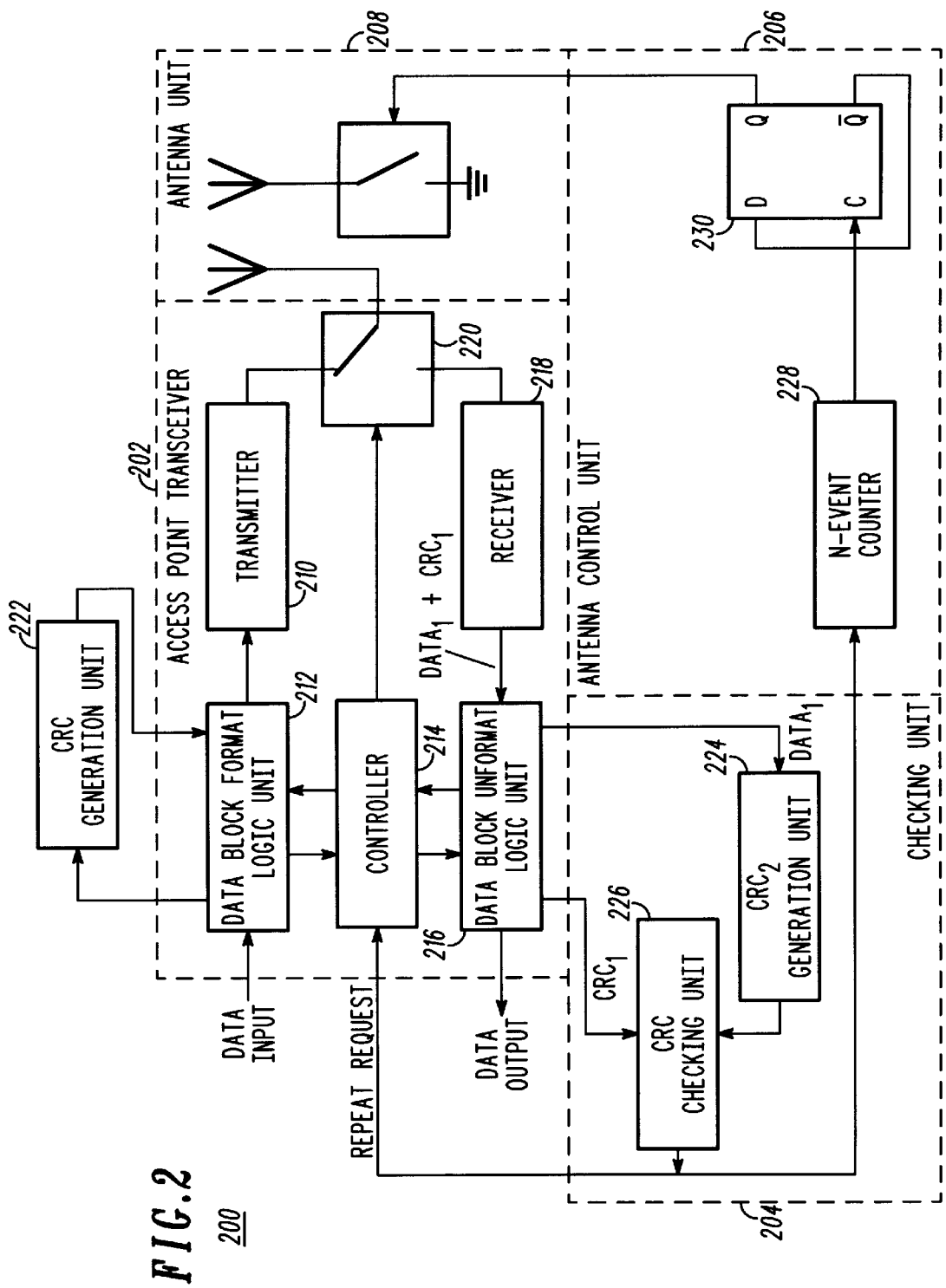
FIG. 2 is a block diagram of one preferred embodiment of an access point device in accordance with the present invention.
Figure 3:
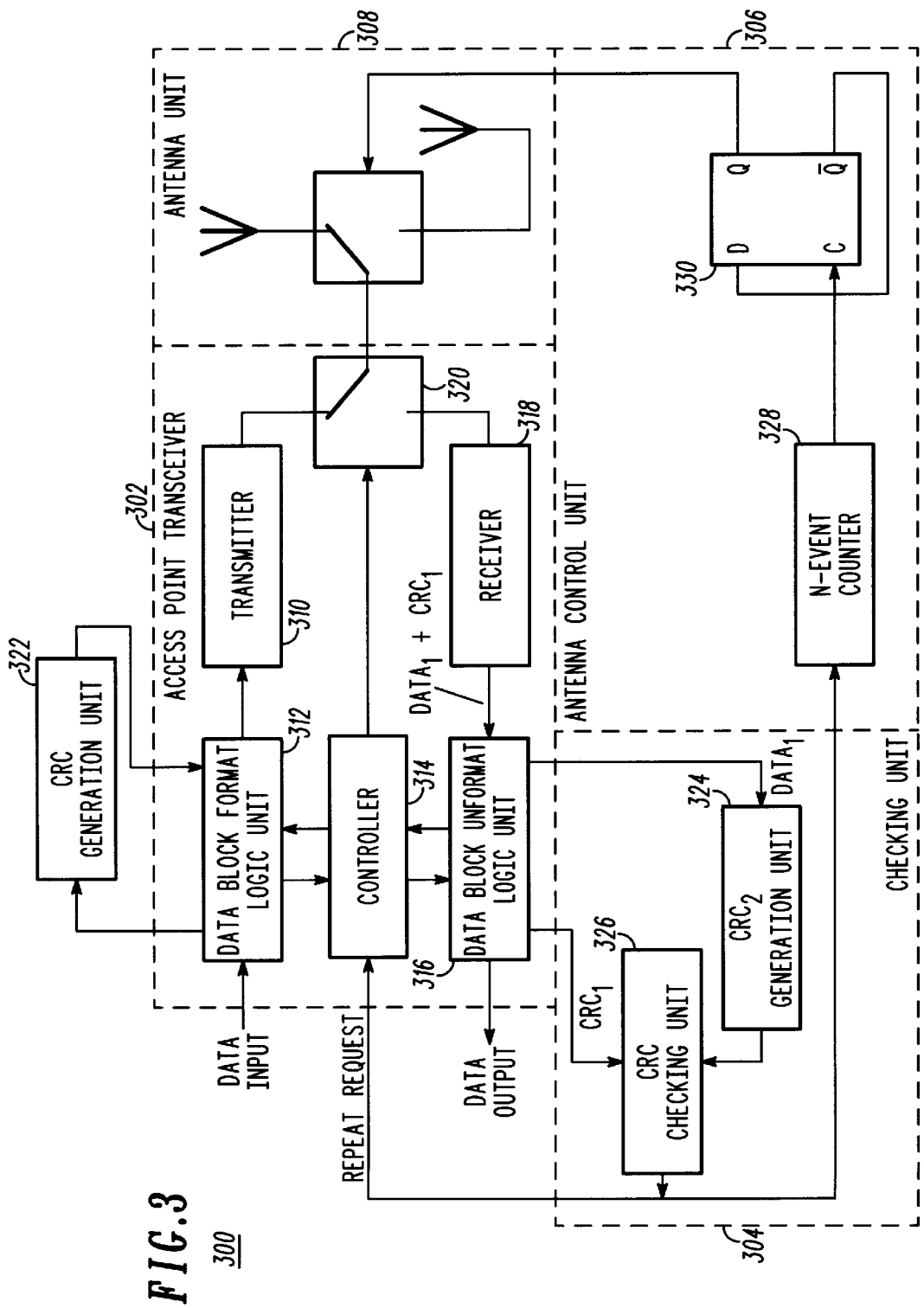
FIG. 3 is a block diagram of another preferred embodiment of an access point device in accordance with the present invention.

FIG. 2, numeral 200, is a block diagram of one embodiment of an access point device in accordance with the present invention. FIG. 3, numeral 300, is a block diagram of another preferred embodiment of an access point device in accordance with the present invention. FIG. 2 shows an embodiment in which a second antenna is grounded, and FIG. 3 shows diversity selection. The access point device is utilized for providing space diversity in a time division duplex system and includes an access point device transceiver (202; 302) an checking unit (204; 304), an antenna control unit (206; 306), and an antenna unit (208; 308).

The access point device transceiver (202; 302) is coupled to receive access point device data input and the checking unit (204; 304) and is utilized for transmitting and receiving time division duplex data. The checking unit (204; 304) is coupled to the access point device transceiver (202; 302) and is used for determining whether to generate a repeat request, as is described more fully below. The antenna control unit (206; 306) is coupled to the checking unit (204; 304). The antenna control unit (206; 306) changes antenna selection based on a predetermined scheme. Two embodiments of configurations implementing the predetermined scheme are shown in elements 206, 306, 506 and 606 (see FIGS. 2–3 and 5–6) and are described below. The antenna unit (208; 308) is coupled to the antenna control unit (206; 306) and a time division duplex switch in the access point transceiver (202; 302) for communicating with a peripheral device.

The access point transceiver generally includes a transmitter (210; 310), a data block format logic unit (212; 312), a controller (214; 314), a data block unformat logic unit (216; 316), a receiver (218; 318), and a time division duplex switch (220; 320). The transmitter (210; 310) is coupled to a data block format logic unit, and is used for transmitting data. The data block format logic unit (212; 312) is coupled to receive data from a peripheral device and arranges data from the peripheral device into data blocks. The controller (214; 314) is coupled to receive repeat requests, the data block format logic unit (212; 312) and the data block unformat logic unit (216; 316). The controller (214; 314) controls the data block format and unformat processes and the time division switch. The data block unformat logic unit (216; 316) is coupled to the receiver and strips the data and a first CRC from the peripheral device out of the data block. The receiver (218; 318) is coupled to a time division duplex switch (220; 320) and is used for receiving data from the peripheral device. The time division duplex switch (220; 320) is coupled to a transmitter (210; 310) and receiver (218; 318) and is used for directing radio frequency signals to and from the access point device transceiver (202; 302).

Where selected, as shown in FIG. 2 and 3, the access point device may further including a CRC generation unit (222; 322) that is coupled to the data block format logic unit (212; 312) and is used for generating a CRC for the data received from the peripheral device.

The checking unit (204; 304) includes a $CRC_2$ generation unit (224; 304) and a CRC checking unit (226; 326). The $CRC_2$ generation unit (224; 326) is coupled to the data block unformat logic unit (216; 316) and is utilized for generating a second CRC from the data received from the peripheral device. The CRC checking unit (226; 326) is coupled to the data block unformat logic unit (216; 316) and the $CRC_2$ generation unit (224; 324). The CRC checking unit (226; 326) compares the first CRC and the second CRC, outputs a repeat request when the first CRC does not equal the second CRC, and increments an N-event counter (228,328) of the antenna control unit (206; 306).

Figure 5:
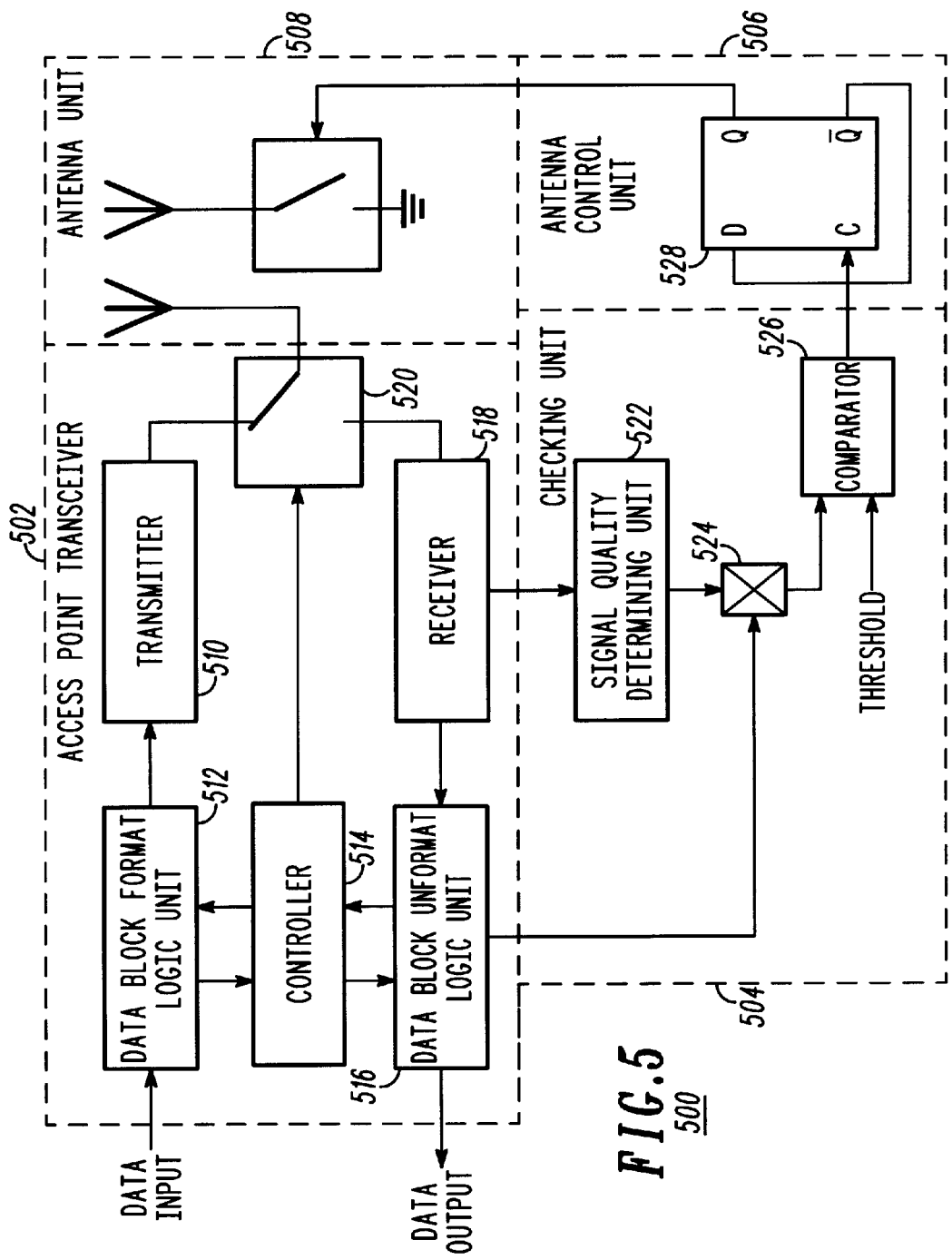
FIG. 5 is a block diagram of another preferred embodiment of an access point device in accordance with the present invention.
Figure 6:
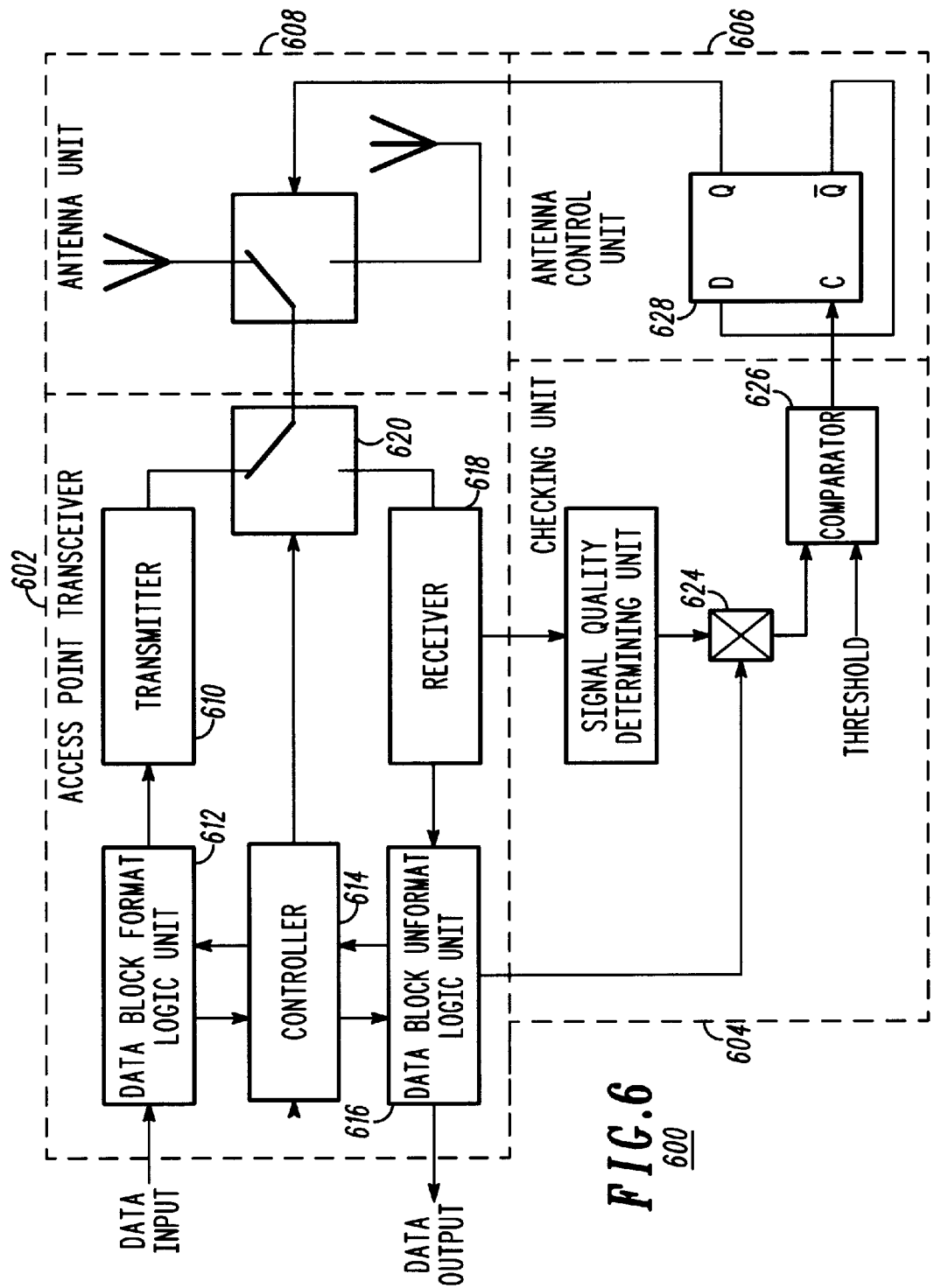
FIG. 6 is a block diagram of another preferred embodiment of an access point device in accordance with the present invention.

As shown in FIGS. 5 and 6, numerals 500 and 600, respectively, in another embodiment, the checking unit (504; 604) includes a signal quality determining unit (522; 622), a transmission gate (524; 624), and a comparator (526; 626). The signal quality determining unit (522; 622), which may determine received signal strength intensity (RSSI), is coupled to the receiver (518; 618) and is used for generating a signal proportional to a received signal. The transmission gate (524; 624) is coupled to the signal quality determining unit (522; 622) and the data block unformat logic unit (516; 616) and is used for sampling signal quality during a data block. The comparator (526; 626) is coupled to the transmission gate (524; 624) and is utilized for determining a signal quality level. Where the signal quality determining unit output level is less than a predetermined threshold, the comparator sends a signal to the antenna control unit (506; 606) to change the antenna state.

In one embodiment, as shown in FIGS 2 and 3, the antenna control unit (206; 306) is an N event counter (228; 328) coupled to receive repeat requests, for counting a number of repeat requests and a first toggle flip-flop (230; 330), coupled to the N event counter (228; 328), for, when a number of repeat request events exceeds N, a predetermined integer, changing an antenna state.

In another embodiment, as shown in FIGS. 5 and 6, a second toggle flip flop (528; 628) is coupled to the comparator (526; 626). When a received signal quality from the peripheral device falls below a predetermined threshold during a data block interval, the second toggle flip flop changes the antenna state.

As shown in FIGS. 2–3 and 5–6, in the access point device, the antenna unit is generally a selectable antenna (308; 608) or a phasing array (208; 508).

Figure 4:
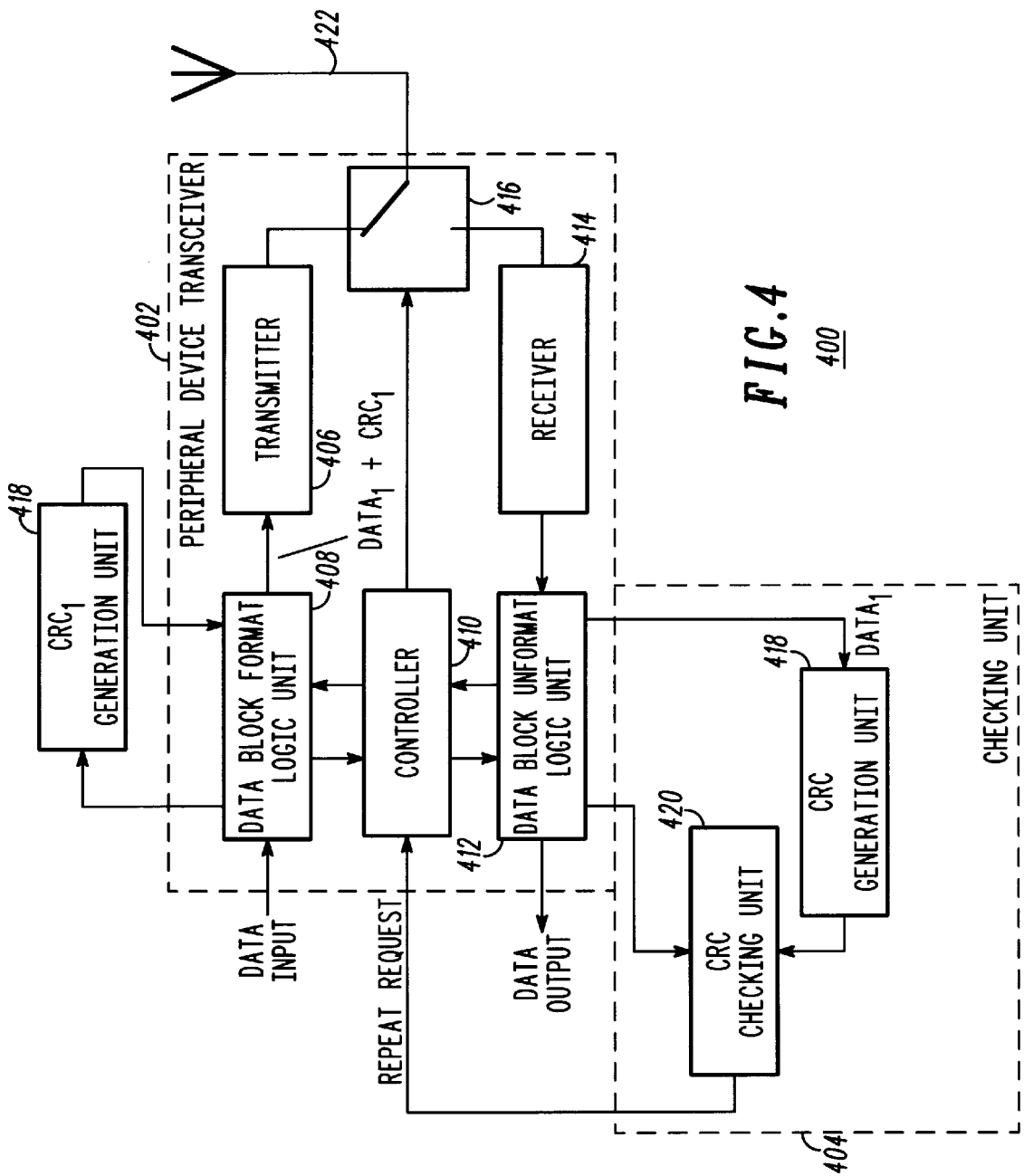
FIG. 4 is a block diagram of a preferred embodiment of a peripheral device for operating efficiently in space diversity in a time division duplex system in accordance with the present invention.
Figure 7:
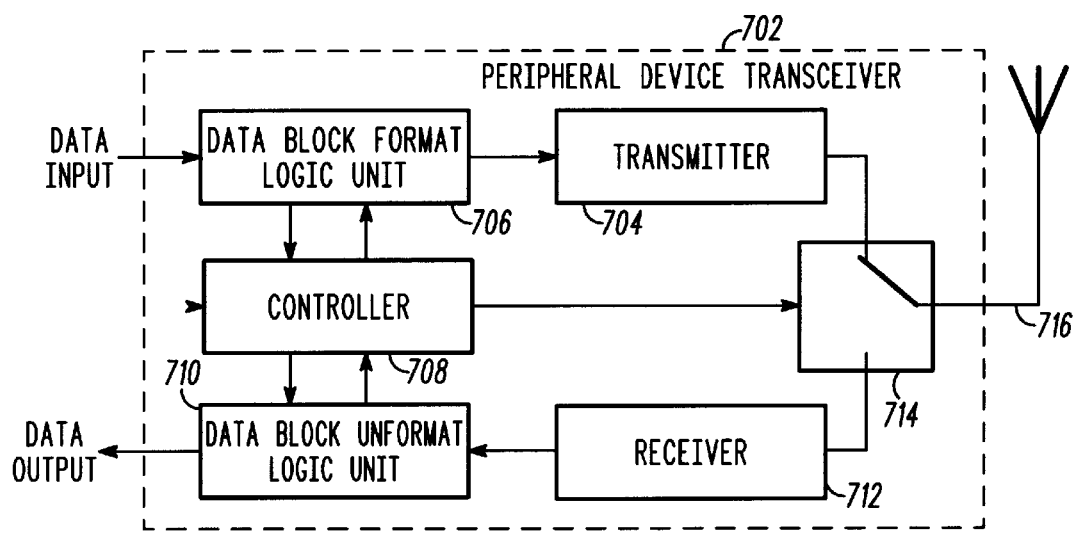
FIG. 7 is a block diagram of another preferred embodiment of a peripheral device for operating efficiently in space diversity in a time division duplex system in accordance with the present invention.

FIGS. 4 and 7, numerals 400 and 700, respectively, are block diagrams of preferred embodiments of a peripheral device for efficiently operating in space diversity in a time division duplex system in accordance with the present invention. The peripheral device includes a peripheral device transceiver (402; 702) and an antenna (422; 716). The peripheral device transceiver (402; 702) is coupled to receive data input and to the antenna (422; 716), and is used for transmitting and receiving time division duplex data. The peripheral device transceiver (402; 702) includes: A) a transmitter (406; 704) that is coupled to a data block format logic unit (408; 706) and is used for transmitting data; B) the data block format logic unit (408; 706) that is coupled to receive data from a peripheral device and is used for arranging data from the peripheral device into blocks; C) a controller (410; 708) that is coupled to receive repeat requests to the data block format logic unit (408; 706) and to a data block unformat logic unit (412; 710) and is used for controlling the operation of the peripheral device transceiver; D) the data block unformat logic unit (412; 710) that is coupled to a receiver (414; 712) and is used for organizing a continuous stream of data into blocks having a predetermined number of bits and adding another predetermined number of control bits; E) the receiver (414; 712) that is coupled to a time division duplex switch (416; 714) and is used for receiving data from an access point device; and F) the time division duplex switch (416; 714) that is coupled to the transmitter (406; 704) and the receiver (414; 712) and is used for directing radio frequency signals to and from the peripheral device transceiver (402; 702). The antenna (422; 716) is coupled to the peripheral device transceiver (402; 702) and is used for communicating with an access point device.

As shown in FIG. 4, the peripheral device may further include a checking unit (404) that is coupled to the peripheral device transceiver (402). In this embodiment the checking unit (404) includes a CRC generation unit (418) and a CRC checking unit (420). The CRC generation unit (418) is coupled to the data block unformat logic unit (412) and generates a cyclic redundancy code CRC from the data input. The CRC checking unit (420) is coupled to the data block unformat logic unit (412) and the CRC generation unit (418). The CRC checking unit (420) compares the CRC generated by the CRC generation unit (418) with a CRC sent by an access point transceiver and is used for outputting a repeat request when the CRC generated by the CRC generation unit is unequal to the CRC sent by the access point transceiver.

The peripheral device further includes a $CRC_1$ generation unit (418) coupled to the data block format logic unit (408) that is used for generating a $CRC_1$ for the data received from an access point device.

Figure 8:
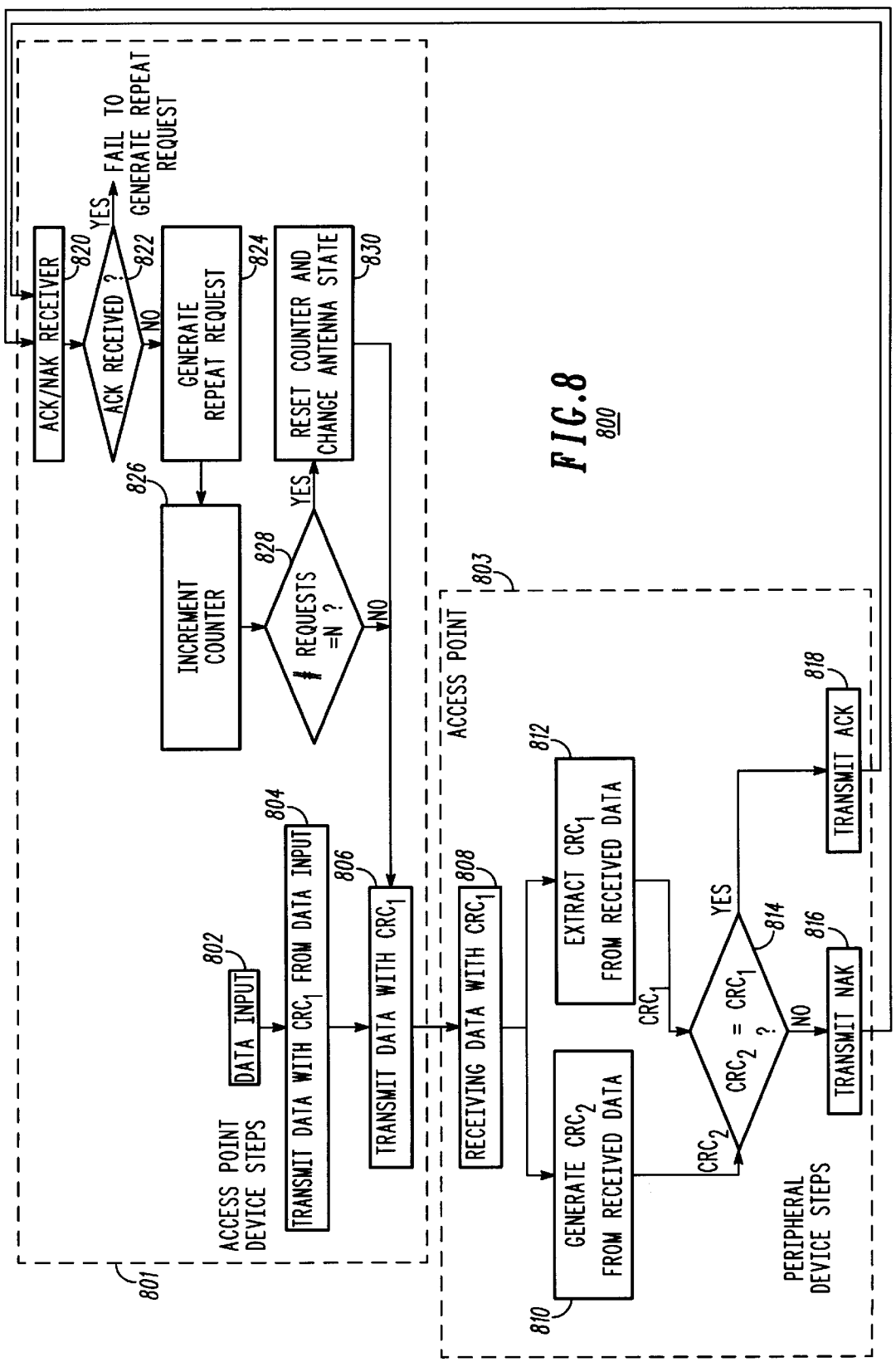
FIG. 8 is a flow chart showing another embodiment of steps of a method in accordance with the present invention.

FIG. 8, numeral 800, is a flow chart showing another embodiment of steps of a method in accordance with the present invention. The method is utilized for controlling a space diversity switch in a time division duplex system. The method includes the steps of: A) inputting data to an access point device (802); B) generating a first cyclic redundancy check $CRC_1$ in the access point device (804); C) transmitting the data and the $CRC_1$ by the access point device (806); D) receiving, by a peripheral device, the data with the $CRC_1$ (808); E) extracting $CRC_1$ from received data (812) and generating a second redundancy check $CRC_2$ from received data (810); F) determining whether $CRC_1$ and $CRC_2$ are equal (814), and where $CRC_1$ and $CRC_2$ are equal, transmitting an acknowledgement (TRANSMIT ACK; 818); G) where $CRC_1$ and $CRC_2$ are unequal, transmitting a negative acknowledgement (TRANSMIT NAK; 816) H) receiving the ACK/NAK at a receiver of the access point device (820); I) determining, by the access point device, whether an ACK or a NAK was received (822); J) where an ACK has been received, failing to generate a repeat request and where a NAK has been received, generating a repeat request (824) by the access point device; K) incrementing a counter (826); L) determining whether a number of requests=N, N a predetermined integer and where the number of requests≠N, returning to step C (828); and M) where the number of requests=N, resetting the counter, changing an antenna state and returning to step C (830).

Peripheral devices may typically be implemented in wireless speakers, cordless telephones, shared printers, networked games, peripheral personal computers (PCs), children's toys, video electrical devices, audio electrical devices, set top boxes and the like.

FIGS. 9–29 provide illustrations in accordance with a preferred embodiment of the present invention. A preferred embodiment of the present invention is described below: The 24 GHz Industrial, Scientific, and Medical (ISM) band is the only frequency band available on a worldwide basis for unlicensed devices, which makes it the ideal choice for consumer in-homer networks. In the U.S. it is governed by FCC parts 15.209, and 15.247. In Europe, ETSIETS 300.328 outlines its requirements. In Japan, RDR STD 33 covers the band. Throughout the rest of the world the ITU has designated this band for common use. The dominant application of this frequency band is for consumer microwave ovens which on one-hand guarantees the continued existence of the band but on the other hand is a significant source of interference. In spite of this challenge, this band provides an opportunity for in-home networks to be developed on one platform for universal deployment, allowing the greatest economy of scale to be leveraged.

Micro-cellular protocols such as DECT and PHS have been suggested for in-home applications and, at first glance, seem suitable with respect to their integral cordless telephone function. However, in addition to the frequency band translations problems involved in moving DECT or PHS to a different band, the DECT and PHS protocols themselves are not conducive to operation in the 24 GHz ISM band. Both PHS and DECT cannot withstand the microwave interference guaranteed to be found in the home environment. Interference aside, these micro-cellular systems contain significant additional complexity to handle community or campus deployment providing for intercell hand-off and roaming capability. Similarly, they are designed to tolerate multi-path distortion present even in their small micro-cell environment significantly larger than an in-home pico-cell. A system designed solely for the in-home single pico-cell environment will be significantly less complex, and can be engineered to provide nearly transparent service in the presence of microwave interference.

The Dynamic Acknowledged Time Division Multiple Access (DA-TDMA) system proposed herein has been designed specifically for in-home networks with a consumer-market based low-cost design philosophy. The system design trades spectral efficiency for a strong signal-to-noise ratio over its pico-cell coverage area, allowing for near error-free transmission in the absence of interference. A low-complexity ARQ has been designed to handle periodic interference from microwave ovens co-resident in the ISM band. The physical layer and data link protocols are realizable in a custom silicon and would only require an 8-bit class microprocessor for configuration and initialization. The system is capable of providing data-rates as high as 1 Mbps (512 Kbps in severe microwave interference) for high performance data applications such as wireless-print sharing while supporting low-cost low-complexity automated appliance applications.

The value of wireless communications is becoming increasingly valuable to consumers. The growth of cellular and cordless telephony, combined with the promise of future high speed wireless data networks, is creating a market for wireless information devices in the home. The growth of computational power in consumer devices has enabled a number of services. Personal computers can now easily manage all of our communications, including electronic mail, voice messaging, call routing and prioritization. Computers are ideal for maintaining the many methods of communication to others, including phone numbers, fax numbers, email addresses, and postal addresses. However, their use for these purposes is inherently limited because the computer is typically located in a remote part of the consumer's dwelling. Set top boxes also hold the capability to provide central communications services in the consumer's living room. However, their utility is also limited because typically their associated television display is located far away from a telephone jack.

This DA-TDMA specification enables the PC and the set-top box to extend their reach into the entire consumer household. A variety of familiar and new devices are enabled, such as advanced cordless phones, handheld browsers, smart children's toys, and cordless printing. Access to data on the home computer as well to the Internet can be seamlessly delivered to devices, while several simultaneous voice conversations are in progress. By utilizing speech recognition/synthesis on a remote computer, voice enabled portable devices may become common. The inherent low complexity of this standard combined with the operation in a worldwide ISM band will allow a significant market volume to drive the devices to lower costs and increasing integration.

Some example products which may be provided with this specification include:

Advanced Cordless Phone—With a moderate phone display, the user may lookup dialing information from a local address book or from an internet-based white pages. Alternatively, voice recognition may be used to dial numbers and perform lookups. While in a call, an automated assistant using voice synthesis may subtly indicate that an important E-mail from your spouse has arrived. Pausing the phone call, you may see the message on the phone display, and if needed, immediately place a second call. Furthermore, voicemail, and email serves on the desktop PC now have the ability to indicate that they have messages waiting by flashing a light on the cordless phone.

Handheld Browsers—A small device, similar to today's W in CE and Pilot devices, may be used for wireless access to local and Internet information. Review of news stories, broadcast entertainment listings, as well as interactive content may be performed in any location of the house. Because the information is presented in a comfortable, appropriate manner, the use of customized information delivery services may significantly increase. Because the complexity of the system is low, special function browsers may be created. Digital receipt books may look up cooking information from local and Internet sources. Remote controls may display the current issue of TV Guide™. An email peripheral may also serve as an electronic Post-It™ note with reminders and tasks listed.

Children's Toys—Both interactive gaming and unique edutaiment devices may reach kids (and adults) who hesitate to sit down before a computer screen. With wireless access to information sources, these devices have a depth, flexibility, and dynamic characteristics beyond what is currently available. For example, an educational toy may present questions based on current news topics, or maybe linked to a recently broadcast program. As the curiosity of the child changes in direction, the device may use different approaches to entertain and educate.

Multimedia Environments—Wireless connectivity to speakers, printers, audio sources also enables new products, such as digital audio players with access to digital content on the internet. The ability to drive printers wirelessly from any of the wireless devices to this network, such as the handheld browsers, children's toys, digital cameras, and other devices provide an ease of use and convenience by eliminating the various cables currently required.

Operation in the 24 GHz ISM band offers the advantage of allowing products to be produced and marketed worldwide with only a few restrictions on power level and channel access methods. However, operating in this freely available band is not without consequences. Consumer microwave ovens radiate a considerable amount of energy in this band. As a result, effective wireless protocols for this band must take this into account.

The microwave oven interference will limit the achievable throughput in this system. Careful examination of the interference waveforms indicates that the microwave is not radiating power all of the time. Since the klystron is active only when the voltage of a half-wave rectified. AC power input is greater than some value, interference is only present in a given 1 MHz channel for 40% or less of the time, with a periodic 60/50 Hz cycle. Depending on the center frequency of the channel, some interference patterns appear as two short spikes (702) at the turn on or off points of the klystron. A spectrum analyzer screen capture shown in FIG. 9, numeral 900, illustrates the interference modes that are commonly seen.

To take advantage of this periodic interference, the DA-TDMA protocol operates in the gaps between interference bursts. The small block size enables transmission of several blocks between the bursts of microwave interference. When the interference is present, error detection CRCs and a fast ARQ enable the system to repeat blocks to maintain reliable, low error rate links. An illustration of this operation is seen below. Because the interference from the microwave may persist for some time, isochronous traffic will need to be buffered because communications may be interrupted for up to 6 milliseconds.

From the start, DA-TDMA was designed to meet the goals of low complexity and high performance while using frequency hopping in the 24 GHz band with microwave interference. The combination of small block size, time division duplexing and stop-and wait ARQ achieve these goals and enable significant system throughput. The small block size (0.75 milliseconds) easily utilizes the interference free time on the channel. Time Division Duplexing (TDD) will allow the bandwidth to be dynamically allocated between uplink and downlink directions. A central scheduler efficiently allocates bandwidth to isochronous and asynchronous connections. Stop and wait ARQ provides a simple, effective method to provide reliable transmission of the bursts in a low complexity realization.

Figure 10:
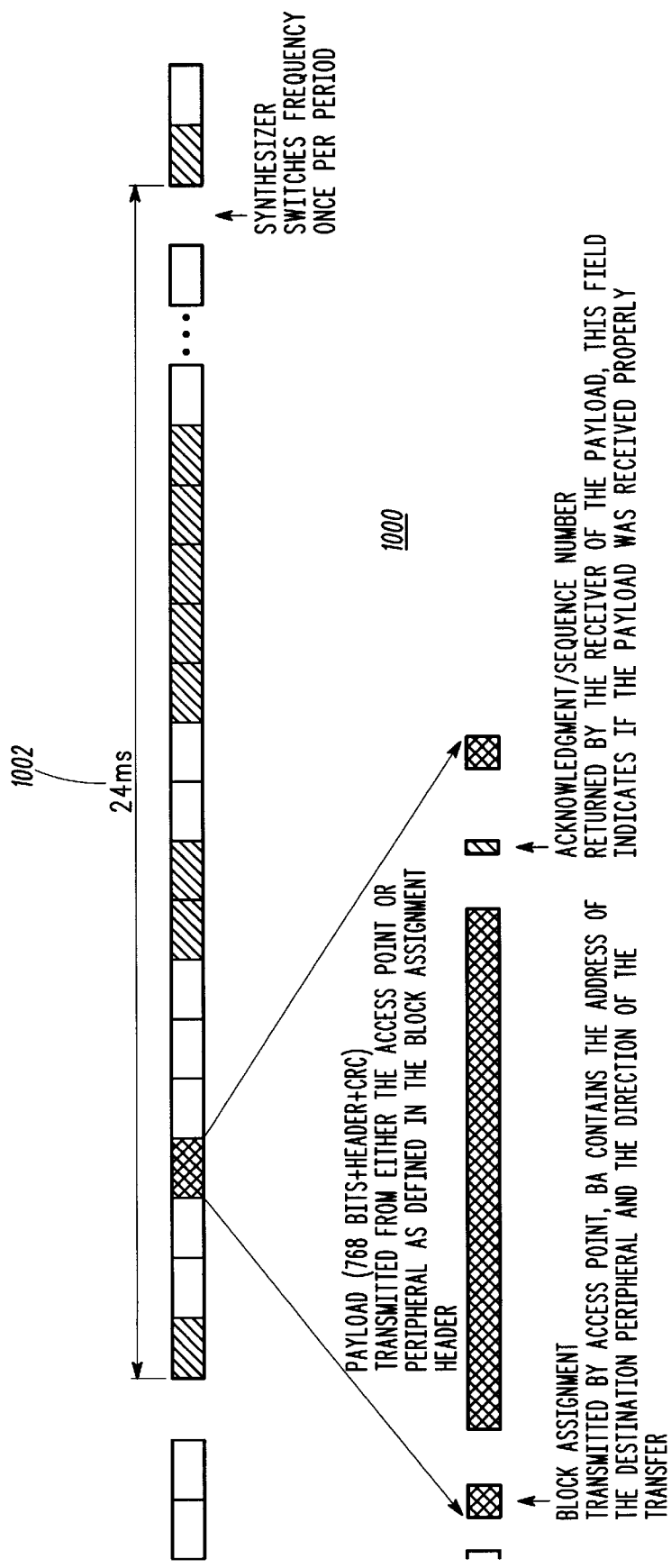

An illustration of the frame and block diagrams is shown in FIG. 10, numeral 1000. Each square in the frame diagram represents a unit of transport, called a block. Each frame lasts for 24 milliseconds, and contains a 32 block times. Each frame (1002) is transmitted on a single frequency, and during the $32^{nd}$ block, the frequency is changed (or hopped) to the next channel. The channel data rate is 1.544 Mbps. Each block can sustain a 32 kbps throughput, yielding a 0.992 Mbps system throughput. In the presence of microwave interference, sustainable throughput is expected to be 512 kbps or greater. Up to 384 kbps may be reasonable assigned to isochronous traffic, with the remainder being available to asynchronous traffic.

Each block is 0.75 msec long and contains a block assignment, block data, and block acknowledgement. The block assignment is transmitted by the scheduler with synchronization and addressing information to direct the appropriate wireless peripheral to transmit or receive during the payload and acknowledge times. The block payload contains a synchronization word, system control header, sequence number, and 96 bytes of payload. The block acknowledge field represents the outcome of the reception of the payload (positive/negative) and the sequence number from the block data. A 32 microseconds guard time between these block elements minimizes the RF cost by allowing reuse of receiver and transmitter elements.

The scheduler will automatically retry blocks which do not receive a positive acknowledgement. The short packets that overlap microwave interference will be detected and the blocks repeated. In this environment, the ARQ is more efficient than Forward Error Correction (FEC). FEC consumes bandwidth, regardless of the interference environment and would probably not be effective in the presence of significant interference in this system. By contrast, ARQ allows only retries blocks which are corrupted by interference, and provides higher throughput during the majority of time that the channel is clear. ARQ is also lower complexity than FEC, needing no special, complex encoder/decoder.

A scheduling algorithm manages isochronous traffic to provide best-effort, delivery in a prearranged time. Using sequence numbers contained in the block data and acknowledgement fields, the scheduler assures that the blocks are transmitted in order, making the reassembly task simple. The minimum scheduling interval is 24 msec. As a result, isochronous data streams will incur a 24 msec buffering delay. Polling is the primary method for transferring information between the base controller and the wireless terminals. This enables very low cost, low power terminal devices. Terminals with a very low demand for information may be scheduled for infrequent polling at multiples of the 24 msec polling interval. Alternatively, un-utilized slots may be marked for contention access to allow terminal registration and for data transfer requests initiated by the terminal. Upon receiving a data transfer request, the central controller schedules a poll to the terminal.

Figure 11:
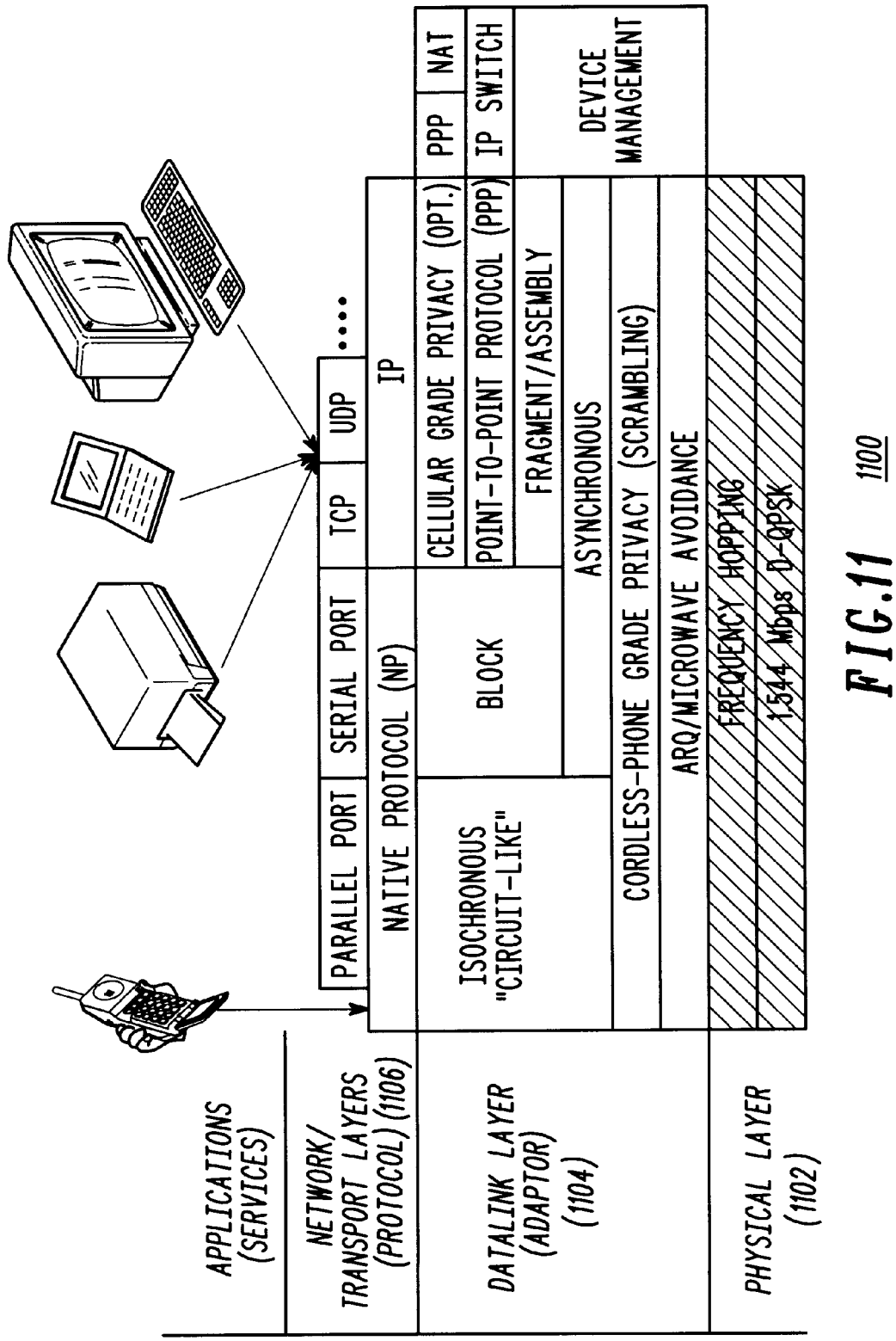

The protocol stack builds on both of the fundamental isochronous and asynchronous services provided by the microwave avoidance scheme and borrows heavily from existing standards for the higher layers. FIG. 11, numeral 1100, illustrates the In-Home RF Bus protocol stack. At the physical layer (1102), a low complexity modulation scheme is employed to provide for low-cost modem designs. Differential QPSK has been identified operating at 1.544 Mbps providing for 3232-kbps isochronous block in a 24 ms frame. Each block in the frame is indistinguishable from the next, further reducing the complexity of the modem. These blocks are the fundamental pieces of the fast-packet ARQ scheme used to avoid microwave interference. Frequency hopping has been super-imposed on top of the frame/block structure in order to comply with FCC regulation for high-power operation and provide multi-user protection in high density urban environments. The system hops at a moderate rate, once every frame (24 ms), allowing for fast synchronization of new devices but without requiring fast synthesizer switching times (<750 ms). One of the 32 blocks is reserved for synthesizer switching every frame.

The datalink layer (1104) implements the microwave avoidance scheme. Unacknowledged blocks are retried until successfully acknowledged or dropped based on criteria of the service being delivered. For isochronous services each block is retried for the duration of an Isochronous Window (IW) which is a period of 24 ms beginning at a particular block in a frame and ending at that same block in the succeeding frame. The limited retry duration bounds the delay to a finite level. For end-to-end synchronous services the receiver may insert dummy bits to maintain bit-count integrity resulting in a information bit-error rate. However, dropped blocks are expected to be very low and error mitigation techniques should allow for a high-quality of service. For asynchronous services each block may theoretically be retried indefinitely since the delay is less critical for these devices. However, practical concerns require a cap, albeit high, be placed on the number of asynchronous retries to handle aberrant events when a peripheral device is out-of-range or shadowed. In an error-free environment 31–32-kbps blocks per frame provide 992 kbps user throughput. At microwave interference duty-cycles of 40% a 512 kbps user throughput may still be realized.

At the network layer (1106), two classes of protocols are defined a Native Protocol (NP) and the Internet Protocol (IP). The NP is intended for the lowest cost devices such a cordless phone with simple numeric displays, wireless extension of parallel/serial ports, or integrated home appliances. Often, devices using NP are fundamentally isochronous and require a low amount of associated data traffic. For example, a cordless phone would only need to communicate key presses to the serving application and receive updates to the alpha numeric display. In other cases, such as a parallel or serial port extender, the device's overlaying data protocol is rudimentary and may be handled in a simple block by block transfer.

For more sophisticated devices such as laptops and a generic information appliance, IP has been adopted to build on the established base of protocols and provide a familiar API to the developer. To support IP, several services are incorporated into the datalink layer (904). A fragment/reassembly service is required to aggregate the physical blocks of 96 ocets each into asynchronous packets capable of carrying the typical IPMTU of 1500 octes. The standard Point-to-Point Protocol (PPP) will reside on top of the asynchronous packets providing for the encapsulation of IP packets and may allow the extension of service to other network protocols in the future. Most importantly, PPP provides a well documented procedure for negotiating network layer connectivity including the options of assigning dynamic IP addresses and using IP heder compression. Other supporting datalink services include IP switching and Network Address Translation (NAT). IP switching is required since logically the network appears as a star configuration with point-to-point links, provided by PPP, to each peripheral device. The base station in this case will be required to map IP address destined for peer device to the physical address of that device. Unlike, traditional Local Area Networks (LANs) the physical address will be hidden from the IP stack eliminating the need for costly broadcast packets used by protocols such as the Address Resolution Protocol (ARP) which maps physical addresses to IP addresses in each client device. The NAP protocol, also referred to as "IP masquerading", will enable the IP administration process to be completely transparent to users and provide compatibility with existing Internet Service Providers (ISPs). The NAT protocol provides an address translation between IP addresses/Port Numbers on a private network to those on the Internet at large. Therefore, an in-home network will present one address to the Internet while maintaining multiple private addresses for the various local wireless peripherals. The split in addressing allows in-home networks to duplicate addresses from one private network to the next without over burdening global Internet and requiring that each consumer obtain a set of IP addresses. Furthermore, one global address is consistent with the services currently being offered ISPs.

The following defines the minimum requirements for devices which inter-operate on the In-Home RF Bus airinterface. The System Architecture provides a functional reference diagram for the system defining he terms for the various devices and interfaces. The Physical Layer (Layer 1) defines the channelization, modulation, frame/block/burst structure, inter-system inference protection and RF transceiver requirements. The Datalink Layer (Layer 2) specifies the multiple access, ARQ procedures, connection establishment, and data transport procedures. The Network Layer (Layer 3) defines the registration, de-registration and service negotiation procedures.

The architecture of the In-Home RF Bus protocol is defined in terms of interfaces, devices, applications, and connections. The interfaces refer to the physical media over which the data is communicated. Devices define the endpoints of the various interfaces. The applications furnish the services provided to registered peripherals. Connections carry the data between a registered peripheral and the serving application.

Figure 12:
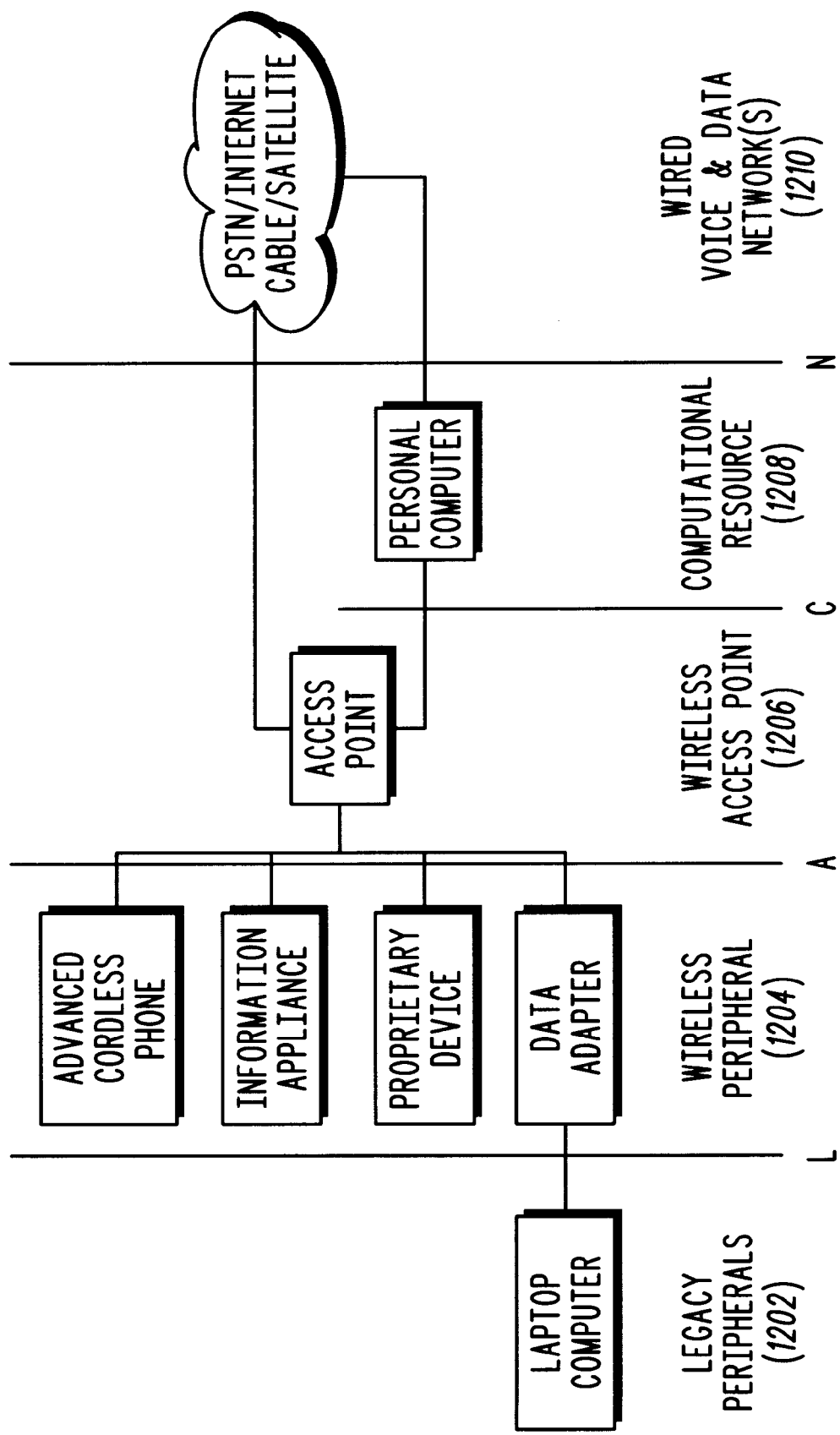

The In-Home RF Bus functional reference architecture is depicted in FIG. 12, numeral 1200. It defines five types of devices-Legacy Peripherals (1202), Wireless Peripherals (1204), Wireless Access Points (1206), Computational Resources (1208), and Wired Voice & Data Networks (1210)—and four interfaces—the Legacy (L), Air (A), Computational (C), and Network (N).

Legacy peripherals (1202) cover all devices that have traditionally been wired to a computer such as printers, scanners, and laptops. These devices may be connected by an emulated wired interface carried over the A-interface to the personal computer. This emulated interface is referred to a the L-Interface or Legacy-Interface. The L-interface maybe a PCI, RS-232, ISA, or Parallel Port.

Wireless peripherals (1204) cover all devices that have an integral RF component. These devices may include a advanced cordless phone, an information appliance, or a data adapter to a legacy device. Wireless peripherals communicate in the 24 GHz ISM band to centralized controller called the Wireless Access Point. The wireless peripheral employs applications offered by the wireless system which may be provided at the computational resource, the wired voice and data network, or the Wireless Access Point.

The Wireless Access Point (1206) or simply access point manages the communication link, coordinating the transmission of all wireless peripherals and providing access to both the computational resources and the network. The access point connects to the computational resource over the C-Interface. This C-Interface may take the forms of a USB, PCI, ISA, or Device Bay. Alternatively, the G-Interface may be maintained over the wireless A-Interface to wirelessly connected computer. In either case, the access point manages access to the computational resource and is aware of all available applications. In addition, the access point may also maintain a connection to wired voice & data network over the N-interface. The N-interface may take on the forms of a POTS modem, ADSI, ISDN, or Cable.

The wired voice & data network (1210) represents a connection to the Public Switched Telephone Network, the Internet, a cable provider, or satellite network.

This description only defines the operation of the A-Interface. It specifies how wireless peripherals communicate with access points and how these wireless peripherals connect to applications. It ensures in interoperability between access points and wireless peripherals created by different manufacturers allowing consumers to buy equipment from multiple sources. It does not dictate the architecture of devices or applications.

For the purpose of this description, Legacy peripherals connected to data ports will not be distinguished from integrated wireless peripherals. The term "peripheral" will refer to both.

All services utilized by peripherals on the In-Home RF Bus are managed by applications. Applications may reside in the access point, the personal computer, a wired network device, or wirelessly connected device. Moreover, applications may be distributed across multiple devices with each device providing a specialized function that enhances the overall application. For example, a POTS application provides connectivity to the PSTN but may also rely on the personal computer for voice enhanced features and the Internet for directory look-up. The peripheral, however, perceives all applications and their features to reside within the access point. The access point is responsible for maintaining this appearance and must coordinate a peripheral's connection to a distributed application.

Figure 13:
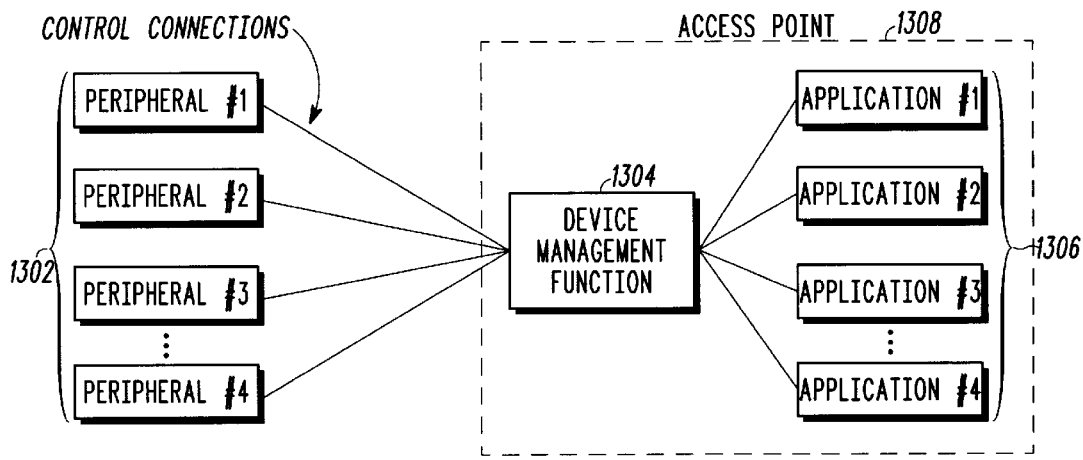

FIG. 13, numeral 1300, shows a Logical Reference Architecture that illustrates the conceptual architecture of an access point. Each line in the figure denotes the logical connections in the system. Each logical connection on the A-Interface corresponds to a unique physical layer subaddress (see below with respect to Addressing). At initial system access, all peripherals (1302) are given a default logical connection, called the "control connection", to the access point's (1308) Device Management Function (DMF; 1304). The DMF is a special application responsible for maintaining radio link with all peripherals and managing all subsequent connections within the system. Furthermore, the DMF must account for all applications (1306) in the system routing application specific information transmitted on the control connection to the appropriate application.

Figure 14:
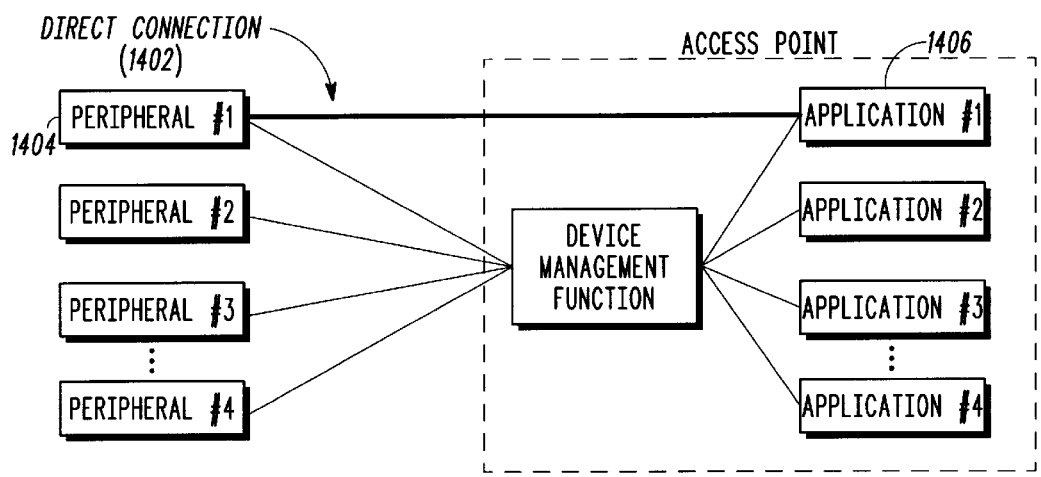

The control connection provides the fundamental link for a peripheral to access services form the system. At initial system access, a peripheral will first register with the DMF and then begin a service negotiation phase which registers it with each individual application. The registration and negotiation all take place on the control connection. Additional connections, called "direct connections", may be assigned to the peripheral during the registration process or alternatively these connections may be assigned dynamically at a later time. FIG. 14, numeral 1400, illustrates a direct connect (1402) between a peripheral (1404) and an application (1406). These direct connections are used to carry application data which is interpreted solely by the application running in the access point and application's client running in the peripheral. The format of application data is unique to the application. Typically, all asynchronous direct connections are assigned during the registration process while all isochronous direct connections are assigned dynamically. The control connection is always maintained.

Peripherals that wish to connect to the wired voice and data network must always go through an intermediate application. Two default applications are defined for this purpose, the POTS application and the PPP application.

Figure 15:
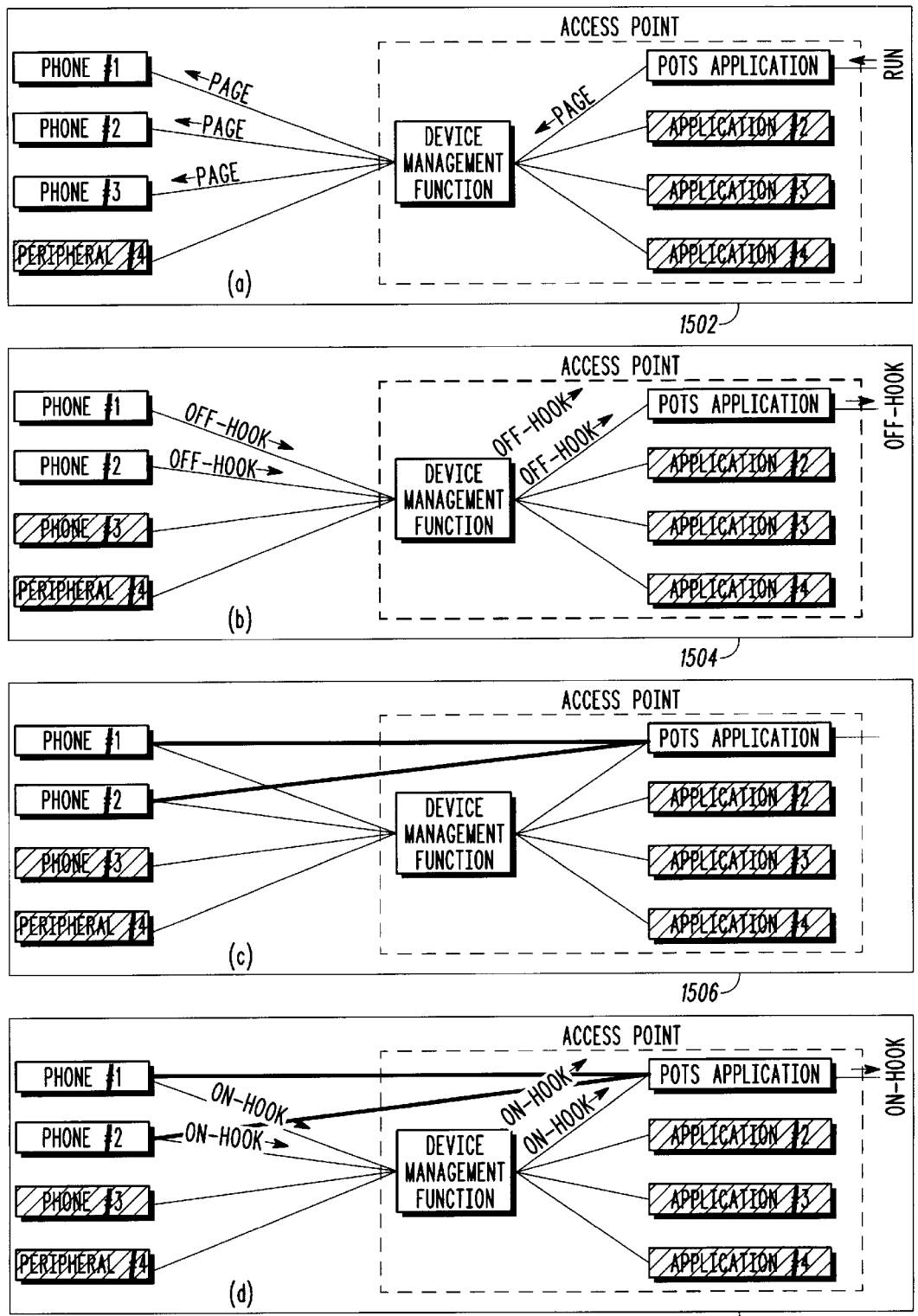

The POTS application connects advanced cordless phones and similar peripherals to the PSTN making use of isochronous connections in the system. As shown in FIG. 15, numeral 1500, to illustrate how connections may be assigned, it useful to examine how an incoming call is handled by the system. FIG. 15 (a; 1502) illustrates a system with three cordless extension phones. When a incoming call arrives from the PSTN, the POTS application pages each connected peripheral in the system via the DMF over the control interface. The DMF is aware of the standby mode of each peripheral and transmits the page when the device is listening. In the example, two people pick up two different peripherals to answer the call. These two peripherals send an off-hook indicator on the control interface along with a request for a direct isochronous connection to the application (b; 1504). Upon connecting the application would sum the audio from both peripherals and route the composite audio signal to the PSTN (c; 1506). At the end of the conversation, an on-hook indicator is sent on the control interface by both peripherals requesting the direct isochronous connection to be discontinued (d; 1508). The DMF would interpret a portion of the on-hook indicator and terminate the direct isochronous connections.

The PPP application connects information appliances and similar devices to the wired data network and provides IP connectivity to local peripherals. The PPP application is based on the Internet Standard RFC 1661. "The Point-to-Point Protocol" and treats peripheral's direct connection to the PPP application as a dedicated point-to-point connection. The PPP application terminates all PPP connections and therefore must understand the network protocols encapsulated. At a minimum, a compliant PPP application must support the Internet Protocol (IP). IP can be used to connect the peripheral to the Internet at large, or simply, two peripherals over the A-Interface. For example, two laptop computers may be networked using IP. Unlike the POTS application, the PPP application assigns its direct connections during the service negotiation phase. Once assigned, the PPP connection is maintained indefinitely. The DMF participates in an asynchronous transfer and is responsible for allocating bandwidth for uplink traffic and scheduling downlink traffic with respect to standby modes. On the uplink, the initial block of asynchronous transfer is transmitted over the control connection containing the length of the transfer and address of the connection. Since the connection has already been established at registration, the DMF can quickly route the data to the PPP application and allocate the bandwidth as requested on the direct PPP connection. Likewise on the downlink, the initial block is transmitted over the control connection during a paging interval to announce an impending packet. Once the peripheral is known to be listening the remainder of the transfer is transmitted on the direct PPP connection.

The precise addressing of connections is defined below. Addressing isochronous and Asynchronous connections as well the registration process are defined in below with respect to Connections.

The A-Interface operates in the 24 GHz ISM band employing a form of Dynamic Acknowledged-Time Division Multiple Access (DA-TDMA) and Time Division Duplexing (TDD). Unlike traditional TDMA, the system dynamically assigns a blocks of time as opposing to the periodic assignment of blocks into timeslots. Furthermore, each block is immediately acknowledged. Both Isochronous and Asynchronous traffic is supported. The maximum data-rate provided to either traffic is 992 kbps with a fundamental data-rate of 32 kbps. Slow-frequency hopping is used to mitigate inter-system interference hopping at a rate 41.67 hops per second.

This description defines the details of the physical layer. The Channel Access Strategy defines the Channelization of the ISM band the modulation technique. The 3.22 Frame and Block Structure defines the format of the DA-TDMA/TDD channel. The Multi-System Interference details the frequency hopping method, scrambling, and color coding. The RF Transceiver Requirements defines the minimum requirements of the transceiver including sensitivity and spurious emissions.

The A-Interface divides the ISM band into 95 1 MHz channels with each channel carrying a 1.544 Mbps modulated signal.

Channels are numbered from 0 from 94. Channels are 1 MHz wide with centers space 1.0293 MHz (exactly 2*1.544/3 MHz) apart. The center of channel 0 is at 2401.6919 MHz (exactly 9333*1.544/6 MHz). The center frequency for channel η is given exactly by the following formula:

$$f(n) = \frac{1.544}{6}(4n + 9333) \text{ MHz} \quad 0 \leq n \leq 94$$

In most countries regulations exist which allow only a subset of these channels to be used. See the description on frequency hopping for details regarding the use of channels.

Figure 16:
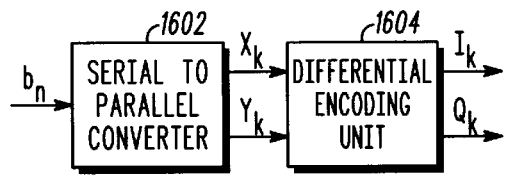

Both the access point and the peripheral employ p/4 shifted differential quadrature phase shift keying (p/4-DQPSK) modulation. A full raised cosine pulse shaping filter shall be employed with a bandwidth expansion factor of 0.25. A block diagram of the modulator is shown in FIG. 16, numeral 1600.

The serial-to-parallel converter (1602) accepts a serial bit-stream and converts this to the bit sequence pair $X_k$, $Y_k$ where $X_k$ is formed from the odd numbered bits of each field and Yk is formed from the even numbered bits. The first bit of each field is bit 1 and is therefor an odd bit. The differential encoding unit (1604) performs differential encoding as:

$$I_k I_{k-1} cos[\Delta \Phi(X_k, Y_k)] - Q_{k-1} sin[\Delta \Phi(X_k, Y_k)]$$

$$Q_k I_{k-1} cos[\Delta \Phi(X_k, Y_k)] - Q_{k-1} sin[\Delta \Phi(X_k, Y_k)]$$

Symbols are transmitted with the phase changes shown in Table 1, which defines DF in the above equation.

TABLE 1

| Modulator phase transitions for all input patterns | | |
|---|---|---|
| $X_k$ | $Y_k$ | $DF(X_k, Y_k)$ |
| 0 | 0 | +p/4 |
| 0 | 1 | +3p/4 |
| 1 | 1 | −3p/4 |
| 1 | 0 | −p/4 |

The impulse sequences $I_k$ and $Q_k$ are filtered by a linear phase Nyquist pulse shaping filter to form the continuous signals i(t) and q(t). The filter shall be a full raised cosine filter with a 25% bandwidth expansion factor. The frequency response for this filter is given by.

$$|H(f)| = \begin{cases} 1 & |f| < (1-\alpha)/2T \\ \frac{1}{2}*(1-\sin[(2fT-1)p/2\alpha]) & (1-\alpha)/2T <= |f| < (1+\alpha)/2T \\ 0 & |f| = > (1+\alpha)/2T \end{cases}$$

where T is the symbol period and a is the bandwidth expansion factor of 0.25.

The transmitted signals (t) is derived from i(t) and q(t) through quadrature modulation of a carrier given by the following:

$$s(t)=i(t)*cos(\omega_c t)-q(t)*sin(\omega_c t)$$

where $w_c$ is the RF carrier frequency. The channel bit rate of 1.544 megabits per second corresponds to a symbol rate of 772 kilosymbols per second.

Figure 17:
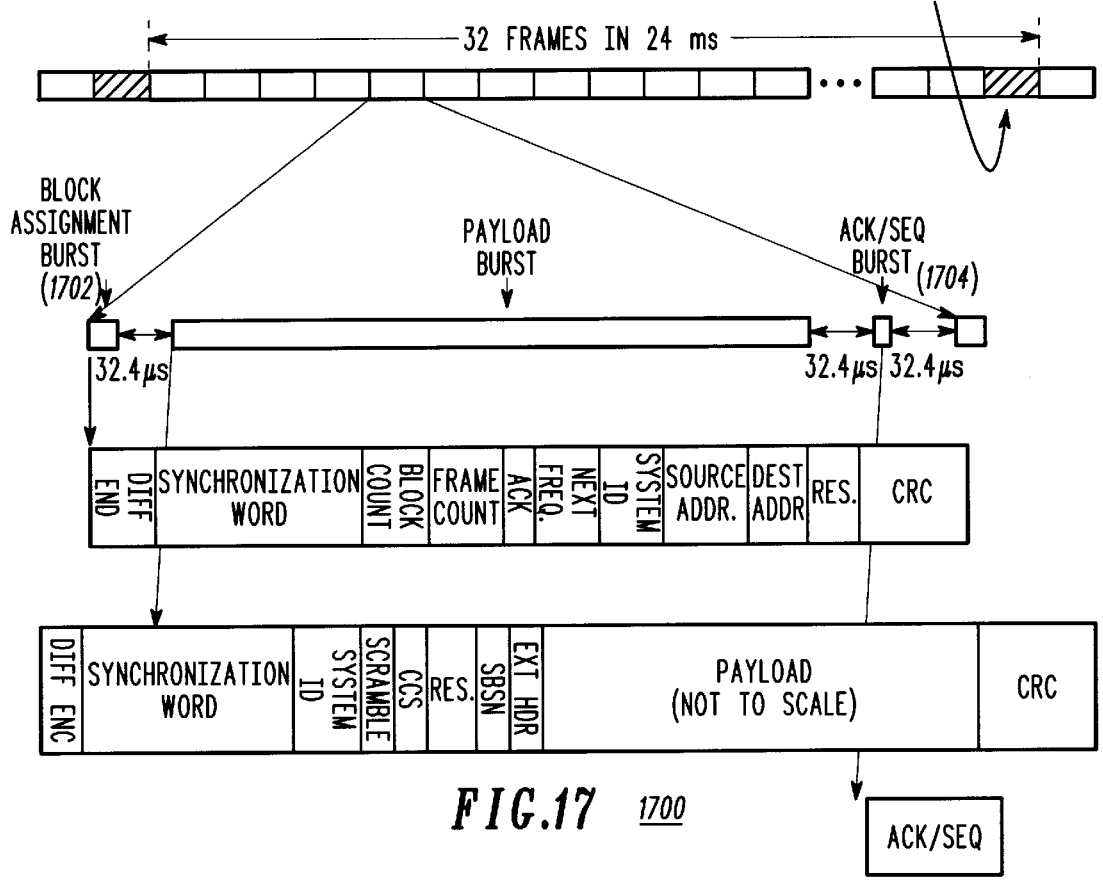

The DA-TDMA/TDD channel is sub-divided into blocks of time called transaction blocks. Each transa the Payload burst which is transmitted by either a peripheral or the access point. The last burst is the Acknowledgement/Sequence Number (ACKSEQ) which, when transmitted, is transmitted by the peripheral. Thirty-two transaction blocks are grouped into a 24 millisecond frame. Frames are number from 0 to 524287. Transaction blocks are number from 0 to 31. FIG. 17 numeral 1700, Frame, Block, and Burst Formats, illustrates the DTDMA/TDD format. The fields within the Block Assignment Burst, Payload Burst (1702) and Acknowledgement/Sequence Number burst (1704) are defined below.

The BA burst enables the dynamic allocation and duplexing features of the DTDMA/TDD channel, assigning both the source and destination device at the beginning of each block transaction. The source and destination address fields may either specify an access point or peripheral enabling downlink (access point to peripheral), uplink (peripheral to access point), or peer-to-peer (peripheral to peripheral) transfers. In addition, the BA field contains general broadcast information to identify the system, the current transaction block, the current frame, and the RF channel of the next frame. Finally, the acknowledgement value, received from the destination peripheral in the previous frame, is repeated as part of the BA field. The addresses, broadcast information, and acknowledgement fields are all protected by a 24-bit CRC. Furthermore these protected fields are preceded by differential encoding reference symbol (2-bits) and a synchronization word (32-bits). Table 2 defines the order and the content of the fields within the BA burst.

TABLE 2

Block Assignment Burst Fields

| Fields | Description | Bit Indices (begin/end) | | Length |
| --- | --- | --- | --- | --- |
| Differential Encoding Reference Symbol | Provides a reference for the differential modulation. | 0 | 1 | 2 bits |
| Synchronization Word | The sync word is the following binary value %00000101111101011100100111000110.[1] | 2 | 33 | 32 bit |
| Block Count | Specifies the number of the current block. It is incremented sequentially for each new frame taking on the values 0 through 31. | 34 | 34 | 5 bits |
| Frame Count | Specifies the number of the current frame. It is incremented sequentially for each new frame taking on the values 0 through 524287. It will not repeat for at least 3.5 hours. | 35 | 46 | 19 bits |
| Acknowledgement | Status of the transfer in the previous transaction block. Set to 1 if it was successful and set to 0 if it was not. | 47 | 58 | 1 bit |
| Next Frequency | Specifies the channel of the next frame. | 59 | 66 | 7 bits |
| System ID | A short ID, selected by the access point upon power-up, used to distinguish the system from it's neighbors. | 67 | 85 | 8 bits |
| Source Address | The address of the source device and respective connection. | 86 | 90 | 12 bits |
| Destination Address | The address of the destination device and respective connection. | 91 | 97 | 12 bits |
| Reserved | Reserved field must be encoded as 0. | 98 | 107 | 10 bits |
| CRC | See Section 3.2.2.2 Error Detection | 108 | 131 | 24 bits |

[1]The maximum sidelobe of the out-of-phase auto-correlation and the merit factor, a function of the sum of the squares of the out-of-phase auto-correlation, are commonly used to determine good synchronization words. The binary sequence %00000101111101011100100111000110 minimizes the maximum sidelobe and maximizes the merit factor over all 32-bit sequences, where only even (symbol) phase auto-correlation are considered.

The Payload burst carries both the control and user information in the system. The preceding BA burst specifies the source and destination device. The source device transmits the payload burst while the destination device receives it. The payload burst is 838 bits long and carries a 768 bit (96ocet) data field for control and user information. The data field is preceded by a header field made up a System ID, Scramble Mode, Control Connection Status, Reserved bits, Sub-address Block Sequence Number (SBSN), and Extended Header Indicator. Bursts sent on the control connection extend the header by 4 octets into the data field. The control connection extended header is defined in section 3.3.1.2. The header and data fields are protected by a 24-bit CRC. Like the BA burst, the protected fields are preceded by a differential reference symbol and synchronization word. Table 3 defines the order and the content of the fields within the payload burst.

changed. The three codewords for each color code are given in Table 4 below. Each codeword is immediately preceded by a differential encoding symbol.

TABLE 3

Payload Burst Fields

| Fields | Description | Bit Indices (begin/end) | | Length |
|---|---|---|---|---|
| Differential Encoding Reference Symbol | Provides a reference for the differential modulation. | 0 | 1 | 2 bits |
| Synchronization Word | The sync word is the following binary value %00000101111101011100100111000110. | 2 | 33 | 32 bit |
| System ID | A short ID identical to the field in the previous BA burst. | 34 | 41 | 8 bits |
| Scramble Mode | Specifies whether the remaining fields in the burst are scrambled by a pseudo random sequence. A value of 1 indicates that the fields are scrambled. | 42 | 42 | 1 bit |
| Control Connection Status | Specifies whether the source peripheral requires a control block. A value of 1 indicates a control message is pending. This field is not valid when the source device is an access point. | 43 | 43 | 1 bit |
| Reserved Bits | Must be encoded as 0. | 44 | 44 | 4 bits |
| SBSN | Sub-address Block Sequence Number | 45 | 48 | 1 bit |
| Extended Header | Indicates that the header is extended into the payload using the 3-octet control connection extended header format. A value of one indicates the header is extended. See section 3.3.1.2 Control Connection Extended Header. | 49 | 49 | 1 bit |
| Data | 96 octets of user data on dedicated connection. (92 octets on a control connection.) | 50 | 817 | 768 bits |
| CRC | See Error Detection | 818 | 841 | 24 bits |

The ACKSEQ burst communicates the status of payload transfer to a peripheral by sending a 32-bit codeword from the peripheral to the access point. For a given system, the codeword can take on the three values ACK-0, ACK-1, or NAK. ACK-0 and ACK-1 correspond to successful transactions, with ACK-0 if the SBSN of the acknowledged payload equaled 0 or ACK-1 if the SBSN equaled 1. If the transfer was not successful, the peripheral transmits a NAK. A NAK is transmitted instead of no response so the receiver will not mistake random noise for an ACK. The access point then uses the ACKSEQ information in it's scheduling algorithm to ensure that appropriate blocks are assigned per connection. The value of the acknowledgment, ACK or NAK, is repeated in the BA burst in the following transaction block.

Between systems, the encoding of the ACKSEQ codeword is colored based on the 5 least significant bits of the System ID defined in the description for Color Coding below. Color coding is used to combat the rare occurrence of an access point interpreting an ACKSEQ burst from a neighboring system's time and frequency aligned peripheral as an ACK from an actively communicating peripheral that went out of range or is momentarily shadowed. 32 color codes ensure that all nearest neighbors can have a different color code.

When the System ID is set, both the access point and peripheral compute and store the ACK-0 and ACK-1 codewords. The access point compares these codewords to the received data to determine if an ACK was received. The peripheral also computes and stores the NAK codeword, and sends ACK-0, ACK-1 or NAK as appropriate. Devices only need to recompute the codewords when the System ID is

TABLE 4

ACKSEQ Codewords

| Color Code | | ACKSEQ |
|---|---|---|
| 0 | SEQ-0 | 11000000110100001010011011111101 |
| | SEQ-1 | 10000000100111110011101101010110 |
| | NAK | 01000000010011110011110110101011 |
| 1 | SEQ-0 | 10101110101101111000001100000001 |
| | SEQ-1 | 11101110111110000001111010101010 |
| | NAK | 00101110001010001011100001010111 |
| 2 | SEQ-0 | 00011100000111101110111010000101 |
| | SEQ-1 | 01011100010100010111000010101110 |
| | NAK | 10011100100000011101011001010011 |
| 3 | SEQ-0 | 01110010011110011100100011111001 |
| | SEQ-1 | 00110010001101100101010101010010 |
| | NAK | 11110010111001101111001110101111 |
| 4 | SEQ-0 | 01111000011100100100011110100001 |
| | SEQ-1 | 00111000001111011101101000001010 |
| | NAK | 11111000111011010111111110011111 |
| 5 | SEQ-0 | 00010110000101010110001001011101 |
| | SEQ-1 | 01010110010110101111111111110110 |
| | NAK | 10010110100010100101100100001011 |
| 6 | SEQ-0 | 10100100101111000000010001011001 |
| | SEQ-1 | 11100100111100111001000111110010 |
| | NAK | 00100100001000110011011100001111 |
| 7 | SEQ-0 | 11001010110110110010100110100101 |
| | SEQ-1 | 10001010100101001011010000001110 |
| | NAK | 01001010010000010000100101110011 |
| 8 | SEQ-0 | 10110000101010110001001011101001 |
| | SEQ-1 | 11110000111001001000111101000010 |
| | NAK | 00110000011010000101001101111111 |
| 9 | SEQ-0 | 11011110110011000011011100010011 |
| | SEQ-1 | 10011110100000011010101010111110 |
| | NAK | 01011110010100110000110001000011 |
| 10 | SEQ-0 | 01101100011001010101100100010001 |
| | SEQ-1 | 00101100001010101000100010111010 |
| | NAK | 11101100111110011000100010000111 |
| 11 | SEQ-0 | 00000010000000100111100111011101 |

TABLE 4-continued

ACKSEQ Codewords

| Color Code | | ACKSEQ |
|---|---|---|
| | SEQ-1 | 0100001001001101111000010100110 |
| | NAK | 1000001010011101010001110111011 |
| 12 | SEQ-0 | 0000100000001001111100111010101 |
| | SEQ-1 | 0100100001000110011011110000111110 |
| | NAK | 1000100010010110110010011100011 |
| 13 | SEQ-0 | 0110011001101110110101110001001001 |
| | SEQ-1 | 0010011000100001010010111100010 |
| | NAK | 1110011011110001111011101000111111 |
| 14 | SEQ-0 | 1101010011000111101110000100110111 |
| | SEQ-1 | 1001010010001000001001011110010 |
| | NAK | 0101010001011000100001100011011 |
| 15 | SEQ-0 | 1011101010100000100111011011000110 |
| | SEQ-1 | 1111101011101111000000000000011010 |
| | NAK | 0011101000111111010011011100111 |
| 16 | SEQ-0 | 00100000001001111100111011010101 |
| | SEQ-1 | 01100000011010000101001101111110 |
| | NAK | 1010000010110001111010110000011 |
| 17 | SEQ-0 | 0100111001000001110101100101001 |
| | SEQ-1 | 0000111000001111011101101010000010 |
| | NAK | 1100111011011111110100000011111111 |
| 18 | SEQ-0 | 11111100111010011000010100101101 |
| | SEQ-1 | 10111100101001100001100010000110 |
| | NAK | 011111000110011010111100111011 |
| 19 | SEQ-0 | 1001001010001110101000001101000011 |
| | SEQ-1 | 1101001011000001001111010111110 |
| | NAK | 0001001000010001100110111100000111 |
| 20 | SEQ-0 | 1001100010000101001011111100011001 |
| | SEQ-1 | 110110001100101010101001000100010 |
| | NAK | 00011000000011010000101001101111 |
| 21 | SEQ-0 | 1111011011110001000000101001110101 |
| | SEQ-1 | 101110110101101111101011111011110 |
| | NAK | 011101100111111011101011000100100011 |
| 22 | SEQ-0 | 0100010010010110110010001110001 |
| | SEQ-1 | 0000010000000100111110011101010 |
| | NAK | 1100010011010100101111100100111 |
| 23 | SEQ-0 | 00101010000101100010000110001101 |
| | SEQ-1 | 01101010001100011101110000100110 |
| | NAK | 101010101011001101111010110111011 |
| 24 | SEQ-0 | 010100000101110001111010110000001 |
| | SEQ-1 | 00010000000010011111001111011101010 |
| | NAK | 1101000011000011010000011001011 |
| 25 | SEQ-0 | 001111100011011010111110011111101 |
| | SEQ-1 | 011111100111010011100001010010110 |
| | NAK | 1011111010100010001100100011101011 |
| 26 | SEQ-0 | 1000110010010001110001000111001 |
| | SEQ-1 | 1100110011011110111010100100101010010 |
| | NAK | 0000110000001110010001010001101011 |
| 27 | SEQ-0 | 1110001011110101000010100111000101 |
| | SEQ-1 | 1010001010110101010010010110111010 |
| | NAK | 0110001001101010010111110010011 |
| 28 | SEQ-0 | 1110100011111101001011010111110101011101 |
| | SEQ-1 | 101010000100110010001100001000110010 |
| | NAK | 011010000110010011010100001010001 |
| 29 | SEQ-0 | 100001010011001101101111100110001 |
| | SEQ-1 | 1100011011010110000100001111001010 |
| | NAK | 0000011000001101000010100110111 |
| 30 | SEQ-0 | 001101000011000110100001100101 |
| | SEQ-1 | 0111011000111111101010011101001110 |
| | NAK | 101110001011011111010100100110111 |
| 31 | SEQ-0 | 01011010010101111111010110011001 |
| | SEQ-1 | 00011010000110001110100000110010 |
| | NAK | 11011010110010001100111011001111 |

The codewords are generated by systematically encoding the seven information bits given in Table 5 below. Bits 6 and 5 are created such that no all 0 or all 1 ACKSEQ bursts are formed.

TABLE 5

Information bits that are systematically encoded to form the ACKSEQ

| Bit | Source |
|---|---|
| 0 | SYSTEM ID bit 0 |
| 1 | SYSTEM ID bit 1 |
| 2 | SYSTEM ID bit 2 |
| 3 | SYSTEM ID bit 3 |
| 4 | SYSTEM ID bit 4 |
| 5 | 1 for NAK, 1 for SEQ-0, 0 for SEQ-1 |
| 6 | 1 for NAK, 0 for SEQ-0, 1 for SEQ-1 |

The information bits are mapped to the ACKSEQ bits as shown in Table 6, where '+' stands for exclusive or.

TABLE 6

ACKSEQ generation table

| ACKSEQ Bit | XOR of Information Bits |
|---|---|
| 0 | 5 |
| 1 | 6 |
| 2 | 6 + 5 + 3 + 2 + 0 |
| 3 | 5 + 4 + 2 + 1 + 0 |
| 4 | 6 + 5 + 3 + 2 + 1 + 0 |
| 5 | 5 + 4 + 1 + 0 |
| 6 | 6 + 5 + 2 + 1 + 0 |
| 7 | 5 + 1 + 0 |
| 8 | 6 + 2 + 1 + 0 |
| 9 | 6 + 5 + 1 |
| 10 | 5 + 3 + 0 |
| 11 | 6 + 4 + 1 |
| 12 | 6 + 3 |
| 13 | 6 + 5 + 4 + 3 + 2 + 0 |
| 14 | 4 + 2 + 1 |
| 15 | 5 + 3 + 2 |
| 16 | 6 + 4 + 3 + 0 |
| 17 | 6 + 4 + 3 + 2 + 1 + 0 |
| 18 | 6 + 4 + 1 + 0 |
| 19 | 6 + 3 + 1 |
| 20 | 6 + 5 + 4 + 3 |
| 21 | 4 + 3 + 2 + 0 |
| 22 | 5 + 4 + 3 + 1 + 0 |
| 23 | 6 + 5 + 4 + 2 + 1 |
| 24 | none(always equals zero)[1] |
| 25 | 0 |
| 26 | 1 + 0 |
| 27 | 2 + 1 + 0 |
| 28 | 3 + 2 + 1 |
| 29 | 4 + 3 + 2 + 0 |
| 30 | 5 + 4 + 3 + 1 + 0 |
| 31 | 6 + 5 + 4 + 2 + 1 |

[1]While this bit may be removed without affecting the minimum distance of the code, it is left as is to have an even number of bits for the QPSK modulation. It is not made a function of the information bits because the cyclic nature of the code would be lost.

The mapping in the table is equivalent to systematically encoding (See Lin and Costello p. 95. with the (37,7) shortened cyclic code generated by $g(x)=1+x^8+x^{11}+x^{12}+x^{13}+x^{14}+x^{15}+x^{18}+x^{19}+x^{20}+x^{22}+x^{23}+x^{25}+x^{27}+x^{29}+x^{30}$ and removing the 5 bits associated with the color code. This code is an optimal (37,7) code, with a minimum distance of 16. No other (37,7) code can have a greater minimum distance (See A. E. Brouwer and T. Verhoeff, "An Updated Table of Minimum-Distance Bounds for Binary Linear Codes," *IEEE Trans. Inform. Theory*, vol. IT-39, pp. 662–677, March 1993. Creating the ACKSEQ codewords with this optimal code gives us the following properties.

1. Because of the cyclic nature of the code, single bit shifts of a codeword will differ in at least 14 positions from the other codewords, making the ACKSEQ very robust to timing uncertainty.
2. With no multi-system interference, a NAK and an ACK differ in at least 16 positions. A NAK can have up to 7 bit errors in 32 bits and still not be misinterpreted as an ACK, and vice-versa.
3. With no multi-system interference, ACK-0 and ACK-1 differ in at least 16 positions, and at least 7 bit errors can be corrected out of 32 bits.
4. With multi-system interference, an ACK or a NAK from another system will differ from the present system's ACK in at least 11 positions. Therefore, an ACK from another system cannot possibly be accepted unless there are more than 5 bit errors out of 32 bits.
5. In 50% BER conditions (microwave interference, portable out-of-range, multi-system collision) the 32 bit ACKSEQ can provide up to 31 bits of random noise protection, depending on the amount of error correction desired.

The CRC codes used for detecting errors in the BA and Payload packets are essential to the ARQ protocol, as described below with respect to ARQ protocol and scheduling. A poor choice of CRC generator polynomial can lead to erratic behavior in the source, destination, and scheduler state machines due to undetected errors. Very long CRC codes, with good generator polynomials, can limit undetected errors, but consume bits in the air interface and can cause throughput problems due to false alarms. By keeping the length of the CRC as small as possible while providing adequate error detection, and by handling any undetected errors that do occur in the ARQ protocol gracefully, these problems can be avoided.

A 24-bit CRC is used to protect 74 bits of the BA (bits 34 to 107), and another 24-bit CRC is used to protect 784 bits of the Payload (bits 24 to 817). Both CRCs are implemented with the same generator polynomial $g(x)=1+x^2+x^3+x^4+x^5+x^7+x^8+x^{16}+x^{17}+x^{19}+x^{20}+x^{21}+x^{22}+x^{24}$ (A textbook reference implementation for a CRC is given on page 95 of Lin and Costello.)

This CRC has very good minimum distance properties. (G. Castagnoli, S. Brauer, and M. Herrmann, "Optimization of Cyclic Redundancy-Check Codes with 24 and 32 Parity Bits," *IEEE Trans. Commun.*, vol. COM-41, pp. 883–892, June 1993.

Figure 18:
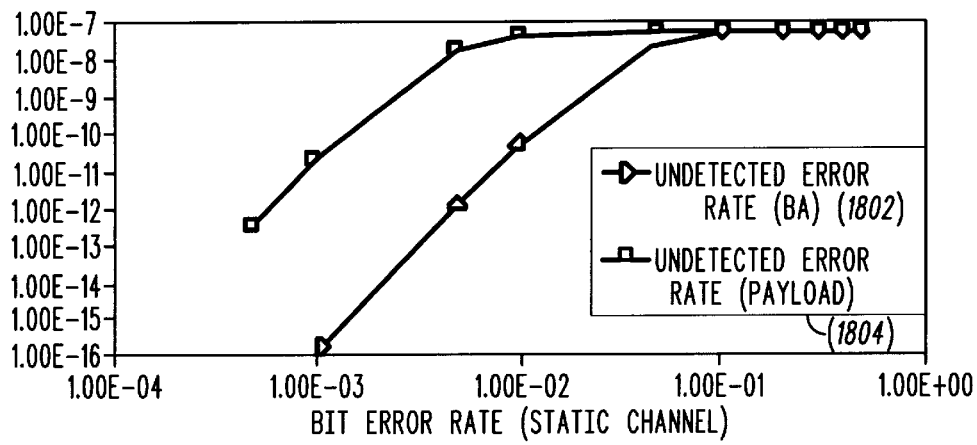

FIG. 18, numeral 1800, below shows the probability of BA (1802) and Payload (1804) bursts having an undetected error, for a range of error conditions. The CRC codes at this length are considered proper because the undetected error curve is non-increasing for decreasing bit error rate. (CRC codes are not guaranteed to be proper, so any candidate generator polynomial needs to be verified for each number of bits it may protect.

The results are more than adequate at the specified nominal operating point of $10^5$. In random noise conditions, such as that seen by the Access Point when no peripheral are present, noise will not be accepted as a block unless it passes the 32-bit synchronization word, matches the 8-bit System ID, and passes the 24-bit CRC.

The BA, Payload, and ACKSEQ bursts will all be separated in time by a 50 symbol (32.38 microsecond) guard band. Without accounting for propagation delay, the guard band shall be accurate within ± one symbol time.

Multi-System Interface

This system will be able to operate in dense urban environments such as apartment buildings and multi-family dwellings. In order to operate effectively in these environments, a variety of multi-system interference mitigation methods are used. Frequency hopping will reduce the likelihood that neighboring systems utilize the same channel for an extended period of time. Scrambling and color coding will minimize the risk that systems that happen to be using the same channel at a given time will misinterpret channel data. However, no coordination between neighboring base stations is required. As a result, there will always remain a slim chance that adjacent systems will choose the same values. If a system detects that it is receiving interference from a system with the same color code, scrambling code or frequency hopping pattern, it may choose to restart with different choices of frequency hopping pattern, scrambling sequence and color code. Peripheral would then need to re-register and obtain these new values. This should not be done lightly, as currently active links will be interrupted as the devices reacquire.

In order to operate in the presence of other systems, each access point randomly selects a frequency hopping pattern (FHP) from a set of FHPs. Each of the K FHPs in the set is of length N, and each element of the FHP is an index to one of q frequency channels. All units in the system switch channels (hop) at the end of each frame based on the FHP. The units hop to a new frequency channel at the end of a frame during the last block of the frame, block 32. Since the hopping is occurring during a block time, block 32 cannot be used to transmit information, although the access point still transmits a BA with a null address to aid in system synchronization. The FHP is stepped through until it is exhausted, at which time the pattern is repeated from the beginning. Since FHPs are selected with good correlation properties, two systems using different hopping patterns or a different phase of the same hopping pattern will have limited multi-system interference. In the unlikely event of two systems using the same phase of the same pattern, one or both of the systems may randomly select (based on a serial number) a new FHP from the set of FHPs as described previously The set of FHPs used by the system will vary by region in order to exploit and conform to regional differences in the 24 GHz ISM rules. The FHPs have the following desired properties:

1. Use all frequencies in the FHP equally often.
2. Minimize cross- and auto-correlation among patterns (to minimize multi-user interference).
3. Are simple to generate (so base does not have to store an entire set of FHPs).

In addition, the regional rules specify the maximum number of frequency channels and the minimum number of frequencies q that the FHP must hop over. An example of good FHPs are those generated by Titlebaum's linear congruential method (Edward L. Titlebaum, "Time-Frequency Hop Signals Part I: Coding Based Upon the Theory of Linear Congruences," *IEEE Transactions on Aerospace and Electronic Systems,* vol AES-17, no. 4, July 1981, pp. 490–493.). These patterns satisfy all the above criteria. For any prime number p, the method easily creates a set of K=p−1 patterns of length N=p over q=p frequency channels. For the United States, we select p=79, the maximum number of frequency channels that the units can support. In other regions, we can use a subset of these 79 channels by simply specifying an offset and a smaller prime number. In any case, it is expected that manufacturers will jointly agree on sets of hopping patterns that satisfy these criteria, from which the base unit will randomly select one.

Frequency hopping information is communicated through the 8 bit "FH Word" data element contained in every BA. A unit can read the current BA's FH Word to know which channel to hop to at the end of the current frame. This is essential before and during the registration process, because the unit is not synchronized with the base's FHP. At the end of registration, however, the base uses the data packet that accompanies the Registration Acknowledge packet to download the entire FHP into the unit. The unit then does not have to read the BA field every frame to know where to hop to next, and can weather long periods of interference, such as might be expected as the unit goes in and out of range from the base. In addition, the unit can now power down and "sleep" for long periods of time, awakening on the correct frequency channel by advancing the index into the FHP by the number of frames of sleep.

Sleeping can lead to much improved battery life, as described below in Standby Modes. However, without intelligent frequency hopping management, the unit would have to resynchronize to the FHP through re-registration at the end of each sleep period. With this frequency hopping architecture, units would only have to re-register if the base changes the FHP used by the system, and then only if the individual unit happened to be in a long-term sleep at the time. Units that are awake can compare the received FH Word with the next value in their stored FHP; if the values are different, the unit can update its FHP without fully restarting the registration process.

A summary of the frequency hopping parameters and fields is given in Table 7, Frequency Hopping Parameters.

TABLE 7

Frequency Hopping Parameters

| Parameter/Field | Description | Value (typical U.S.) |
|---|---|---|
| q | # of frequency channels | max 128 (79) |
| N | length of FHP | max 128 (79) |
| K | # of patterns | max 128 (78) |
| FH Word | frequency channel, 0.q-1 | 8 bits |
| FHP | list of frequency channels, indexed 0.N-1 | N * 8 bits |

Color coding provides additional protection from accidentally receiving a burst from another system. This field, SYSTEM ID, contains a random number selected by the access point and communicated in every Block Assignment and Block Transfer. This field must be checked to determine if the data is destined for that system. If the SYSTEM ID does not match, the data assumed to be in error regardless of whether the CRC passed. Additionally, it is used to select the acknowledgment codes used with a given system.

Scrambling can be used to enable privacy on the data payload. For each payload where the scrambling is enabled (PN-EN bit in the Payload header is set), a 16 bit scrambling seed (data element PN Seed) is loaded in the scramble PN generator, and successive outputs of that generator are exclusive-or'ed with the data header (bits 43 to 841) and data payload (all bits). The scrambling seed is set at registration and communicated as part of the registration acknowledge message. The seed is randomly selected and remains constant for a given SYSTEM ID for the base. It should be random with respect to the selection of the frequency hopping pattern and the SYSTEM ID.

Figure 19:
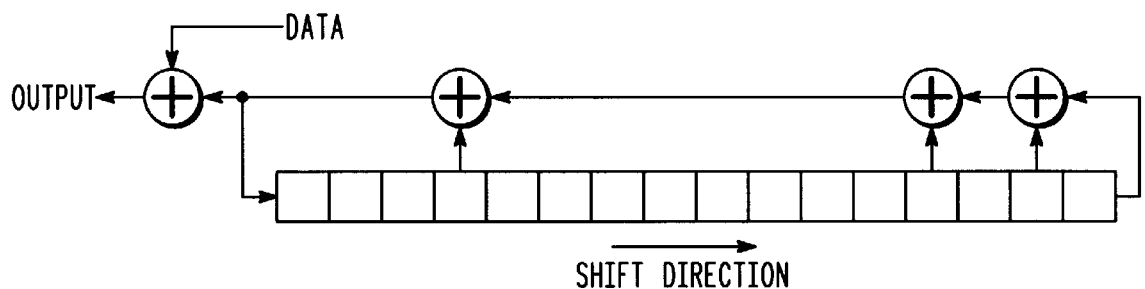

The PN generator for the scramble sequence is defined by the primitive irreducible generator polynomial $g(x)=1+x+x^3+x^{12}+x^{16}$. A textbook reference shift register implementation of this generator is shown in FIG. 19, numeral 1900. The 16 bit value Scramble Code Index is loaded into the shift register, and the output is taken as shown for use with the first bit of the scrambled sequence. The shift register is then clocked and the process repeats. Note that there are 65535 different scrambling codes, plus the Scramble Code Index of 0 which corresponds to no scrambling (While more scrambling codes may be provided with a longer shift register, the security would still be considered "Cordless Phone Grade" and no additional performance advantages would be provided.)

This description provides specifications necessary to the design of the RF and IF transceiver sections of the access point and peripheral. First, requirements of the access point and peripheral receivers are specified.

The receiver shall be able to achieve a packet error rate of less than 1% prior to any correction due to retransmission in the presence of thermal noise when the received signal strength is greater than −80 dBm. A packet error in the peripheral is defined as a CRC failure in either the block assignment or the received payload field. A packet error in the access point is defined as a CRC error in the payload field in a block in which a peripheral transmitted as instructed by the block assignment.

The input third order intercept point of both the access point and peripheral receiver shall be greater than −16 dBm.

The 1 dB compression point of both the access point and peripheral receiver shall be greater than −26 dBm.

The adjacent channel rejection ratio shall be greater than 50 dB for a signal 3 channels removed from the desired and 0 dB for signals in the adjacent channel. Adjacent channel rejection ratio is the highest achievable ratio of power in an adjacent channel to desired signal strength while maintaining the specified BER. The on channel signal is adjusted to a level 3 dB above the minimum specified for a $10^5$ BER. The unwanted signal level is increased to the lowest level where a $10^5$ BER of is obtained during the transmission of at least $10^7$ bits. The adjacent channel rejection ratio is the ratio of the desired signal power to the unwanted signal power.

The receiver shall have a spurious response of no greater than 35 dB via the measurement procedure described in EIA document EIA/TIA-204-D "Minimum Standards for Land Mobile Communication FM or PM Receivers, 25–866 MHz."

The receiver shall have intermodulation products no greater than 39 dB via the measurement procedure described in EIA document EIA/TIA-204-D "Minimum Standards for Land Mobile Communication FM or PM Receivers, 25–866 MHz."

The information below specifies requirements for the access point and the peripheral transmitters.

The transmitted power in the 1 MHz band defined by the desired channel shall be less than 100 mW (+20 dBm) peak-average. Peak-average is defined as the average power radiated during active transmission and therefore does not change with duty cycle. Note that regulations in some countries limit transmitted power to less than 100 mW. In these countries the more stringent regulations must be adhered to.

The RMS error vector magnitude (EVM) of both the access point and the peripheral shall be less than 12.5% where the RMS EVM is defined as:

$$EVM = 100 * \sqrt{\frac{\sum |Sae^{j\theta} - aSi|^2}{\sum |(aSi)|^2}}$$

where Sa is the complex baseband equivalent of the actual transmit signal, Si is the ideal complex baseband equivalent signal, and a and q are constants chosen to minimize EMV. During this measurement the transmitter under test should be locked to the reference signal such that no frequency offset exists in the transmitted signal relative to the reference signal.

Less than 1% of the total transmit power shall occur outside of the desired channel. Total power in any channel 2 MHz or more removed from the center frequency of the desired channel shall be less than 2 mW and the total power in the adjacent channel shall be less than 300 mW during active transmit. Emissions outside of the desired band must meet regulatory requirements for the country of operation.

The spurious output shall be less than −50 dBc. The spurious output shall be determined using a spectrum analyzer with the IF bandwidth set to 100 kHz. The spurious signal shall be measured with the transmitter modulated with random data. The spurious signal level is defined as any spectral component of the modulated signal in a 100 kHz bandwidth offset by more than 4 MHz from the carrier and referenced to the unmodulated carrier power.

Because the access point must transmit to many peripheral devices which are not co-located, dynamic power control on the downlink is not allowed. Power control may optionally be employed in the peripherals. It is recommended that any peripheral power control algorithm, if used, should target packet error rates below 0.1% to avoid excessive use of system resources due to a large number of retransmissions.

When the access point or peripheral is not in active transmit or the ramp-up or ramp-down condition, the output power in any channel shall be less than 400 nW.

The transmitter shall ramp-up and ramp-down in response to the start or end of a burst in less than 5 symbol periods (6.47 mS). This period is defined as the duration between the peak of the transmitted impulse due to the first/last symbol of the burst and the point at which the transmit power remains below 400 nW.

The information below gives requirements which apply to reference frequency sources in both the access point and the peripheral.

The access point and the peripheral shall transmit a modulated carrier which is within 25 kHz of the channel centers defined in "Frequency Plan." This is equivalent to 10 PPM accuracy in the source form which the carrier is derived. Symbol timing shall also be accurate to within 10 PPM.

The phase noise measured at the output antenna shall be less than −94 dBc/Hz at a 100 kHz offset from the center frequency.

The channel switching duration between any two channels shall be less than 662 mSec for the carrier frequency to settle to ad remain within 12 kHz (5 PPM at a carrier frequency of 2450 MHz) of the final value.

The access point and peripheral must be able to switch between active transmit/receive to receive/transmit in less than 32,383 mS (25 symbols). This switching time is defined as the time from the peak of the impulse due to the last symbol of the transmitted/received burst to the peak of the impulse due to the first symbol of the received/transmitted burst.

The DA-TDMA system assigns each block on an individual basis and allows all blocks to be immediately acknowledged. Assignments are based on connections to applications where each connection corresponds to a unique physical layer address. Within these connections, acknowledgments are used to mitigate the interference caused by microwave ovens and other impediments. The individual blocks may be combined to form isochronous data streams from 1 to 992 kbps or asynchronous data packet up to 6141 octets long. Individual connections can be aggregated to form a full-duplex communications link which may be asymmetrical. A control connection is used to manage the origination and termination of both types of transfers. The control connection is used to manage system parameters such as hopping patterns, devices IDs, etc.

This information defines the requirements of the datalink layer. The Medium Access Layer specifies the addressing formats used to dynamically allocated each block, the control connection extended header, and the random access procedure. The ARQ protocol and scheduling specify the fundamental state machines performed by the access point and peripherals. The Connections describe the types of connections between peripherals and applications, both asynchronous and isochronous. The Messaging procedure for signaling the contents of all the messages for both the datalink and network layer.

Each block is assigned based on source and destination address transmitted in the BA burst. By different pairings of the source and receiver, a uplink, downlink, or peer-to-peer transfer will take place. Addresses are associated with connections to applications and applications determine the destination of transfers. The applications may subsequently direct the DMF function to route the data to another peripheral, forward the data to the wired network, or process the data internally. In any case, a peripheral does not directly address another peripheral.

Special contention blocks provide access to the system for asynchronous traffic using a form of reservation ALOHA. The peripheral will send up a block specifying the length of the transfer and the address of the connection. Contention blocks are always used for the initial access to the system. Subsequent accesses may take place on the contention block or alternatively the system may require the device be polled periodically on it's control connection. Congestion is avoided by vary the number of devices operating in contention mode, the periods of the polled devices, and the persistence of the contending devices.

Isochronous traffic must negotiate the origination and termination of each connection using asynchronous packets on the control connection. At origination, the peripheral may request the connection or the application may direct the DMF by specifying the number of connections, the respective data rate, and direction of each connection.

The following information defines the fundamentals of the medium access layer. The Addressing portion defines the addressing schemes and the reserved addresses. The Control Connection Extended Header portion defines format of the control connection extended header used for both polled and contention access. The Contention Access portion defines the operation of the contention mode.

Connections between peripherals are uniquely addressed at the medium access layer. Each peripheral is assigned a fundamental and sub-address space at registration as described herein. Several addresses have been reserved by system and have special meaning. The reserved addresses are as identified herein.

The 12-bit address assigned to each peripheral is broken in to a fundamental address and variable sub-address. The fundamental address identifies the peripheral device while the sub-address identifies a specific connection to an application. The size of the sub-address field will vary per device depending on the number of connections a device is capable of supporting simultaneously. The sub-address may be 0through 5 bits long and occupy the most significant bits of the address. The fundamental address occupies the remaining 12 to 7 bits of the address.

The fundamental address space is unique over both the source and destination fields while the sub-address may be used to identify two connections, one sourced by the peripheral and the other destined for the peripheral. The fundamental portion of a device's address is the same value in both the source and destination fields. Sub-addresses may e repeated but are always treated as independent connections and maintain individual SBSN. For example, a full-duplex communication link would use the same numerical sub-address for the both transmit and receive connection to an application. Sub-address zero is always assigned to the default full-duplex control connection with the DMF. A device with a 12-bit fundamental address may only support the default control connection.

Addresses are reserved to identify the access point as a source of destination, mark a block for contention access, or provide generic address for new devices. Table 8 Reserved Addresses specifies the addresses reserved by the system and identify their purpose.

TABLE 8

Reserved Addresses

| Address (Binary) | Purpose |
| --- | --- |
| %000000000000 | The "null" address indicates that the source or destination device is the access point. |
| %1111111XXXXX | Reserved for contention access. The 5 sub-addresses associated with this address specify the various persistence modes and priority levels. |
| %1010101XXXXX | Reserved for pre-registration. The sub-address field will be selected at random by the registering peripheral providing 32 independent pre-registration addresses. |

The control connection defines a special control connection extended header to allow the origination of an asynchronous transfer. All contention accesses, polls, and pages are assumed to be on the control connection and use the extended header. Likewise, every control connection block must use the extended header. In a contention access or poll, the extended header may request a asynchronous transfer. In a page, the extended may announce an asynchronous transfer.

Table 9, Control Connection Extended Header, defines the fields within the extended header. The Multiple Block bit identifies that an asynchronous transfer is requested to the application specified by the Source Address field. The length of the transfer is specified by the fields, Remaining Blocks, Pad Bits, and Pad Octets. A PPP bit identifies that true destination is specified by the network address enclosed within the data field. A Reservation Sequence Number is used to distinguish between repeated reservation requests.

TABLE 9

Control Connection Extended Header

| Extended Header Fields | Description | Bit Indices (begin/end) | | Length |
| --- | --- | --- | --- | --- |
| Multiple Block | Indicates that this is a single block transmission and does not require any additional blocks to complete the transmission. A value of 0 indicates a single block. | 50 | 50 | 1 bit |

TABLE 9-continued

Control Connection Extended Header

| Extended Header Fields | Description | Bit Indices (begin/end) | | Length |
| --- | --- | --- | --- | --- |
| PPP | Indicates that the true destination is enclosed within the encapsulated Point-to-Point Protocol Packet | 51 | 51 | 1 bit |
| Reservation Sequence Number | Used to distinguish between retried reservation requests from a single device | 52 | 52 | 1 bit |
| Reserved | Reserved. Encoded as 1 | 53 | 53 | 1 bit |
| Source Address | Source address to used for subsequent blocks of asynchronous packet. The source address uniquely identifies the corresponding service and format of the enclosed data. | 54 | 65 | 12 bits |
| Remaining Blocks | Number of remaining blocks. A value of N implies a packet length of (93 + 96 · N) octets. May take on the value 0 through 63. A maximum of packet length of 6141 octets The single block bit must be set for one block packets. | 66 | 71 | 6 bits |
| Pad Bits | Specifies the number of padding bits in the final octet. (The final octet precedes the first pad octet) May take on the values 0 through 7. | 72 | 74 | 3 bits |
| Pad Octets | Specifies the number of padding octets in the final block. May take on the values 0 through 95. | 75 | 81 | 7 bits |
| Data | Format of the data is determined by the Source Address above. | 82 | 817 | 93 octets |

Contention Access

Peripherals may randomly access the system on specially marked contention blocks. The access point marks a contention block by placing one of the reserved contention addresses in the source address field of a BA burst. Peripherals with data to send then access the system using a dynamic p-persistent CSMA-like protocol. The persistence level may vary at the discretion of the access point depending on the level of congestion and take on the value 1, ½ ¼, ⅛ 1/16, 1/32, 1/64, or 1/128. In addition, the connection access may be restricted to registration traffic only. The 5-bit sub-address field is used to dynamically specify persistence level and restrictions on the current connection slot. Table 10 defines the format of the contention address.

TABLE 10

Contention Address Format

| Fields | Description | Length |
| --- | --- | --- |
| Fundamental Address | Fundamental portion of the contention address. Must be encoded as binary %1010101. | 7 bits |
| Restricted Status | A value of 1 indicates that only registering terminals may access this connection block. | 1 bit |
| Reserved | Must be encoded as 0. | 1 bits |
| Persistence Level | Species the persistence level used by the peripheral in the current block. | 3 bits |

| Value | | Level |
| --- | --- | --- |
| %000 | → | 1 |
| %001 | → | 1/2 |
| %010 | → | 1/4 |
| %011 | → | 1/8 |
| %100 | → | 1/16 |

TABLE 10-continued

Contention Address Format

| Fields | Description | | | Length |
|---|---|---|---|---|
| | %101 | → | 1/32 | |
| | %110 | → | 1/64 | |
| | %111 | → | 1/128 | |

Contention access can be modeled as a slotted aloha system with carrier sensing. The unallocated blocks, remaining after isochronous connections have been serviced, form the slotted aloha channel. An idle system will transmit nothing but connection blocks. A peripheral winning contention would be given the unallocated blocks for the duration of it's transfer. The others peripherals would sense the winning peripheral's activity by the absence of a contention block. Upon completing the transfer, the system will again assign the unused blocks for contention access. The access point controls the back-off of the peripherals in the system. A high persistence value implies a long back-off and low persistence value implies a short back-off.

A peripheral contending on the system will monitor the BA bursts until a control block is detected. One successful when the source address encapsulated within the extended header is present in the destination field of the next contention slot or a block has been assigned to that address. Either event requires the peripheral to stop contending for TP201.

The information below describes an asynchronous transfers in detail.

The DA-TDMA system integrates a simple stop-n-wait ARQ mechanism with the scheduling algorithm. The ARQ and scheduling work together to transfer N ordered data blocks from the source device to the destination device. Each transfer is performed by three entities, the scheduler, the source device, and destination device. The scheduler is a sub-function of the DMF running on the access point. It assigns the appropriate number of blocks to support the data transfer and requisite retries. The scheduling function has two levels of responsibility, the multiplexing of the all connections and specific management of individual connections. The ARQ impacts the connection-specific scheduling. The connection-specific scheduler must maintain a accurate count of the successfully transferred blocks, allowing the connection multiplexer to determine when a particular connection's requirements have been met or whether more blocks are required to complete the transfer. The protocol must ensure that the source's, destination's, and scheduler's counters remain synchronized.

The ARQ protocol performs the following steps for each data block transferred:

1. The access point transmits the block assignment burst specifying the source and destination device in the address fields. The source and destination devices may be both peripherals forming a coordinated peer-to-peer transfer. Alternatively, either the source or destination device may be the access point forming a downlink or uplink transfer, respectively.
2. The source device then sends the payload burst to the destination device including a 1-bit Block Sequence Number. One sequence number is maintained per each sub-address on a device. The sequence number is set to zero at the beginning of each transfer.
3. Having received the payload burst the destination device sends a ACKSEQ burst to the access point. The ACKSEQ burst positively or negatively acknowledges the reception of the payload burst. If positively acknowledged, the ACKSEQ burst also forwards the value of the sequence number. The access point is not required to receive the payload burst in peer-to-peer transfers.
4. Upon receiving the ACKSEQ, the access point echoes the acknowledgment, less the sequence number, in the next block assignment burst.
5. The source peripheral receives the acknowledgment and determines whether it must retry the previous block. The acknowledgment is always received prior to transmitting the next payload burst.

The information below specifies the operation of the source device, destination device, and connection-specific scheduler with respect to the ARQ algorithm. It exactly specifies when the Block Sequence Number and transfer count are incremented by all three communicating entities insuring that all blocks get communicated in order and that all three entities complete the transfer simultaneously.

Figure 20:
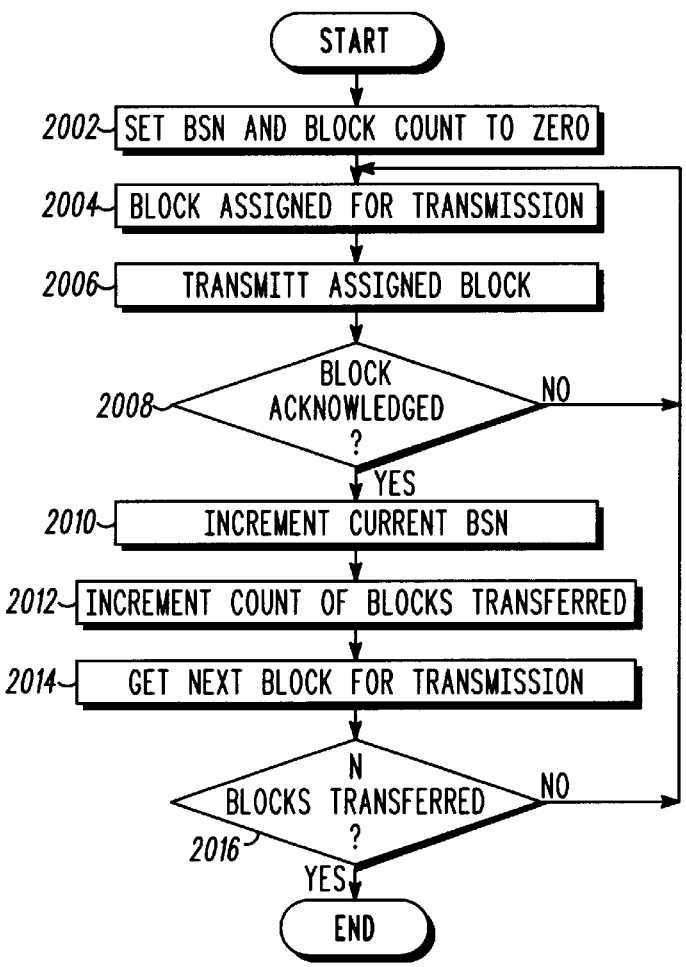

A source device must follow the flow diagram illustrated in FIG. 20, numeral 2000. After negotiating the length of the transfer and the address of the connection, source device initializes it BSN and block count to zero (2002) and then begins waiting for assigned blocks. Upon receiving a BA burst containing its source address (2004), the source device transfers a payload burst (2006) to the destination device. Completing the transmission, the source device receives the acknowledgment in the BA burst of the next block. The source device does not decode the ACKSEQ burst. If the block was negatively acknowledged, the source device continues waiting for assigned blocks and will retransmit the current block when the next assigned block arrives. If the block was positively acknowledged (2008), the source device increments (2010) the block sequence number and the count of blocks transferred (2012). If there are no more blocks i the sequence, the source device exits (2016) the transfer mode. Otherwise the source device gets the next block in the sequence and continues waiting for assigned blocks.

Figure 21:
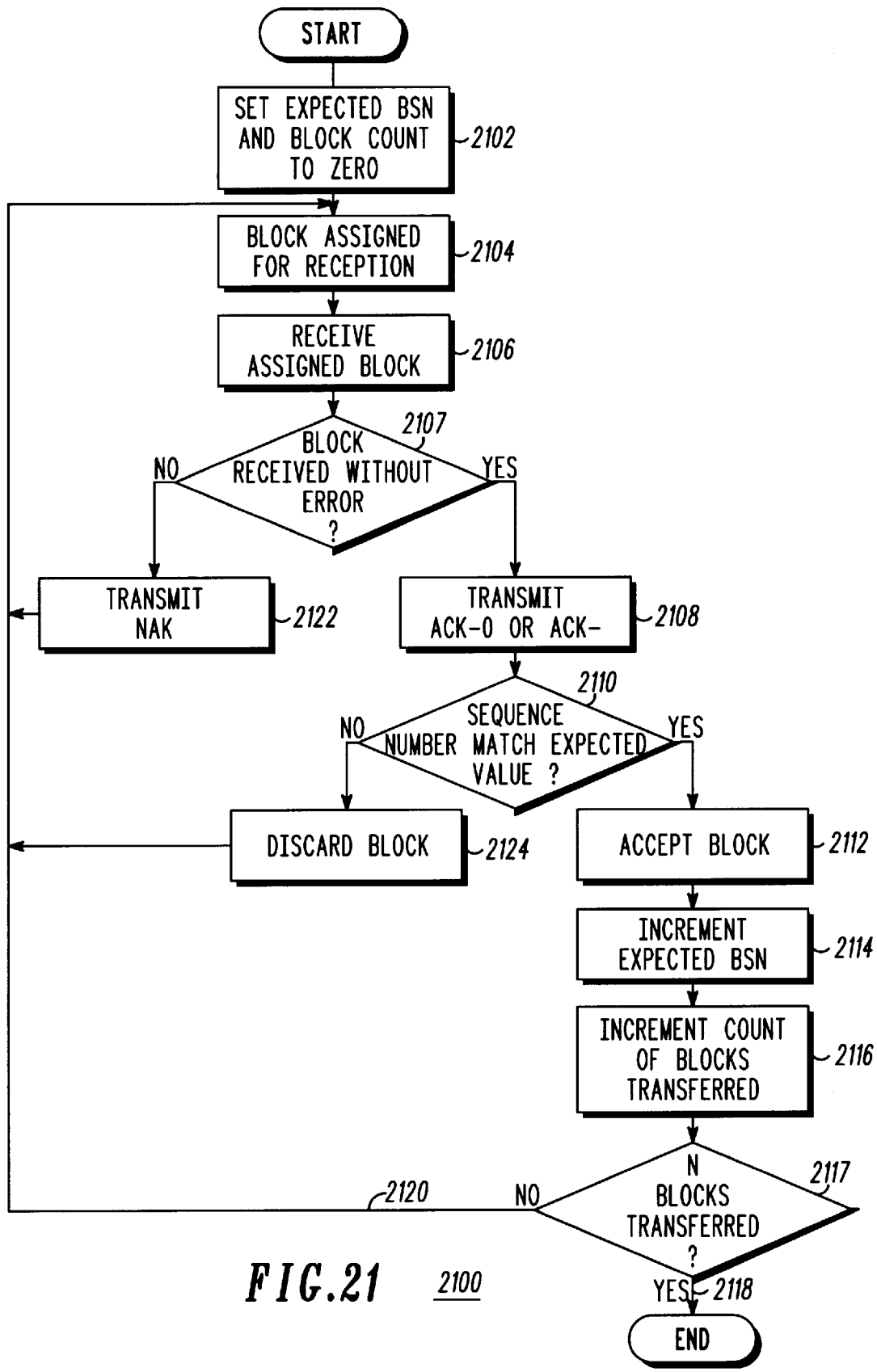

A destination device must follow the flow diagram illustrated FIG. 21, numeral 2100. After negotiating the length of the transfer and the address of the connection, the device initializes its expected BSN and block count to zero (2102) and then begins waiting for assigned blocks. (2104) Upon receiving a BA burst (2106) containing its destination address, the device receives a payload burst from the source device. If payload burst was received in error (2107), the device transmits an ACKSEQ burst representing a NAK (2122) to the access point and then resumes waiting for assigned blocks. If the payload burst was received successfully, the device transmits an ACKSEQ representing an ACK-0 or ACK-1 (2108) depending on the BSN of the payload burst. It then checks the received BSN against the expected BSN (2110). If they match, the device accepts the data block (2112), increments it expected BSN (2114), and increments its count of transferred blocks (2116). If all the blocks have been received (2117), the device exits the transfer mode (2118). Otherwise, the device continues waiting (2120) for block assignments. If the received BSN does not match the expected BSN, the block is discarded (2124).

Figure 22:
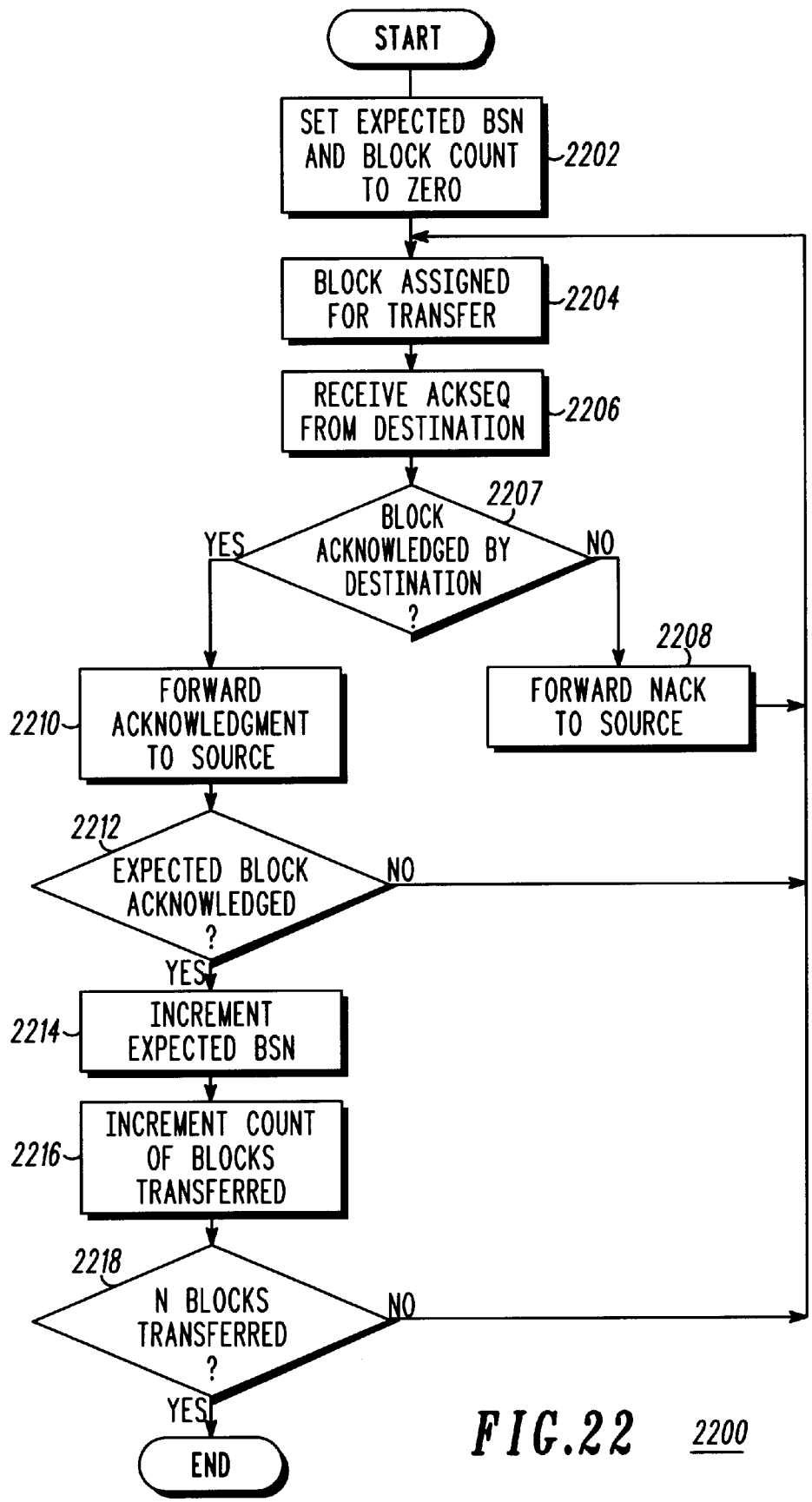

The connection-specific scheduler must follow the flow diagram illustrated in FIG. 22, numeral 2200. After negotiating the length of the transfer and the address of the connection, the connection specific scheduler initializes its expected BSN and block count to zero (2202) and then begins waiting for assigned blocks (2204). Upon detecting a BA burst containing the source/destination pair, the access point receives an ACKSEQ burst from the destination device (2206). If the ACKSEQ burst represents a NAK (2207), the connection-specific scheduler forwards a NAK (2208) to the source device in next BA burst and resumes waiting for assigned blocks. If the ACKSEQ burst represents a ACK-0 or ACK-1, the scheduler forwards an ACK to source device (2210) in the next BA burst and then compares the ACK-value against the expected sequence number (2212). If the sequence number and ACK-value match, the connection-specific scheduler increments it expected BSN (2214), and increments its count of transferred blocks (2216). If all the blocks have been transferred (2218), the scheduler exits the transfer mode and instructs the multiplexing scheduler to sop assigning blocks to the connection. Otherwise, the scheduler continues waiting assigned blocks.

The system support two types of connections, asynchronous and isochronous. Asynchronous connections allow for the transfer of data bursts at up to 1 Mbps. Isochronous connections support the periodic transmission of delay sensitive natural traffic types. Both connections employ the ARQ algorithm defined in the previous section. The following sections define the two connection types and their governing protocol timers and counters.

An asynchronous connection transfer an aperiodic data packet between a peripheral device and application. The most common data type transferred are PPP encapsulated IP datagrams. Each asynchronous connection is established during the registration process and is maintained for the duration a device is registered. The data packet is segmented by the source device into native payload blocks called asynchronous segments. The first segment is a control segment followed by the requisite number of data segment. Ninety-two octets of a data packet may be included in the control segment. Each subsequent data segment may carry 96 octets of the data. The final data segment will be padded will fill bits to form one complete block. The end of the data in the final segment is specified in the initial control segment's Pad-Octets and Pad-Bits fields. See the information on Control Connection Extended Header for the format of the initial control segment.

FIG. 23, numeral 2300, illustrates a peripheral originated transfer on the PPP asynchronous connection. A peripheral-originated asynchronous transfer begins by the peripheral device (2302) transmitting the control segment on either a marked contention block or in its assigned polling block. The initial control segment specifies the length of the transfer in blocks and the asynchronous connection address. The access point (2304) responds by initializing a connection-specific scheduler to transfer the requested number of blocks from the source address specified and then assigns blocks until the transfer is complete. The source peripheral participates in the transfer performing the ARQ/scheduling algorithm defined in the ARQ protocol and scheduling information.

FIG. 24, numeral 2400, illustrates a peripheral terminated transfer on the PPP asynchronous connection. A peripheral-terminated asynchronous transfer begins with the access point (2404) announcing the transfer by transmitting the control segment during the peripheral's paging interval. Like a peripheral originated transfer, the initial control segment specifies the length of the transfer in blocks and the asynchronous connection address. The peripheral (2402) responds by suspending it's current standby mode and listening for blocks containing the asynchronous address in the destination field. The peripheral and access point then perform ARQ/scheduling algorithm defined with respect to ARQ protocol and scheduling.

Figure 25:
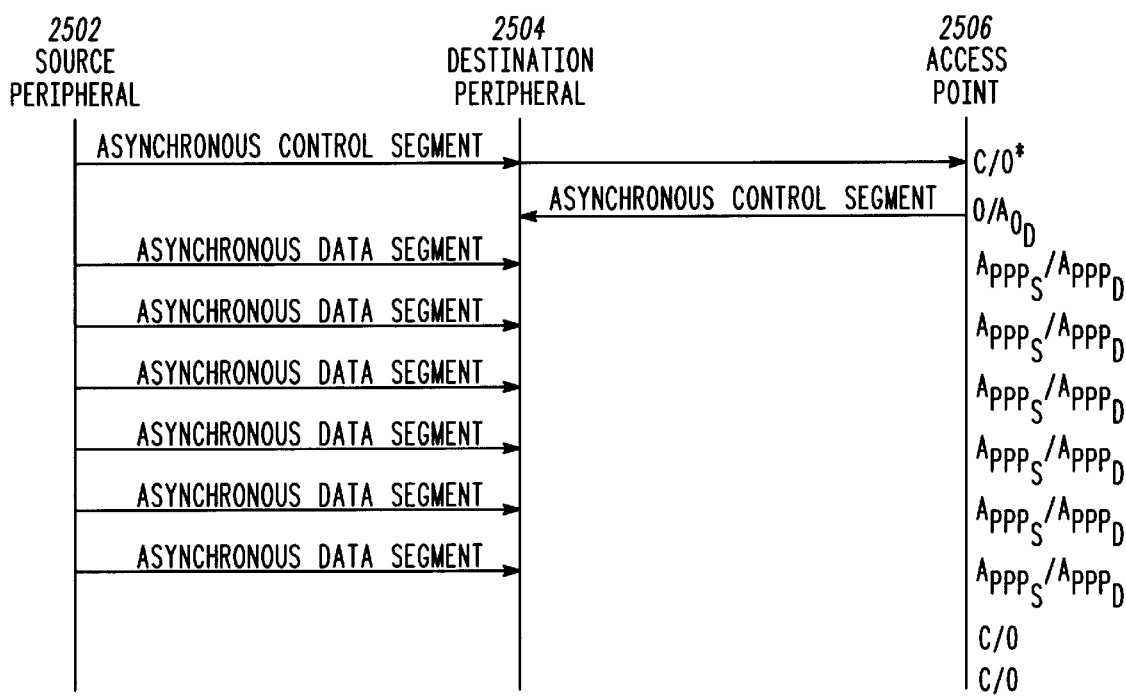

Asynchronous connections, like all connections, are between peripherals and applications. However, the data contained within an asynchronous transfer may be destined for another peripheral. For example, the IP address with an PPP encapsulated IP datagram may specify another peripheral. In this type of transfer, the application may simply store the entire asynchronous packet received from the source peripheral and then forward the packet to the destination peripheral in the subsequent asynchronous transfer. Alternatively, the application may direct the DMF to set-up a peer-to-peer connection between the peripherals. FIG. 25, numeral 2500, illustrates a peer-to-peer asynchronous transfer. Like a peripheral original transfer, the source peripheral (2502) sends the control segment to the access point (2506). The application within the access point identifying the destination peripheral (2504) as another peripheral would direct the DMF to announce the transfer to the destination peripheral. The 92-octets of data contained in the source's control segment would be transferred to the destination in the announcement. All subsequent data segments would be transferred directly between the source and destination peripheral. From the peripheral's prospective, a peer-to-peer transfer is indistinguishable form access point terminated/origination connection.

Several protocol timers regulate the asynchronous transfer process. TP202 specifies the maximum time between the transmission of the initial control segment and when the first block is assigned for a data segment. TP203 specifies the maximum time between assigned blocks for data segments. NP201 specifies the maximum number of retries on any particular block in the sequence. If any of these protocol parameters are exceeded the peripheral must abort the transfer and either retry or drop the packet.

Isochronous connections provide means for transmitting delay sensitive data such as natural traffic types or particularly voice samples. Like asynchronous traffic, the ARQ/scheduling mechanism transports the voice samples making them robust to interference. Low-delay is achieved by bounding the period in which a particular set of samples may be retried. This retry period is referred to as an Isochronous Window (IW) and is equal in duration to one DA-TDMA frame. An IW, however, may be assigned various frame offsets unique to the connection. For example, an IW beginning on block 5 in one frame would end on block 4 of the next frame. A series of IWs chained together form an isochronous connection. Within each IW, the ARQ/scheduling algorithm is performed to transfer a fixed number of blocks. The number of blocks, the frequency of the IWs, and the direction of the transfer are negotiated during an isochronous set-up.

A peripheral in the isochronous mode may support multiple number of isochronous connections differentiated by unique sub-addresses. Each isochronous connection will specify a fixed number blocks to transfer per IW and the direction of the transfer. The number of blocks determines the data rate for the transfer with one block per IW forming the fundamental data rate 32 kbps. Super-rate and sub-rate connections are also possible. A super-rate connection is formed by transferring multiple blocks per IW giving a N×32 kbps data-rate. Sub-rates are formed by transferring one block every MIWs giving a 32/M kbps data-rate. In the typical case of a POTS application, the peripheral will support two isochronous connections, one for the uplink and the other downlink, each assigned one block per IW. Therefore, the POTS peripheral would make two transfers every IW. In general, a combination of sub-rate, super-rate, and fundamental-rate traffic may have the peripheral transferring a varying number of blocks from one IW to the next. The number of blocks transferred during particular IW is always deterministic.

A peripheral may discontinue reception during periods of inactivity to conserve power. After receiving the expected number of blocks for an IW, a peripheral may be assured that access point will not assign blocks to it until the beginning of the next IW. At that point, it may power down it's receiver balance of the current IW. Therefore, a scheduler with out-of-band control signaling must send it's information prior to the isochronous blocks scheduled for the IW. On sub-rate connections, a peripheral may also discontinue reception between IW intervals. In the event of errors in the block transfer, the peripheral must continue to receive until all scheduled blocks retried successfully.

Figure 26:
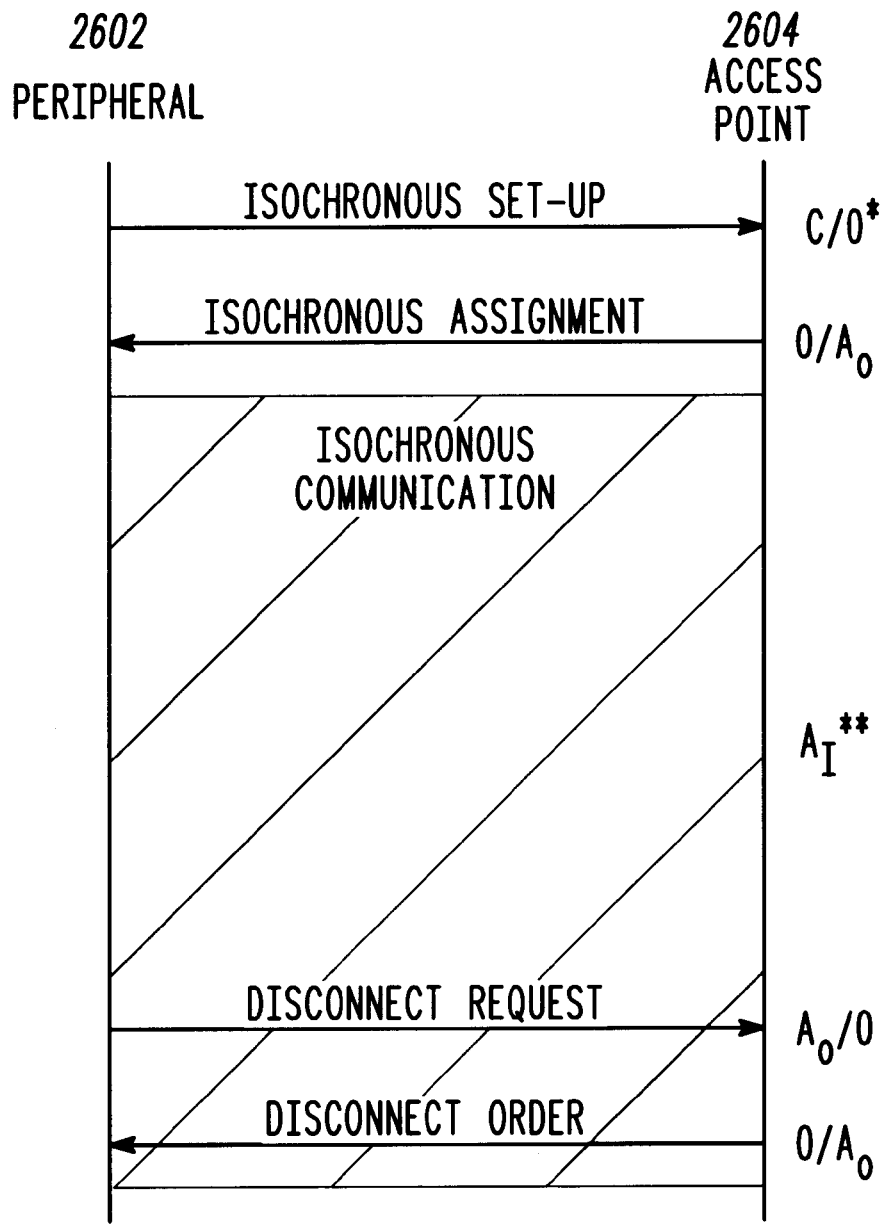

Isochronous transfers are initiated through a negotiation on the peripheral's control connection. FIG. 26, numeral 2600, illustrates an isochronous origination and termination. The peripheral (2602) may initiate the process by transmitting an asynchronous Isochronous Set-up on a contention block containing uplink/downlink data-rates and application requested. The access point (2604) sends Isochronous Assignment containing isochronous address(es) for connection, starting frame and frame offset. Optionally, services may be denied with an Isochronous Reject. Isochronous communications ensues. Supplemental control information may be exchanged asynchronously during the connection. A peripheral with control data pending sets the Control Connection Status bit in the payload header indicating that a control information is pending. Detecting the control connection status, the access point should assign a block to the peripheral's control connection in the next IW. An access point with control data simply sends the information prior to the isochronous blocks. The connection may be terminated by either the peripheral or access point. When terminated by the peripheral, the peripheral sends an asynchronous disconnect request to the access point. The access point responds with a disconnect order. When terminated by the access point, the access point simply sends an unsolicited disconnect order.

The access point is responsible for managing the systems resources and must enforce an admittance policy reserving bandwidth for retransmission's. When the capacity is exceeded, isochronous connections will be denied. The system's isochronous capacity is shared.

Two timer govern the isochronous connection, TP204 and TP205. TP204 defines the retry period for isochronous set-up messages. If the access point does respond to an isochronous set-up within TP204, the peripheral may resend the set-up message. TP205 defines the maximum interval between successful IW transfers. A peripheral will restart TP205 when it has received all the scheduled isochronous blocks within one IW. Therefore, one successful IW transfer every TP201 is enough to keep a connection active. Should TP205 expire, the peripheral will attempt to return to it's standby mode. The access point maintains a equivalent timer to TP205, TA205, and will also drop the connection.

A peripheral registered with a system will, in general, spend the most time in a standby mode. The standby mode allows the peripheral to conserve its power while not actively engaged in a isochronous or asynchronous transfer. Two types of standby modes are supported, a Discontinuous Reception (DRX) or Polled mode. These modes are similar to isochronous sub-rate connections expect the period between IWs may be much longer, from seconds to minutes. The DRX mode is like a downlink isochronous connection and the polled mode is like a uplink isochronous connection.

A peripheral in the DRX mode uses contention slots to transmit uplink control information while a polled peripheral must wait until it is polling interval. Peripherals in either mode may receive messages, referred to as pages, during their scheduled IWs, referred to as both paging or polling intervals. All uplink and downlink messages during standby mode are addressed to the control connection. The DRX mode is intended to complement the asynchronous protocol by supporting units with varying data loads and low delay requirements. The polled mode may be used to alleviate congestion by relegating all delay insensitive devices to infrequent polling. The polled mode may also be selected if the maximum delay must be bounded since a peripheral will have an opportunity to access the system every polling interval. The access point determines whether a peripheral is assigned to a DRX or polled mode in order to balance the system's performance for all peripherals. Each peripheral must support both DRX and polled modes for all applications. In general any type of data may be sent in the paging/polling interval. In the simplest form it may be used to transmit a single control message or possibly a very low-speed isochronous data stream. Alternatively, the paging message may direct the unit to suspend the standby mode. In this case, the paging message would contain an isochronous announcement or be the initial segment in a multi-segment asynchronous transfer. Likewise, a peripheral may suspend the standby mode by transmitting similar messages on the uplink. Upon termination of the isochronous connection or completion of the asynchronous transfer a peripheral would return to the standby mode. Optionally, a peripheral may delay the return to standby to allow for consecutive asynchronous transfers.

The DRX can be thought of as a special kind of isochronous transfer which is unidirectional, from the access point to the peripheral, and carries an assignment of zero bursts per period. The period is called a paging interval. Each unit is assigned a duration between paging intervals and frame offset at which the paging interval starts. The unit must correctly receive on burst per paging interval. Afterwards, the unit may discontinue reception until the next interval and converse power. Note, the burst received does not have to be addressed to the unit to satisfy the protocol. In this way, several units may be multiplexed on to the same paging period.

In DRX mode, the peripheral is assigned a set paging interval reoccurring every N frames at a predefined frame offset starting at block M. The peripheral is required to begin monitoring the block assignment field starting at frame N, block M, until it correctly demodulates a block assignment.

During an inactive paging interval, the access point may send data to other peripherals at its discretion. The peripheral will demodulate on block assignment, determine the message is for another user and return to low-power mode until the next paging interval.

During an active paging interval, the access point must repeat the message in consecutive blocks until properly acknowledged. The access point is assured the peripheral will continue to listen until the microwave oven inference subsides.

A peripheral with data-to-send may contend on any available contention block.

Two counters govern the DRX mode, NP202 and NA204. NP202 defines the maximum number of consecutive erroneous BA bursts a peripheral may receive. If NP202 is exceeded the peripheral must attempt resynchronize to the system. NA204 defines the maximum number of consecutive paging intervals in which a peripheral does not acknowledge a page that an access point must tolerate. If NA204 is exceeded, the peripheral is de-registered by the access point.

A peripheral in DRX mode must periodically re-register with the access point to insure that it has not been inadvertently de-registered. The re-registration period is assigned as part of the standby mode information element defined in section 3.3.5.5.15. Section 3.4.3 Re-registering peripherals defines the re-registration process.

Polled Mode

The polled mode is essentially a sub-rate isochronous transfer which is unidirectional, from the peripheral to the access point, and carries an assignment of one burst per period. The period is called a polling interval. Each unit is assigned a duration between polling intervals and frame offset at which the polling interval begins. The unit must successfully transmit one burst per polling interval. If the peripheral has no data to transmit, it will send a Null control message. Afterwards, the unit may discontinue reception until the next polling interval and converse power.

In the polled mode, the peripheral is assigned a polling interval reoccurring every N frames at predefined frame offset starting at block M. The peripheral is required to begin monitoring the block assignment field starting at frame N, block M until it transmits a uplink block or one frame-period expires.

During an inactive polling interval, the access point should assign an uplink block to the peripheral before one frame-period expires.

During an active polling interval, the access point must transmit the downlink message to the peripheral prior to assigning an uplink block.

A peripheral with data-to-send must wait until the next polling interval.

Two counters govern the polled mode, NP203 and NA203. NP203 defines maximum number of consecutive polling intervals in which a peripheral does not receive an uplink block assigned to it's uplink control connection. If NP203 is exceeded the peripheral must attempt re-reregister with the system. NA203 defines the maximum number of consecutive polling intervals in which a peripheral does not respond to an uplink block assignment. If NA203 is exceeded, the peripheral is de-registered by the access point.

Messaging

The peripheral communicates with the DMF in the access point over the control connection. The control connection is always addressed to the fundamental address and sub-address zero on both the uplink and downlink, see section 3.3.1.1. An uplink control message may be sent on any available contention block, polled block or other directly address control block while a downlink control message may be sent during a page or some other period the peripheral is known to be listening.

All control messages use the Control Connection Extended Header, described in section 3.3.1.2, along with a Control Message Header, described in section 3.3.5.1. All control messages are asynchronous in nature and are transmitted using an asynchronous transfer.

In support of the variety of peripherals operating on the In-Home RF Bus and realizing that some may not be as capable as others, a concept of control message pacing is provided on the control connection. Peripherals capable of streaming control messages at the 1 Mbps maximum system transfer rate may use a direct asynchronous transfer to transmit the longer multi-block control messages. These control messages would be scheduled as a multi-segment asynchronous transfer. Peripherals with less processing capabilities may select to have their control messages paced. In the latter case, these peripheral will divide a long control messages into multiple single-segment asynchronous transfers each carrying one block of the multi-block control message. The multiple single segments may be reconstructed by using sequence information contained in the control message header.

The following sections define the control messages used by the In-Home RF Bus.

Section 3.3.5.1 defines the format of the control message header. Section 3.3.5.2 discusses the operation of control message pacing. Section 3.3.5.3 lists all the control messages and their corresponding code-points. Section 3.3.5.4 provides detailed information on each control message including the required and optional information elements. Finally, section 3.3.5.5 defines the coding of each individual information element.

Control Message Header

Control messages are carried within the 96-octet data field of the payload burst. Every block within a control message will use the 32-bit Control Connection Extended Header reducing the available octets in the data field to 92. The coding of these remaining octets are defined below:

TABLE 11

| Octet field | Description | Length |
| --- | --- | --- |
| Protocol Version | Marks the revision of the In-Home RF Bus control message protocol. Version 0 is defined by this document. | 1 octet |
| Message Type | Identifies the control message which defines the purpose as well as the required and optional information elements contained. The available message types and their corresponding code-points are defined in section 3.3.5.3. | 1 octet |
| Message Length | Length of the control message in blocks. This field may take on the value 1 to 255. The value in this field is repeated in every block of a multi-block control message. | 1 octet |
| Message Block | Index of the current message block. This field may take on the values 1 through 255. The first block in a multi-block control message is numbered 1. | 1 octet |
| Information Elements | Information elements are defined by the message type above. Messages may specify both mandatory and optional elements. Section 3.3.5.4 Control Message Formats defines the mandatory and optional elements per message. | 88 octets |

The control connection provides a method to pace control message to match the capability of the particular peripheral in terms of buffering and processing. Three paces are provided full-rate, medium-rate and low-rate. At the full-rate, the control connection may deliver every block of a multi-block control message in successive blocks on the physical interface. At the medium-rate, blocks are delivered to the control connection no faster then every fourth block on the physical interface. At the low-rate, only one block may be delivered per frame and no faster than one block every thirty-second block on the physical interface.

Full-rate peripherals may use the asynchronous transfer mechanism to transport multi-block control messages. The first block in the message would identify the message as a multi-segment transfer in the Control Connection Extended Header allowing the DMF to schedule the transfer at the medium access layer. All remaining blocks would be identified as single segment transfers in the Control Connection Extended Header allowing the blocks to pass through the medium access layer. For consistency with medium-rate and low-rate peripherals, the Control Message Header would also contain sequence information. The sequence information is redundant since the medium access layer would have delivered the multi-block message in-order to the DMF.

Medium-rate and low-rate peripherals would bypass the asynchronous transfer mechanism when transporting multi-block control messages. All blocks would be identified as single segment transfers and be passed through the medium access layer. Sequence information within the Control Message Header would be used to reconstruct the message by the DMF.

Table 12 below specifies the value, direction and reference for each message used by the datalink and network layers. The direction is defined as uplink, downlink or bi-directional. Uplink messages are always sent by the peripheral to the access point. Downlink messages are always sent by the access point to the peripheral. Finally, bi-directional messages may be sent by either the peripheral or access point.

TABLE 12

| Value | Message | Direction | Reference |
|---|---|---|---|
| 0 | Registration Request | Uplink | 3.3.5.4.1 |
| 1 | Registration Assignment | Downlink | 0 |
| 2 | Registration Reject | Uplink | 3.3.5.4.3 |
| 3 | Authenticity Challenge | Bi-directional | 0 |
| 4 | Authenticity Response | Bi-directional | 3.3.5.4.5 |
| 5 | Service Set-up | Uplink | 3.3.5.4.6 |
| 6 | Service Assignment | Downlink | 3.3.5.4.7 |
| 7 | Service Negotiation Complete | Uplink | 0 |
| 8 | Isochronous Set-up | Uplink | 3.3.5.4.9 |
| 9 | Isochronous Assignment/Announcement | Downlink | 0 |
| 10 | Isochronous Reject | Downlink | 0 |
| 11 | Disconnect Request | Uplink | 0 |
| 12 | Disconnect Order | Downlink | 0 |
| 14 | Application Information | Bi-directional | 3.3.5.4.14 |
| 15 | Null | Bi-directional | 3.3.5.4.15 |

This section defines the information elements contained within each control message. It is assumed that mandatory elements must appear at the beginning of message and order is important. Furthermore, all mandatory elements have a fixed length. Optional elements appear after the mandatory elements and must be identified by an information element identifier followed by length field in octets. Order is also important for optional elements. Although, optional element may vary in length.

Registration Request

The registration request is sent by the peripheral to the access point to initiate access to the system.

TABLE 13

| Information Element | Reference | Type | Length |
|---|---|---|---|
| Random | | M | 4 |
| Number of Connections | | M | 1 |
| PIN | | M | 12 |
| Control Segment Pace | | M | 1 |
| Language Identifier | | M | 1 |
| Fill Pattern | | M | 69 |

Registration Assignment

The registration response is sent by the access point as a affirmative response to a registration request. The message registers the peripheral with the system.

TABLE 14

| Information Element | Reference | Type | Length |
|---|---|---|---|
| Random | | M | 4 |
| Fundamental Address | | M | 2 |
| Scramble Code Index | | M | 2 |
| Frequency Hopping Pattern | | M | 80 |
| System Specific ID | | O | 14 |
| Peripheral ID | | O | 6 |
| Control Channel Access | | O | 1 |
| Fill Pattern | | M | 81 |

The registration reject is sent by the access point as a negative response to a registration request.

TABLE 15

| Information Element | Reference | Type | Length |
|---|---|---|---|
| Random | | M | 4 |
| Cause | | M | 4 |
| Language Identifier | | M | 1 |
| Fill Pattern | | M | 79 |

The authenticity challenge is sent by the access point or peripheral challenging the authenticity of the other device.

TABLE 16

| Information Element | Reference | Type | Length |
|---|---|---|---|
| Random Challenge | | M | 8 |
| Fill Pattern | | M | 80 |

The authenticity response is sent by the access point or peripheral challenging in response to an authenticity challenge.

TABLE 17

| Information Element | Reference | Type | Length |
|---|---|---|---|
| Random Challenge | | M | 8 |
| Challenge Response | | M | 8 |
| Fill Pattern | | M | 72 |

The service set-up is sent to the peripheral as part of the registration process. It contains preferred default settings for a one or multiple applications.

TABLE 18

| Information Element | Reference | Type | Length |
|---|---|---|---|
| Applications Initialization Request (multiple instances) | | O | * |

The service assignment is sent by the access point to the peripheral specify the assigned application settings. The settings are negotiable and the peripheral may response with alternative settings in subsequent service set-up.

TABLE 19

| Information Element | Reference | Type | Length |
|---|---|---|---|
| Standby Mode | | M | 9 |
| System Specific ID | | M | 12 |

TABLE 19-continued

| Information Element | Reference | Type | Length |
|---|---|---|---|
| Peripheral ID | | M | 4 |
| Application Assignment (multiple instances) | | O | * |

The peripheral sends a service negotiation complete indicating the accepted applications and completing the service negotiation.

TABLE 20

| Information Element | Reference | Type | Length |
|---|---|---|---|
| System Specific ID | | M | 12 |
| Peripheral ID | | M | 4 |
| Application Identifier (Multiple) | | O | 3 |
| Fill Pattern | | M | * |

The isochronous set-up is sent by a peripheral to request a isochronous connection be established between it and the specified application.

TABLE 21

| Information Element | Reference | Type | Length |
|---|---|---|---|
| Application Identifier | | M | 1 |
| Isochronous Connection Request | | M | 1 |
| Isochronous Connection Request (Multiple) | | O | 3 |
| Application Information | | O | * |
| Fill Pattern | | M | * |

The isochronous assignment/announcement is sent by the access point establishing one or multiple isochronous connection.

TABLE 22

| Information Element | Reference | Type | Length |
|---|---|---|---|
| Application Identifier | | M | 1 |
| Frame | | M | 3 |
| Frame Offset | | M | 1 |
| Connection | | M | 2 |
| Connection (Multiple) | | M | 4 |
| Application Information | | O | * |
| Fill Pattern | | M | * |

The isochronous reject is sent by the access point in response to a isochronous set-up. The message may deny services when isochronous resources are not available.

TABLE 23

| Information Element | Reference | Type | Length |
|---|---|---|---|
| Application Identifier | | M | 1 |
| Isochronous Connection Request | | M | 1 |
| Isochronous Connection Request (Multiple) | | O | 3 |
| Fill Pattern | | M | * |

The disconnect request is sent by the peripheral to request that an isochronous connection be discontinued.

TABLE 24

| Information Element | Reference | Type | Length |
|---|---|---|---|
| Application Identifier | | M | 1 |
| Connection | | M | 2 |
| Connection (multiple) | | O | 4 |
| Application Information | | O | * |
| Fill Pattern | | M | * |

The access point sends a disconnect order to terminate one or multiple existing isochronous connection. The message may be sent unsolicited or in response to a disconnect request.

TABLE 25

| Information Element | Reference | Type | Length |
|---|---|---|---|
| Application Identifier | | M | 1 |
| Isochronous Frame | | M | 2 |
| Connection | | M | 2 |
| Connection (multiple) | | O | 4 |
| Application Information | | O | * |
| Fill Pattern | | M | * |

Application Information message carries data between applications and their clients. The message may be sent by the access point or peripheral.

TABLE 26

| Information Element | Reference | Type | Length |
|---|---|---|---|
| Application Identifier | | M | 1 |
| Application Information | | O | * |
| Fill Pattern | | M | * |

The message is usually sent during a polling interval when the peripheral has no control data to send. In general, it may be sent by either the access point or peripheral.

TABLE 27

| Information Element | Reference | Type | Length |
|---|---|---|---|
| System Specific ID | | M | 12 |
| Peripheral ID | | M | 4 |
| Fill Pattern | | M | 73 |

This section defines the format and content of the information elements sent in the messages defined in section 3.3.5.4. The information elements may preceded by an information element identifier and length field. When the information element is mandatory and fixed length, it is not preceded by an information element identifier and length field. When information is optional or variable length it must always be preceded by an information identifier. The following table 28 defines the value of the information element identifiers.

TABLE 28

| Value | Message | Direction | Reference |
|---|---|---|---|
| 0 | Random | | 3.3.5.5.1 |
| 1 | Number of Connections | | 3.3.5.5.2 |
| 2 | PIN | | 3.3.5.5.3 |
| 3 | Control Segment Pace | | 3.3.5.5.4 |
| 4 | Null Field | | 3.3.5.5.5 |
| 5 | Fundamental Address | | 3.3.5.5.6 |

TABLE 28-continued

| Value | Message | Direction | Reference |
|---|---|---|---|
| 6 | System ID | | 3.3.5.5.7 |
| 7 | Scramble Code Index | | 3.3.5.5.8 |
| 8 | Control Channel Access | | 3.3.5.5.9 |
| 9 | Frequency Hopping Pattern | | 3.3.5.5.10 |
| 10 | Fill Pattern | | 3.3.5.5.11 |
| 11 | System Specific ID | | 3.3.5.5.12 |
| 12 | Peripheral ID | | 3.3.5.5.13 |
| 13 | Application Initialization Request | | 3.3.5.5.14 |
| 14 | Standby Mode | | 3.3.5.5.15 |
| 15 | Application Assignment | | 3.3.5.5.16 |
| 16 | Application Identifier | | 3.3.5.5.17 |
| 17 | Isochronous Connection Request | | 3.3.5.5.18 |
| 18 | Application Information | | 3.3.5.5.19 |
| 19 | Frame | | 3.3.5.5.20 |
| 20 | Frame Offset | | 3.3.5.5.21 |
| 21 | Isochronous Connection | | 3.3.5.5.22 |
| 22 | Cause | | 3.3.5.5.23 |

A 32-bit random value selected at registration by the peripheral and echoed by the access point.

The number of simultaneous connections the peripheral supports based on application requirements and hardware capability. The smaller number of the sum of the maximum connections per application or the maximum connection the hardware is capable of supporting.

A Peripheral Identification Number with uniquely identifies the peripheral.

The Control Segment Pace indicates the capabilities of the control interface in the peripheral. It is a measure of the peripheral's processing power and buffer depth.

TABLE 29

| Value | Interpretation |
|---|---|
| 0 | The peripheral supports the full-rate pace. |
| 1 | The peripheral supports the medium-rate pace. |
| 2 | The peripheral supports the low-rate pace. |

A null field always encoded as zero. May be variable length.

Assigns the fundamental address of the peripheral. The format is defined in the table below.

TABLE 30

Fundamental Address Assignment

| Extended Header Fields | Description | Length |
|---|---|---|
| Sub-Address Depth | Number of LSBs in the address that represent sub-address space. A value may range from 0 to 5. | 3 bit |
| Reserved | Encoded as one. | 1 bit |
| Address | A 12 bit value between 0 and 4095. | 12 bit |

System ID: Short ID selected at random to identify the system from among it's neighbors. Broadcast in every BA burst and payload burst.

Scramble Code Index specifies the scrambling code used by the system.

Control Channel Access determines whether the service negotiation is completed on a polled or contention basis. The information element is always optional. When it is not sent, the default is contention access.

Fill Pattern is a special information element used to fill the empty space at the end of block. It does not contain a length field. When encountered by the message parser at the receiver, the parser should skip to the next message block in the message. A binary value of %00011011 fills the remainder of the block.

System Specific ID is a 12 octet system specific ID. The first 4 octets identify the manufacturer of the device. The remaining octets are required to be unique for every access point manufactured.

Peripher ID is selected by access point to uniquely identify a peripheral when reregistering. The peripheral will store this value on initial registration. The peripheral can assume previously negotiated services and sub-addresses are still valid if the Fundamental Address, Peripheral ID, and System Specific ID match a set of values cached. Otherwise, services and sub-addresses must be negotiated.

Application Initialization Request is used during service negotiation to initialize an application. The peripheral specifies which application it would like to connect to an identifies it capabilities to the application server. The format of the information element is in Table 31.

TABLE 31

Application Initialization Request Format

| Fields | Description | Length |
|---|---|---|
| Application Specific Identifier | Uniquely defines the application to connect too. | 4 octets |
| Application Information | As required by the application definition. | 0 to 82 octets |

Standby Mode assigns the standby mode for the peripheral—either polled or discontinuous reception, the frame offset, and the start frame.

TABLE 32

Standby Mode Format

| Fields | Description | Length |
|---|---|---|
| Mode | Sets the standby mode to either polled or discontinuous reception. A value of 1 indicates a poll a value of 0 indicates discontinuous reception. | 1 octet |
| Period | Number of frames between pages or polls. May take on the values 0 through 524287. Allows for a maximum standby of 3.5 hours and a minimum of 24 milliseconds. | 3 octets |
| Frame Offset | Specifies the block in the frame of the paging interval. May take on the values 0 to 30. | 1 octets |
| Start Frame | The frame at which the first paging interval will begin. May take on the values 0 through 524287. Equivalent to the 19 bit frame number in the block assignment burst. | 3 octets |
| Re-registration Period | Specifies the multiple of paging periods after which the peripheral must re-register with the system. A value of 0 indicates that re-registrations are not required. | 1 octet |

Application Assignment is used during service negotiation to initialize an application. The peripheral specifies which application it would like to connect to and identifies it capabilities to the application server. The format of the information element is in

TABLE 33

Application Assignment Format

| Fields | Description | Length |
|---|---|---|
| Application Identifier | Assigns a short 8-bit identifier to the application for further reference. The shorten 8-bit identifier is used for subsequent reference and is unique to a particular access point. | 1 octet |
| Application Specific Identifier | Uniquely defines the application. | 4 octets |
| Application Information | As required by the application definition. | 0 to 82 octets |

Application Identifier is an 8 bit identifier used as shorthand for the Application Specific Identifier. It is assigned during service negotiation in the Application Assignment information element. A response to a Service Request. Acknowledging requested parameters or denying service.

Isochronous Connection Request specifies the desired isochronous connection including the direction and the rate.

TABLE 34

Isochronous Connection Request

| Fields | Description | Length |
|---|---|---|
| Direction | A value of 0 indicates an uplink connection is required, from peripheral to access point. A value of 1 indicates a downlink connection is required, from access point to peripheral. | 1 bit |
| Mode | A value of 0 indicates a sub-rate connection is requested while a value of 1 denotes a super-rate connection is | 1 bit |
| Reserved | Reserved. Must be encoded as 0. | 1 bit |
| Rate | For sub-rate traffic, the field specifies the number of frames between blocks and may take on the values 1 through 5 providing a 1 to 16 Kbps data-rate. For super-rate traffic, the field specifies the number of blocks per frame and may take on the values 1 through 31 providing a 32 to 992 Kbps data rate. | 5 bits |

Application Information carries application information.

TABLE 35

Application Information Format

| Fields | Description | Length |
|---|---|---|
| Application Identifier | Assigns a short 8-bit identifier to the application for further reference. The shorten 8-bit identifier is used for subsequent reference and is unique to a particular access point. | 1 octet |
| Application Information | As required by the application definition. | 0 to 82 octets |

The frame at which a service change will begin or end. May take on the values 0 through 524287. Equivalent to the 19 bit frame number in the block assignment burst.

Frame Offset specifies the block in the frame where the Isochronous Window begins and may take on the values 0 to 30.

Isochronous connection references an existing isochronous connection or assigns a physical address for a new isochronous connection. Must be a sub-address of the fundamental address. The field is 2 octets long containing a 12-bit physical address.

The Cause indicates the cause with respect to the denial of service or termination.

TABLE 36

Cause Values

| Value | Interpretation |
|---|---|
| 0 | "Peripheral has not been registered with this access point." |
| 1 | "Bandwidth is unavailable." |
| Others | Reserved. |

The network layer is responsible for maintaining the integrity of the network by keeping track of registered peripherals, available applications, and performance of the air-interface. The access point must manage the peripherals registered with the system. It must be able to identify its own peripherals from those of its neighbor. Furthermore, it must determine whether peripherals are powered-down or out-of-reach. In addition, it must coordinate and convey air-interface parameters such as frequency hopping patterns, scrambling masks, and color codes. Finally, it must be capable of authenticating peripherals and providing its own authenticity to those peripherals.

One system may encompass peripherals made by a variety of manufacturers and purchased independently. In order to associate peripherals with a access point, the access point and peripheral must share a unique Peripheral Identification Number (PIN) and may also share a Peripheral Secret Kay (PSK). Every peripheral must be manufactured with a unique PIN. Peripherals supporting authentication must also contain a PSK. Upon purchasing a new peripheral, both the PIN and PSK must be entered into the access point. The PIN would be transmitted on the A-Interface by the peripheral used to index the PSK at the access point. The PSK would never by transmitted. A variety of methods may be employed to enter the PIN and PSK. For example, many peripherals will provide application software or drivers in support of their device. The PIN and PSK may be included on the distribution media and loaded when the software is loaded. Alternatively, the PIN or PSK may be typed in at a keypad or keyboard which is in some way connected to the access point either to the computer, on a registered peripheral, or as an integral part of the access point.

Often, it is expected that consumers will forgo strong authentication in favor of a simpler configuration process. The PIN is a relatively short 10 character sequence uniquely identifying the peripheral. The PSK is a 50 character secret key in addition to the 10 character PIN. Typing in the PIN/PSK combination may prove too cumbersome to for most consumers. Distributing the PIN/PSK with the application software should make the authentication more assessable, but not all peripheral will come with custom applications. Furthermore, forgoing the authentication enables a simpler peripheral discovery process.

The following sections discuss the protocols used to register peripherals with access point. Section 3.4.1 discusses the process of registering new peripherals including the synchronization, authentication, and service negotiation processes. Section 3.4.2 discusses the events which may cause a peripheral to be automatically de-registered from the system. Finally, section 3.4.3 discusses a streamlined process for re-registering known peripheral with the system.

In order for a peripheral to acquire a new system and access service the peripheral must be able to synchronize to an access point, reject access points that are not its own, and finally identify the purchaser's access point as its own. The purchaser's access point and peripheral are assumed to share a PIN which is unique to the new peripheral. In secure systems, the access point and peripheral are assumed to also share a PSK. The method for inserting the PIN and PSK into the access point is left to the manufacturer's desecration.

Figure 27:
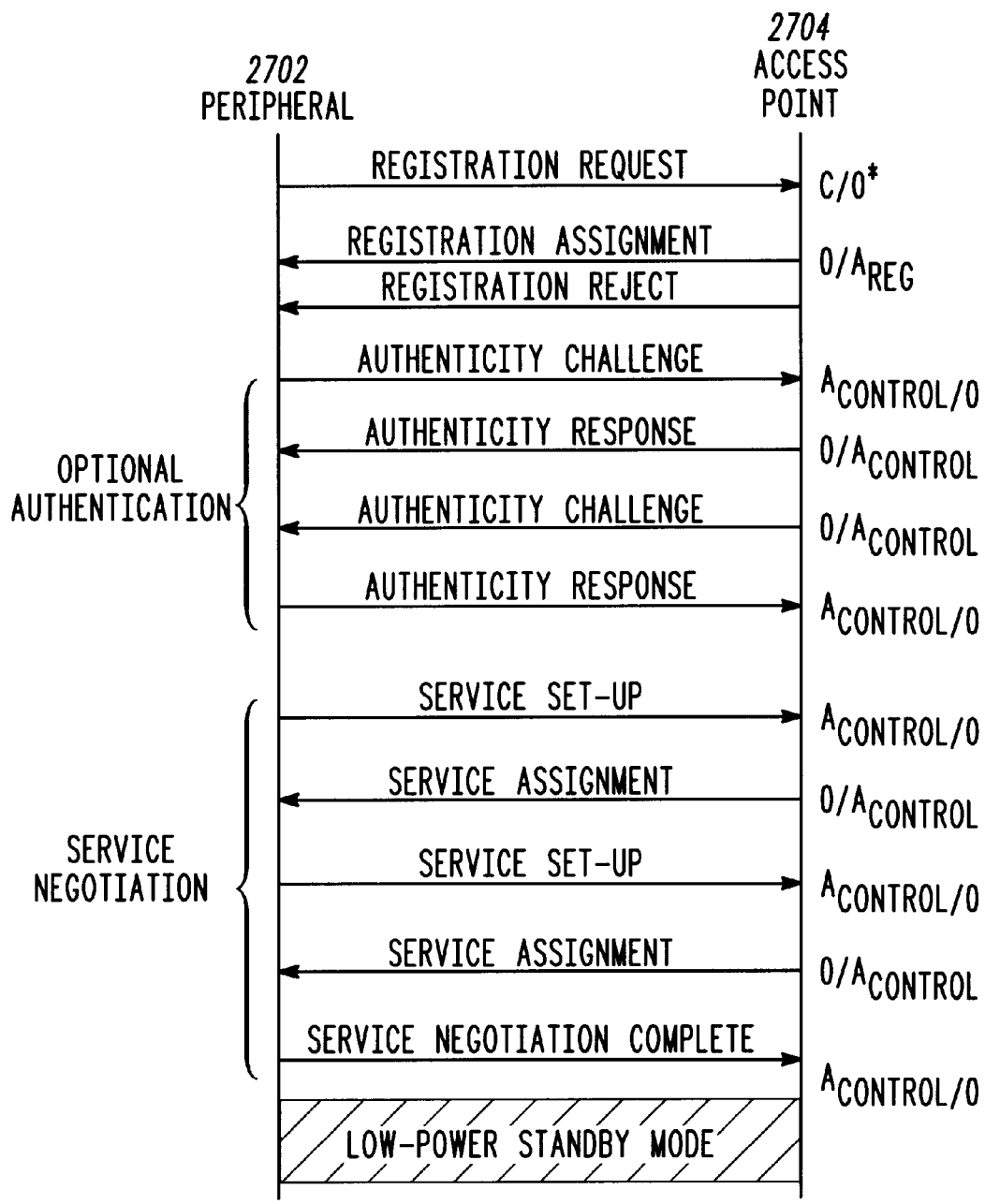
Figure 28:
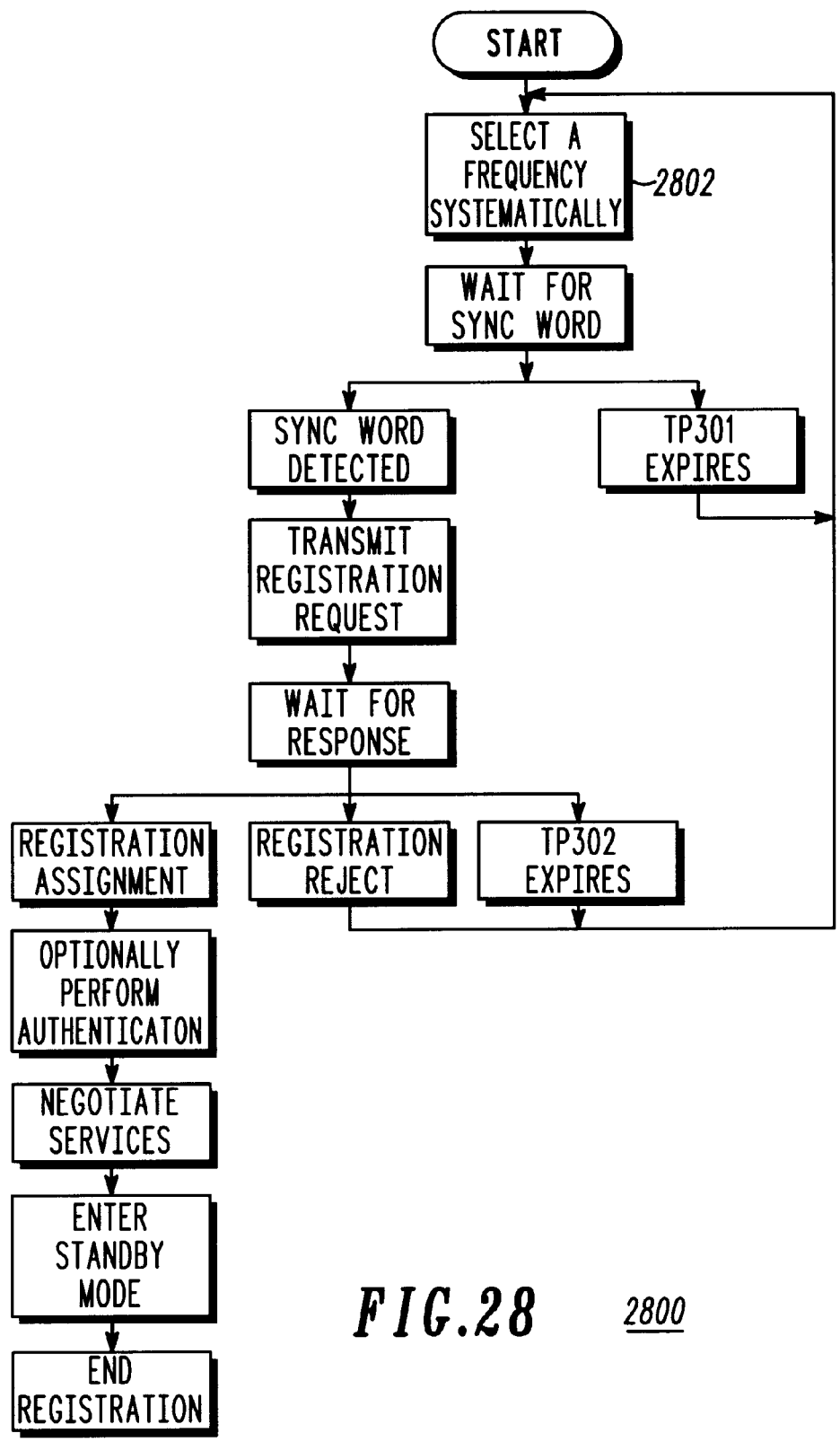

FIG. 27, numeral 2700, illustrates one possible state machine a peripheral (2702) might follow when synchronizing to a new system. FIG. 28, numeral 2800, presents the message sequence diagram of the registration process. The peripheral will start by searching for the synchronization pattern on a initial frequency (2802). If no synchronization pattern is detected in TP301, then the peripheral systematically change frequencies and resume searching for the synchronization pattern. If synchronization sequence is detected, the peripheral sends a Registration Request on an available contention access block. Within TA302 (equivalent to TP302), the access point (2704) must respond with a Registration Assignment or Registration Reject. If the peripheral is rejected the peripheral changes frequency and resumes searching for the synchronization pattern.

When a peripheral is accepted by a access point, the peripheral receives its fundamental address, frequency hopping table and scramble code index from the access point in the Registration Assignment. Also included in the registration assignment is a System Specific ID which uniquely identifies the access point and system assigned Peripheral ID which may be used in subsequent re-registrations to uniquely identify the system and peripheral.

A peripheral will authenticate the network by issuing a Authenticity Challenge message containing a random number that the must be combined with the PSK using an authentication algorithm to produce a challenge response. The challenge response is communicated back to the peripheral in Access Point Response message. The peripheral would compare the challenge response with one generated locally and if they match the access point has been authenticated. Likewise, the access point may initiate authenticate the network using the same Authenticity Challenge and Challenge Response message pair. Note, that is no case is the PSK transmitted over the air interface maintaining its secrecy.

The next step in the registration process is the service negotiation phase. The peripheral initiates the process by sensing a Service Set-Up message to the access point. The Service Set-Up message contains one or multiple Application Initialization Request information elements. The Application Initialization Request information contains an Application Specific Identifier which uniquely identifies the application along with requested application setting. Each application initialization request is forwarded to the installed application which interprets the information and generates a response contain application settings in the form of an Application Assignment information element. The DMF appends a shorten one-octet application identifier for future references to the application. If the application identified is available the DMF generates an Application Unavailable information element as a response to the initialization request. All application responses are combined and sent to the peripheral in a Service Assignment message. If the peripheral is dissatisfied with any Application Assignment, it make send up a subsequent Service Set-Up containing alternative application settings. This process will continue until the peripheral receives a set of parameters it is satisfied with or chooses not subscribe to the services of an application. Having reached that point, the peripheral ends the negotiation process by sending a Service Negotiation Complete containing the application IDs of the application it has chosen to subscribe too. Omitted Application IDs are assumed to have been rejected and therefore the access point may release any previously negotiated resources associated with the rejected applications.

In the service negotiation process the access point determines an appropriate standby mode with respect to the latency requirements of the applications a peripheral has subscribed too. The standby mode is usually transmitted in the Service Assignment information element but may be reassigned at anytime a peripheral is registered with the system. At the end of the negotiation process, the peripheral enters the low-power standby mode. The peripheral exits the standby mode when it performs an isochronous or asynchronous transfer and returns to the standby mode when the transfers are complete.

During the course of normal operations there are many events that may cause a peripheral to be de-registered by the access point or may make the peripheral assume it has been de-registered. Generally they all have to do with a detected degradation in signal quality which may be caused by a variety of factors. For instance, the peripheral may have gone out-of-range or have been shadowed. Alternatively, the peripheral's battery may have run down or the peripheral was shut-off. Regardless of the cause, de-registration is not a catastrophic event and the peripheral may quickly be re-registered, once the obstruction to signal quality has been resolved, using the process described in section 3.4.3 Re-registering peripherals.

A degradation in signal quality is detected by errors in protocol execution. For example, a failure to acknowledge several consecutive pages or polls is grounds for the access point to the drop the peripheral. Similarly, a peripheral encountering several polling intervals without being polled may assume the access point has de-registered it Other events warranting de-registration include an abrupt and sustained failure in the isochronous transfer or a failure by the peripheral to decode a substantial number of consecutive BA bursts.

An access point will de-register a peripheral when counters NA203 and NA204 have been exceeded. Also a peripheral will be de-registered when timer TA205 has expired. Finally, a peripheral may de-registered if it has not re-registered as required by the DRX standby mode.

A peripheral will attempt to re-register will a system when timers NP202 and NP203 have been exceeded. Also a peripheral will attempt re-register when timer TP205 has expired. Finally, a peripheral may re-register as required by the DRX standby mode.

The re-registration process happens regularly in the normal course of protocol operation and may be executed in an expedient manor.

Figure 29:
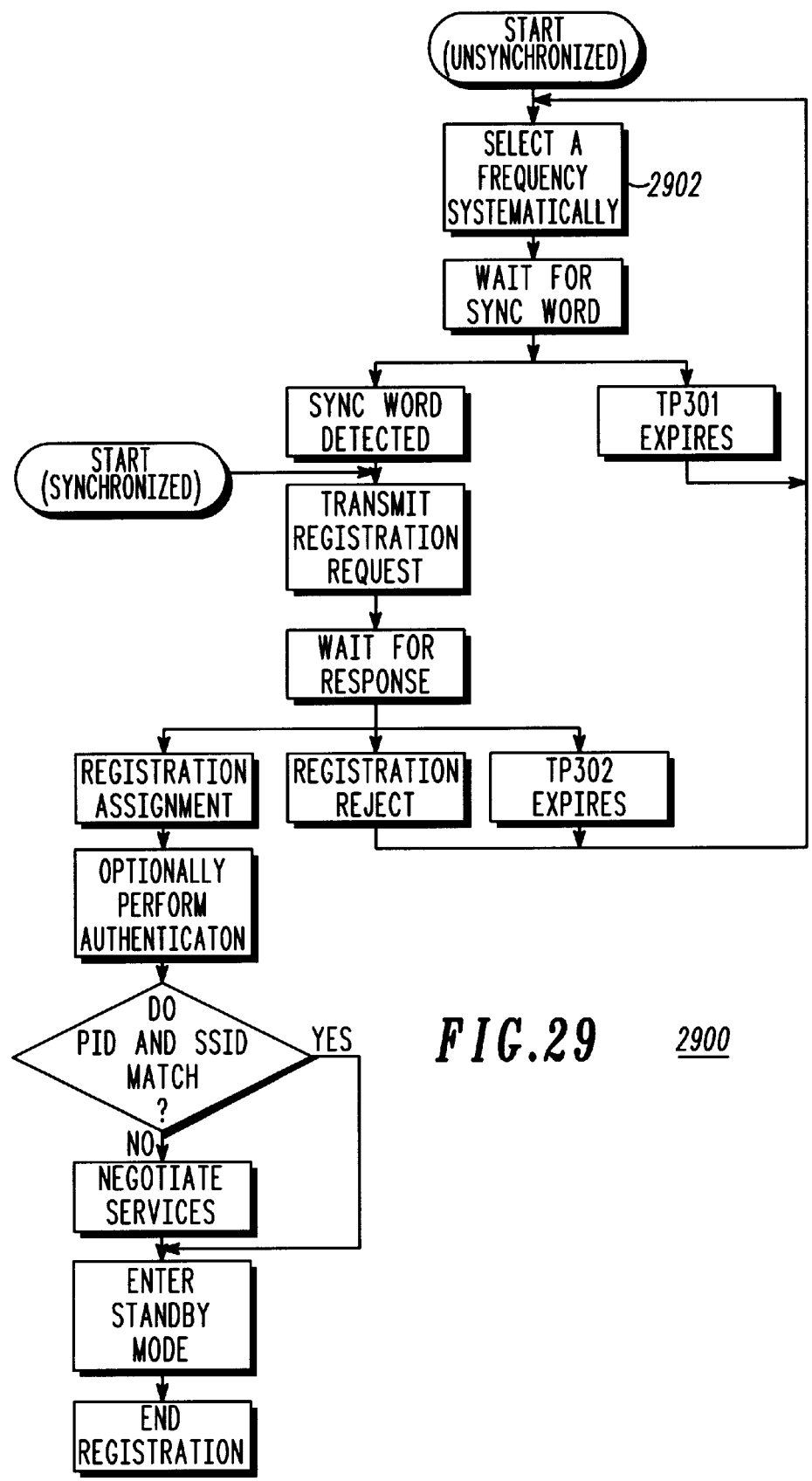

FIG. 29, numeral 2900, illustrates the flow-chart for the re-registration process. The flow chart has two entry points, one for peripherals currently synchronized to the system and the other for peripherals in a unsynchronized state. The process is similar to the normal registration process in that the frequency search is employed followed by a registration request. However, the re-registration process allows an access point which identifies a familiar peripheral to respond with a registration assignment containing the identical Peripheral ID issued on the initial registration. The peripheral recognizing the familiar Peripheral ID associated with System Specific ID may resume registered operation assuming that all negotiated parameters remain as before.

Optionally, a peripheral or access point may forgo the shortened re-registration process. A peripheral choosing to forgo the process would begin the service negotiation phase while access point may forgo the process by assigning a new Peripheral ID in the registration assignment.

The present invention may be embodied in other specific forms without departing from its spirit or essential characteristics. The described embodiment are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for controlling a space diversity switch in a time division duplex system, comprising the steps of:
   A) inputting data to a peripheral;
   B) generating a first cyclic redundancy check $CRC_1$ in a peripheral;
   C) transmitting the data and the $CRC_1$ by the peripheral;
   D) receiving, by an access point device, the data with the $CRC_1$;
   E) extracting $CRC_1$ from received data and generating a second cyclic redundancy check $CRC_2$ from received data;
   F) determining whether $CRC_1$ and $CRC_2$ are equal; and where $CRC_1$ and $CRC_2$ are equal, failing to generate a repeat request;
   G) where $CRC_1$ and $CRC_2$ are unequal, generating a repeat request;
   H) incrementing a counter;
   I) determining whether a number of requests=N, wherein N is a predetermined integer, and where the number of requests≠N, incrementing a counter and returning to step D; and
   J) where the number of requests=N, resetting the counter, changing an antenna state and returning to step D.

2. An access point device for providing space diversity in a time division duplex system, comprising:
   A) an access point device transceiver, coupled to receive access point device data input;
   B) a checking unit, for transmitting and receiving time division duplex data, the checking unit, coupled to the access point device transceiver, for determining whether to generate a repeat request;
   C) an antenna control unit, coupled to the checking unit, for changing antenna selection based on a predetermined scheme;
   D) an antenna unit, coupled to the antenna control unit and a time division duplex switch, for communicating with a peripheral device;
   wherein the access point device transceiver includes:
      a transmitter, coupled to a data block format logic unit, for transmitting data;
      the data block format logic unit, coupled to receive data from a peripheral device, for arranging data from the peripheral device in blocks;
      a controller, coupled to receive repeat requests, the data block format logic unit and a data block unformat logic unit, for controlling the operation of the transceiver;
      the data block unformat logic unit, coupled to a receiver, for stripping the data and a first CRC from the peripheral device out of the data block;
      the receiver, coupled to a time division duplex switch, for receiving data from the peripheral device;
      the time division duplex switch, coupled to the transmitter and receiver, for directing radio frequency signals to and from the access point device transceiver;
   E) a CRC generation unit coupled to the data block format logic unit, for generating a CRC for the data received from the peripheral device;
   wherein the checking unit includes:
      a $CRC_2$ generation unit, coupled to the data block unformat logic unit, for generating a second CRC from the data received from the peripheral device; and
      a CRC checking unit, coupled to the data block unformat logic unit and the $CRC_2$ generation unit, for comparing the first CRC and the second CRC and outputting a repeat request when the first CRC is unequal to the second CRC and incrementing an N-event counter of the antenna control unit.

3. The access point device of claim 2 wherein the antenna control unit is an N event counter coupled to receive repeat requests, for counting a number of repeat requests and a toggle flip-flop, coupled to the N event counter, for, when a number of repeat request events exceeds N, a predetermined integer, changing an antenna state.

4. The access point device of claim 2 wherein the checking unit includes:
   A) a signal quality determining unit, coupled to the receiver, for generating a signal proportional to a received signal;
   B) a transmission gate, coupled to the signal quality determining unit and the data block unformat logic unit, for sampling signal quality determining unit output during a data block; and
   C) a comparator, coupled to the transmission gate, for determining a signal quality determining unit level and where the signal quality determining unit level is less than a predetermined threshold, changing an antenna state.

5. The access point device of claim 4 wherein the antenna control unit includes a toggle flip flop, coupled to the comparator, for, when a received signal level from the peripheral device falls below a predetermined threshold during a data block interval, changing the antenna state.

6. The access point device of claim 4 wherein the antenna unit is one of:
   A) a selectable antenna; and
   B) a phasing array.

7. A peripheral device for providing space diversity in a time division duplex system, comprising:
   A) a peripheral device transceiver, coupled to receive device data input, an antenna, for transmitting and receiving time division duplex data, wherein the peripheral device transceiver comprises:
      A1) a transmitter, coupled to a data block format logic unit, for transmitting data;
      A2) the data block format logic unit, coupled to receive data from a peripheral, for arranging data from the peripheral in blocks;
      A3) a controller, coupled to receive repeat requests, the data block format logic unit and a data block unformat logic unit, for controlling the operation of the peripheral device transceiver;
      A4) the data block unformat logic unit, couple to a receiver, organizing a continuous stream of data into blocks having a predetermined number of bits and adding another predetermined number of control bits;
      A5) the receiver, coupled to a time division duplex switch, for receiving data from an access point device;
      A6) the time division duplex switch, coupled to the transmitter and receiver, for directing radio frequency signals to and from the peripheral device transceiver;

B) an antenna, coupled to the peripheral device transceiver, for communicating with an access point device;

C) a checking unit, coupled to the peripheral device transceiver, wherein the checking unit comprises:

a CRC generation unit, coupled to the data block unformat logic unit, for generating a cyclic redundancy code CRC from the data input; and a CRC checking unit, coupled to the data block unformat logic unit and the CRC generation unit, for comparing the CRC generated by the CRC generation unit with a CRC sent by an access point transceiver for outputting a repeat request when the CRC generated by the CRC generation unit is unequal to the CRC sent by the access point transceiver.

8. The peripheral device of claim 7 further including a $CRC_1$ generation unit coupled to the data block format logic unit, for generating a $CRC_1$ for the data received from an access point device.

9. A method for controlling a space diversity switch in a time division duplex system, comprising the steps of:

A) inputting data to an access point device;

B) generating a first cyclic redundancy check $CRC_1$ in the access point device;

C) transmitting the data and the $CRC_1$ by the access point device;

D) receiving, by a peripheral device, the data with the $CRC_1$;

E) extracting $CRC_1$ from received data and generating a second cyclic redundancy check $CRC_2$ from received data;

F) determining whether $CRC_1$ and $CRC_2$ are equal, and where $CRC_1$ and $CRC_2$ are equal, transmitting an acknowledgment ACK;

G) where $CRC_1$ and $CRC_2$ are unequal, transmitting a negative acknowledgment NAK;

H) receiving the ACK/NAK at a receiver of the access point device;

I) determining, by the access point device, whether one of: an ACK and a NAK was received;

J) where an ACK has been received, failing to generate a repeat request and where a NAK has been received, generating a repeat request by the access point device;

K) incrementing a counter;

L) determining whether a number of requests=N, N a predetermined integer and where the number of requests≠N, returning to step C; and M) where the number of requests=N, resetting the counter, changing an antenna state and returning to step C.

* * * * *